(12) United States Patent
Watanabe et al.

(10) Patent No.: US 7,414,665 B2
(45) Date of Patent: Aug. 19, 2008

(54) IMAGING SYSTEM

(75) Inventors: Masahito Watanabe, Hachioji (JP); Shinichi Mihara, Tama (JP); Azusa Noguchi, Hino (JP); Toru Miyajima, Akishima (JP); Yuji Miyauchi, Machida (JP)

(73) Assignee: Olympus Corporation, Tokyo (JP)

( * ) Notice: Subject to any disclaimer, the term of this patent is extended or adjusted under 35 U.S.C. 154(b) by 1199 days.

(21) Appl. No.: 10/619,078

(22) Filed: Jul. 15, 2003

(65) Prior Publication Data

US 2004/0080655 A1 Apr. 29, 2004

(30) Foreign Application Priority Data

Jul. 16, 2002 (JP) .............................. 2002-206733

(51) Int. Cl.
*H04N 5/238* (2006.01)

(52) U.S. Cl. ............... 348/363; 348/240.99; 348/240.3; 348/335; 348/342; 348/360; 359/676; 359/691; 359/692; 359/739; 359/740; 396/451

(58) Field of Classification Search ............ 348/240.99, 348/240.3, 335, 342, 360, 362, 363; 359/646, 359/676, 691, 692, 722, 723, 738, 739, 740, 359/745, 748, 793, 795, 885, 888, 889; 396/355, 396/357, 451, 462
See application file for complete search history.

(56) References Cited

U.S. PATENT DOCUMENTS

| | | | | |
|---|---|---|---|---|
| 4,196,967 A * | 4/1980 | Ohnishi et al. | ............... | 359/399 |
| 4,249,798 A * | 2/1981 | Moskovich | ............... | 359/683 |
| 5,068,679 A * | 11/1991 | Kikuchi | ............... | 396/506 |
| 5,083,149 A * | 1/1992 | Kudo et al. | ............... | 396/80 |
| 5,087,988 A * | 2/1992 | Nakayama | ............... | 359/689 |
| 5,534,696 A * | 7/1996 | Johansson et al. | ............... | 250/330 |
| 5,541,779 A * | 7/1996 | Choi | ............... | 359/885 |
| 5,646,788 A * | 7/1997 | Bietry | ............... | 359/740 |
| 5,764,425 A * | 6/1998 | Ohshita | ............... | 359/748 |
| 5,982,423 A * | 11/1999 | Sekiguchi | ............... | 348/216.1 |
| 6,086,267 A * | 7/2000 | Tsuzuki et al. | ............... | 396/459 |
| 6,154,322 A * | 11/2000 | Nakayama | ............... | 359/691 |
| 6,297,915 B1 * | 10/2001 | Kaneko et al. | ............... | 359/718 |
| 6,341,901 B1 * | 1/2002 | Iwasa et al. | ............... | 396/355 |
| 6,377,404 B1 * | 4/2002 | Goosey, Jr. | ............... | 359/682 |
| 6,449,105 B1 * | 9/2002 | Dou | ............... | 359/793 |
| 6,536,960 B2 * | 3/2003 | Kubo et al. | ............... | 396/355 |
| 6,560,040 B2 * | 5/2003 | Kaneko et al. | ............... | 359/739 |
| 6,741,760 B2 * | 5/2004 | Hayashi et al. | ............... | 382/321 |

(Continued)

*Primary Examiner*—Tuan Ho
*Assistant Examiner*—Chriss S Yoder, III
(74) *Attorney, Agent, or Firm*—Kenyon & Kenyon LLP

(57) ABSTRACT

The invention relates to an imaging system in which, while high image quality is maintained with the influence of diffraction minimized, the quantity of light is controlled, and which enables the length of the zoom lens to be cut down. The imaging system comprises a zoom lens comprising a plurality of lens groups G1 and G2 wherein the spacing between individual lens groups is varied to vary a focal length and an aperture stop located in an optical path for limiting at least an axial light beam diameter, and an electronic image pickup device I located on the image side of the zoom lens. The aperture stop has a fixed shape, and a filter S2 for performing light quantity control by varying transmittance is located on an optical axis of a space located at a position different from that of a space in which the aperture stop is located.

29 Claims, 37 Drawing Sheets

U.S. PATENT DOCUMENTS

| | | | | |
|---|---|---|---|---|
| 6,833,864 B1 * | 12/2004 | Ashida | ................... | 348/229.1 |
| 2002/0015238 A1 * | 2/2002 | Koike | ........................ | 359/794 |
| 2002/0021511 A1 * | 2/2002 | Lee et al. | ................... | 359/888 |
| 2002/0141076 A1 * | 10/2002 | Lee | ............................ | 359/738 |
| 2005/0083587 A1 * | 4/2005 | Ueyama | ................... | 359/738 |

* cited by examiner

Spherical aberrations FNO. 2.77

-0.10   0.10

Astigmatism ω 31.00

-0.10   0.10

Distortion ω 31.00

-5.00   5.00 (%)

Chromatic aberration of magnification ω 31.00

-0.02   0.02

Spherical aberrations FNO. 3.49

-0.10   0.10

Astigmatism ω 21.50

-0.10   0.10

Distortion ω 21.50

-5.00   5.00 (%)

Chromatic aberration of magnification ω 21.50

-0.02   0.02

Spherical aberrations FNO. 4.53

-0.10   0.10

Astigmatism ω 14.50

-0.10   0.10

Distortion ω 14.50

-5.00   5.00 (%)

Chromatic aberration of magnification ω 14.50

-0.02   0.02

C : Cyan   M : Magenta
Ye : Yellow   G : Green

IMAGING SYSTEM

This application claims benefits of Japanese Application No. 2002-206733 filed in Japan on Jul. 16, 2002, the contents of which are incorporated herein by this reference.

BACKGROUND OF THE INVENTION

The present invention relates generally to an imaging system, and specifically to an imaging system comprising a zoom lens and an electronic image pickup device such as a CCD. More specifically, the present invention is concerned with a digital camera capable of obtaining electronic images.

So far, imaging systems incorporating a zoom lens and an electronic image pickup device, for the most part, have made use of a so-called variable stop with variable aperture diameter to control the quantity of light passing through the zoom lens.

Current image pickup devices, on the other hand, are designed with an increasing number of pixels for the purpose of achieving image quality improvements.

The more the number of pixels in an image pickup device, the higher the optical performance demanded for an optical system becomes. A problem with the use of the conventional variable stop is, however, that when it is intended to diminish the stop diameter for light quantity control, resolution drops due to the influence of diffraction. It is thus difficult to make any sensible tradeoff between light quantity control and image quality improvements.

Even when it is desired to cut down the length of the zoom lens, the thickness of the variable stop due to its mechanical makeup often imposes limitations on reducing the length of the optical system.

SUMMARY OF THE INVENTION

In view of such problems as stated above, the primary object of the present invention is to provide an imaging system wherein light quantity control as well as high image quality can be achieved while the influence of diffraction is eliminated or minimized, and the length of a zoom lens can be cut down.

According to the first aspect of the present invention, this object is achievable by the provision of an imaging system comprising a zoom lens comprising a plurality of lens groups wherein a spacing between individual lens groups is varied to vary a focal length and an aperture stop located in an optical path for limiting at least an axial light beam diameter, and an electronic image pickup device located on an image side of the zoom lens, characterized in that:

the aperture stop has a fixed shape, and a filter for performing light quantity control by varying transmittance is located on an optical axis of a space located at a position different from that of a space in which the aperture stop is located.

Advantages of the first imaging system of the present invention are now explained. This imaging system comprises a zoom lens including a plurality of lens groups wherein the spacing between individual lens groups is varied for zooming (variation of the focal length) and an electronic image pickup device located on the image side of the zoom lens. By fixing the shape of the stop, it is possible to prevent deterioration in electronic images due to diffracted light that occurs at a reduced stop diameter.

A conventional mechanism for controlling the quantity of light at a stop position imposes limitations the flexibility in the layout of the optical system due to the use of a shape variable stop, etc. With the present invention wherein the stop of fixed shape is used, however, the stop mechanism itself can be slimmed down.

The spacing between the lens groups with the stop interposed between them can be shorter than usual, and the length of the lens group system can be cut down as well.

It is here understood that the aperture stop could be located in the lens group, i.e., said aperture stop could be located between lenses where the spacing between which remains constant upon zooming. The aperture stop is not necessarily limited to a circular one. It is here noted that for a conventional variable stop that must be constantly of circular shape, a number of stop plates are needed.

In the present invention, however, it is more preferable to use an aperture stop having a circular aperture, because so-called neatly blurred images with limited image variations at non-focused portions can be obtained irrespective of in what state the quantity of light is controlled.

It is also acceptable that the chief ray of an off-axis light beam determined by the aperture stop is shaded at other sites. In other words, the light quantity control means of the type that the area of an aperture stop is commonly decreased must be located at a position where there is no extreme decrease in the quantity of light at the marginal area of a screen upon stop-down. In the present invention, however, it is unnecessary to do so and hence the degree of freedom in design can be enhanced.

If the aperture stop of fixed shape is configured as described below, it is then possible to obtain electronic images of high resolution.

According to the second aspect of the present invention, the first imaging system is characterized in that when $1.5 \times 10^3 \times a/1 \text{ mm} < F$ where F is a full-aperture number at the telephoto end of the zoom lens and a is the minimum pixel pitch in mm of the electronic image pickup device, the length of the aperture stop in the vertical or horizontal direction of an image pickup plane is longer than the length of the aperture stop in the diagonal direction of the image pickup plane, or when $1.5 \times 10^3 \times a/1 \text{ mm} > F$, the length of the aperture stop in the vertical or horizontal direction of the image pickup plane is shorter than the length of the aperture stop in the diagonal direction of the image pickup plane.

Advantages of the second imaging system of the present invention are now explained. For instance, as the length of the pixel pitch reaches about 2 μm there is diffraction limited at an F-number of about 5.6. According to the present invention wherein the stop is always of fixed shape, it is possible to enhance resolution by the determination as desired of aperture shape.

Suppose now that F is the F-number of the image pickup lens used and λ is the wavelength in nm of the light used. Then, Rayleigh's critical frequency is roughly given by $1/1.22F\lambda$ On the other hand, the resolution limit of an image pickup device comprising a plurality of pixels is given by 1/2a where a is the pixel pitch in mm.

To keep Rayleigh's critical frequency from becoming lower than the resolution limit of the image pickup device, it is a requisite to satisfy $1.22F\lambda < 2a$ or $F < 1.64a/\lambda$ Assume here that the wavelength used is λ=546 nm in view of visible light photography. The condition for theoretical F-number limit is given by $F < 3.0 \times 10^3 \times a/1 \text{ mm}$ As the aperture is stopped down, on the other hand, it is actually found that images start to deteriorate from a state two-stop brighter than the aforesaid F-number.

Thus, it is more practical that the condition for the F-number limit is given by $F < 1.5 \times 10^3 \times a/1$ mm For an electronic image, improvements in its frequency characteristics in the horizontal and vertical directions are effective for image quality improvements. It is thus preferable that when the full-aperture F-number is $1.5 \times 10^3 \times a/1$ mm$<F$, the length of the aperture stop in the vertical or horizontal direction of the image pickup plane is longer than the length of the aperture stop in the diagonal length of the image pickup plane so that the electronic image is less susceptible to the influence of diffraction.

When the full-aperture F-number is $1.5 \times 10^3 \times a/1$ mm$>F$, on the other hand, the length of the aperture stop in the vertical or horizontal direction of the image pickup plane should preferably be shorter than the length of the aperture stop in the diagonal length of the image pickup plane so that the electronic image is less susceptible to the influence of geometrical aberrations.

With the second imaging system of the present invention, it is further possible to make the cutoff frequency of a hitherto used low-pass filter high or dispense with that low pass-filter itself.

In the present invention, it is desired to cut down the length of the lens system as follows.

According to the third aspect of the present invention, the first imaging system is further characterized in that the filter is located in the minimum air space among variable air spaces in the zoom lens or in the longest air space among constant air spaces in the zoom lens.

With the third imaging system of this arrangement, the filter can be located in a constantly wide space in the zooming zone, so that the length of the lens system can favorably be cut down. As described later, the same is true for even the case where the shutter is located. That is, the third imaging system of the present invention may be embodied as follows.

Specifically, there is provided an imaging system which comprises a zoom lens comprising a plurality of lens groups in which the spacing between individual lens groups is varied for varying a focal length and an aperture stop located in an optical path to limit at least the diameter of an axial light beam and an electronic image pickup device located on the image side of the zoom lens, said aperture stop being of fixed shape, and which further comprises a shutter located on an optical axis of a space at a position different from that in which the aperture stop is located, characterized in that the shutter is located in the minimum air space among variable air spaces in the zoom lens or in the longest air space among constant air spaces in the zoom lens.

It is here noted that as the size of the aperture stop having fixed shape is increased to ensure the quantity of light, the light beam is shaded by a lens barrel or the like. This often leads to variations of brightness between the central area and the marginal area of an image. According to the present invention, the brightness variations should desirously be reduced by use of such a light quantity control filter as explained below.

According to the fourth aspect of the present invention, the first imaging system is further characterized in that the light quantity control filter comprises at least one transmitting surface wherein the transmittance of its central portion is higher than that of its marginal portion.

This arrangement makes photography with reduced brightness variations feasible.

According to the present invention, it is preferable to reduce ghosts due to light reflected at the filter as follows.

According to the fifth aspect of the present invention, the first imaging system is further characterized in that the light quantity control filter is tiltable with respect to the optical axis.

According to the sixth aspect of the present invention, the first imaging system is further characterized in that the aperture stop is located between lens groups between which there is an air space variable upon zooming or focusing, and the light quantity control filter is located at a position different from the air space.

With the sixth imaging system of such construction, the amount of movement of the lens groups upon zooming can be so increased that high zoom ratios are easily achievable.

According to the seventh aspect of the present invention, any one of the 1st to 6th imaging systems is further characterized in that the aperture stop is positioned such that a perpendicular going from the aperture stop down to the optical axis intersects the optical axis within a lens medium in the lens groups.

Since the aperture shape of the aperture stop is of invariable shape, it is possible to achieve such an arrangement, whereby much more size reductions are achievable.

According to the eighth aspect of the present invention, the seventh imaging system is further characterized in that the aperture stop is located in contact with any one of lens surfaces in the lens groups.

With the arrangement of the eighth imaging system, any stop alignment is so dispensed with that higher accuracy is achievable. In particular, it is easier to obtain the stop by the optical black painting of a lens surface.

According to the ninth aspect of the present invention, any one of the 1st to 8th imaging systems is further characterized in that the aperture stop is formed of an aperture plate having an aperture on the optical axis side.

With the arrangement of the ninth imaging system, the stop can be made thin.

According to the 10th aspect of the present invention, any one of the 1st to 9th imaging systems is further characterized in that:

the zoom lens comprises at least a lens group having negative refracting power and a lens group located just after the same with positive refracting power, wherein the spacing between the lens group having negative refracting power and the lens group having positive refracting power becomes narrower at the telephoto end than at the wide-angle end of the zoom lens, the aperture stop is located between the surface nearest to the image side in the lens group having negative refracting power and the image side-surface in the lens group having positive refracting power, and the light quantity control filter is located on the image plane side with respect to the aperture stop.

Advantages of the 10th imaging system of the present invention are now explained. When the negative lens group and the positive lens group are arranged in this order to form the zoom lens, it is preferable to interpose the aperture stop between the surface nearest to the image side of the zoom lens in the negative lens group and the surface, which faces the image side of the zoom lens, in the positive lens group, because the whole zoom lens can be made compact and it is easy to ensure the angle of view at the wide-angle end.

With the aperture stop located at such a position, the spreading of a light beam from there toward the image side does not become overly large, so that the light quantity control filter can be positioned on the image side with respect to the aperture stop. This is advantageous for size reductions because the filter itself can be made compact.

More specifically, according to the 11th aspect of the present invention, the 10th imaging system is further characterized in that the lens group having negative refracting power is located nearest to the object side of the zoom lens.

With the 11th imaging system of such construction, it is possible to achieve any of wide-angle arrangements, high zoom ratios, and size reductions.

More preferably, according to the 12th aspect of the present invention, the 10th imaging system is further characterized in that the zoom lens comprises, in order from its object side, the lens group having negative refracting power and the lens group having positive refracting power, wherein lens groups movable for zooming are defined by only two lens groups, i.e., the lens group having negative refracting power and the lens group having positive refracting power.

With the 12th imaging system of such a lens arrangement, it is possible to achieve any of wide-angle arrangements, high zoom ratios, and size reductions.

More preferably, according to the 13th aspect of the present invention, the 10th imaging system is further characterized in that the plurality of lens groups consist of, in order from its object side, only two lens groups, i.e., the lens group having negative refracting power and the lens group having positive refracting power.

With the 13th imaging system of such a lens arrangement, the construction of the zoom lens can be much more simplified.

According to the 14th aspect of the present invention, any one of the 10th to 13th imaging systems is further characterized in that the aperture stop is located in an air space just before the positive lens group having positive refracting power.

With the 14th imaging system of such a lens arrangement, light rays incident on the image pickup device can be as vertical to the image pickup plane as possible. Especially when the negative and the positive lens group are arranged in this order from the object side of the zoom lens, the negative lens group that is the first lens group can be located much nearer to the second lens group at the telephoto end, thereby making the length of the zoom lens much shorter relative to the amount of a decrease in the spacing between the first lens group and the second lens group.

With the aperture stop designed to move in unison with the lens group having positive refracting power, the construction of the lens barrel can be much more simplified.

According to the 15th aspect of the present invention, any one of the 10th to 14th imaging systems is further characterized in that the light quantity control filter is located in an air space just after the lens group having positive refracting power.

The 15th imaging system of such a lens arrangement is more preferable in that the filter is located at a position where a light beam does not largely spread out. This is particularly preferable for a two-group zoom lens comprising a negative lens group and a positive lens group because the light beam does not largely spread out.

According to the 16th aspect of the present invention, any one of the 1st to 15th imaging systems is further characterized by constantly satisfying the following condition (1):

$$0.01 < \alpha/\beta < 1.3 \tag{1}$$

where $\alpha$ is the axial distance from the aperture stop to the entrance surface of the light quantity control filter located on the image side with respect thereto, and $\beta$ is the axial distance from the entrance surface of the light quantity control filter to the image pickup plane of the electronic image pickup device.

Advantages of, and requirements for, the 16th imaging system of the present invention are now explained. The location of the filter near to the aperture stop is more preferable in that the size of the filter itself can be diminished. As the upper limit of 1.3 to condition (1) is exceeded, it is difficult to make the filter small. As the lower limit of 0.01 is not reached, on the other hand, the stop is too close to the filter, rendering it difficult to make the whole zoom lens compact.

The lower limit to condition (1) should be preferably 0.1 and more preferably 0.2, and the upper limit preferably 1.0, more preferably 0.8 and even more preferably 0.6.

Desirously, this condition should be satisfied all over the zooming zone or, alternatively, at least at the position where the stop is nearest to the image side in the zooming zone.

According to the 17th aspect of the present invention, any one of the 1st to 16th imaging systems is characterized by satisfying the following condition (2):

$$0.5 < \phi\beta/\phi\alpha < 1.5 \tag{2}$$

where $\phi\alpha$ is the maximum diameter of the aperture in the aperture stop and $\phi\beta$ is the maximum effective diameter (diagonal length) of the light quantity control filter.

The 17th imaging system of the present invention should preferably be constructed in such a way as to satisfy condition (2). As the lower limit of 0.5 is not reached, a light beam used for picking up images is highly likely to be shaded. As the upper limit of 1.5 is exceeded, on the other hand, the size of the filter becomes large.

The lower limit to condition (2) should be preferably 0.7 and more preferably 0.8, and the upper limit preferably 1.2 and more preferably 1.05.

Desirously, this condition (2) should be satisfied all over the zooming zone or, alternatively, at least at the position where the stop is nearest to the image side in the zooming zone.

According to the 18th aspect of the present invention, any one of the 1st to 17th imaging systems is further characterized in that the aperture stop is located in a variable space, both the lens surfaces just before and just after the aperture stop are concave on their image sides, and the aperture stop has a funnel-form outside shape concave toward the image side off and off the optical axis.

With the 18th imaging system of such a lens arrangement, the outside shape of the stop is configured following the contours of the lens surfaces just before and just after the stop so that both the lens surfaces can be nearer to the stop. It is understood that a lens surface having an optically blacked outside shape, too, is embraced in this conception.

According to the 19th aspect of the present invention, any one of the 1st to 18th imaging systems is further characterized in that the light quantity control filter can be inserted in or de-inserted from an optical path.

More preferably, according to the 20th aspect of the present invention, the 19th imaging system is further characterized in that, upon retracting from an optical axis, the light quantity control filter fluctuates in such a direction that the filter surface is parallel and close to the optical axis.

With the 20th imaging system of such construction, size reductions are achievable because it is unnecessary to make space allowed for the retraction of the filter around the zoom lens large away from the optical axis.

The present invention has been described specifically with reference to the light quantity control filter. In some cases, however, the prior art variable stop has also a shutter role. In those cases, instead of the filter or in addition to the filter, it is preferable to locate a shutter in the vicinity of the filter. Alternatively, it is acceptable to locate the filter and the shutter in another space with at least one lens interposed between them.

For instance, such embodiments as mentioned below are envisaged. The respective advantages are much the same except that the shutter is used instead of the filter.

According to the 21st aspect of the present invention, there is provided an imaging system comprising a zoom lens comprising a plurality of lens groups wherein a spacing between individual lens groups is varied to vary a focal length and an aperture stop located in an optical path for limiting at least an axial light beam diameter, and an electronic image pickup device located on an image side of the zoom lens, characterized in that:

the aperture stop has a fixed shape, and
a shutter is located on an optical axis of a space located at a position different from that of a space in which the aperture stop is located.

According to the 22nd aspect of the present invention, the 21st imaging system is further characterized in that the aperture stop is located between lens groups between which there is an air space variable upon zooming or focusing, and the shutter is located at a position different from the air space.

According to the 23rd aspect of the present invention, the 21st or the 22nd imaging system is further characterized in that the aperture stop is positioned such that a perpendicular going from the aperture stop down to the optical axis intersects the optical axis within a lens medium in the lens groups.

According to the 24th aspect of the present invention, the 23rd imaging system is further characterized in that the aperture stop is located in contact with any one of lens surfaces in the lens groups.

According to the 25th aspect of the present invention, any one of the 21st to 24th imaging systems is further characterized in that the aperture stop is formed of an aperture plate having an aperture on an optical axis side.

According to the 26th aspect of the present invention, any one of the 21st to 25th imaging systems is further characterized in that:

the zoom lens comprises at least a lens group having negative refracting power and a lens group located just after the same with positive refracting power, wherein the spacing between the lens group having negative refracting power and the lens group having positive refracting power becomes narrower at the telephoto end than at the wide-angle end of the zoom lens,
the aperture stop is located between the surface nearest to the image side in the lens group having negative refracting power and the image side-surface in the lens group having positive refracting power, and
the shutter is located on the image plane side with respect to the aperture stop.

According to the 27th aspect of the present invention, the 26th imaging system is further characterized in that the lens group having negative refracting power is located nearest to the object side of the zoom lens.

According to the 28th aspect of the present invention, the 26th imaging system is further characterized in that the zoom lens comprises, in order from its object side, the lens group having negative refracting power and the lens group having positive refracting power, wherein lens groups movable for zooming are defined by only two lens groups, i.e., the lens group having negative refracting power and the lens group having positive refracting power.

According to the 29th aspect of the present invention, the 26th imaging system is further characterized in that the plurality of lens groups consist of, in order from its object side, only two lens groups, i.e., the lens group having negative refracting power and the lens group having positive refracting power.

According to the 30th aspect of the present invention, any one of the 26th to 29th imaging systems is further characterized in that the aperture stop is located in an air space just before the lens group having positive refracting power.

According to the 31st aspect of the present invention, any one of the 26th to 30th imaging systems is further characterized in that the shutter is located in an air space just after the lens group having positive refracting power.

According to the 32nd aspect of the present invention, any one of the 21st to 31st imaging systems is further characterized by constantly satisfying the following condition (3):

$$0.01 < \alpha'/\beta' < 1.3 \qquad (3)$$

where $\alpha'$ is the axial distance from the aperture stop to the shutter located on the image side with respect thereto, and $\beta'$ is the axial distance from the shutter to the image pickup plane of the electronic image pickup device.

The lower limit to condition (3) should be preferably 0.1 and more preferably 0.2, and the upper limit preferably 1.0, more preferably 0.8 and even more preferably 0.6.

Desirously, this condition should be satisfied all over the zooming zone or, alternatively, at least at the position where the stop is nearest to the image side in the zooming zone.

According to the 33rd aspect of the present invention, any one of the 21st to 32nd imaging systems is characterized by satisfying the following condition (4):

$$0.5 < \phi\beta'/\phi\alpha' < 1.5 \qquad (4)$$

where $\phi\alpha'$ is the maximum diameter of the aperture in the aperture stop and $\phi\beta'$ is the maximum effective diameter (diagonal length) of the shutter.

The lower limit to condition (4) should be preferably 0.7 and more preferably 0.8, and the upper limit preferably 1.2 and more preferably 1.05.

Desirously, this condition (4) should be satisfied all over the zooming zone or, alternatively, at least at the position where the stop is nearest to the image size in the zooming zone.

According to the 34th aspect of the present invention, any one of the 21st to 33rd imaging systems is further characterized in that the aperture stop is located in a variable space, both the lens surfaces just before and just after the aperture stop are concave on their image sides, and the aperture stop has a funnel-form outside shape concave toward the image side off and off the optical axis.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

First of all, Examples 1 to 12 of the zoom lens used with the imaging system of the invention are explained. FIGS. 1 to 12 are sectional views of these zoom lenses at the wide-angle end (a), in an intermediate state (b) and at the telephoto end (c) upon focused on an infinite object point. In FIGS. 1 to 12, the first lens group is indicated by G1, the second lens group by G2, the third lens group by G3, the fourth lens group by G4, an optical path-bending prism by P, a low-pass filter having a near-infrared sharp cut coat by F, a cover glass for a CCD that is an electronic image pickup device by C, a plane-parallel plate that integrates the low-pass filter with the CCD cover glass and has a wavelength selective coat by F', and an image plane of the CCD by I. The optical low-pass filter F and the cover glass C located in order from the object side is fixed between the second G2 or the fourth lens group G4 and the image plane I. The light quantity control (ND) filter or shutter position is indicated by N. It is acceptable to use both the light quantity control filter and the light quantity control shutter.

EXAMPLE 1

Figure 1A:
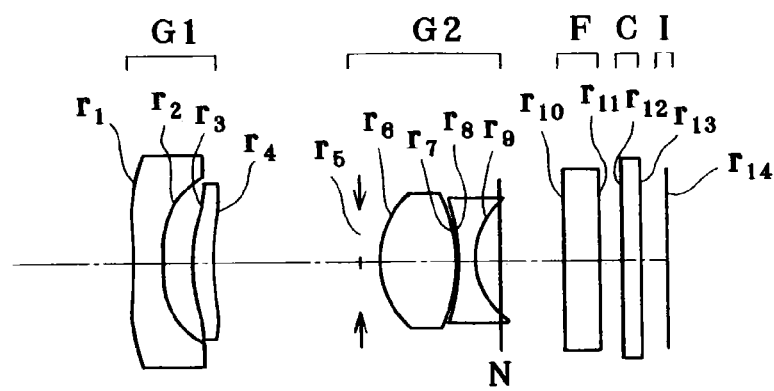
FIGS. 1(a), 1(b) and 1(c) are illustrative in section of Example 1 of the zoom lens used with the imaging system of the invention at the wide-angle end upon focused on an infinite object point.
Figure 1B:
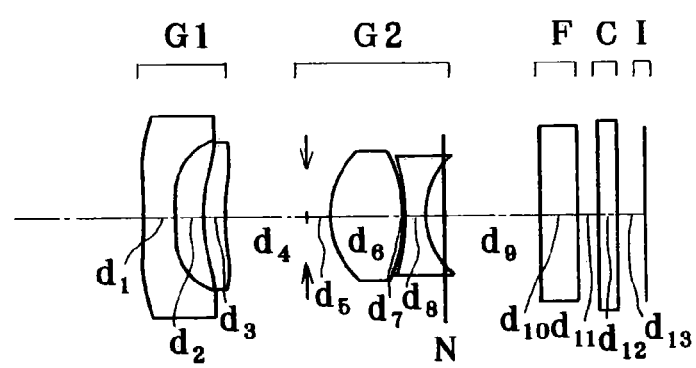
Figure 1C:
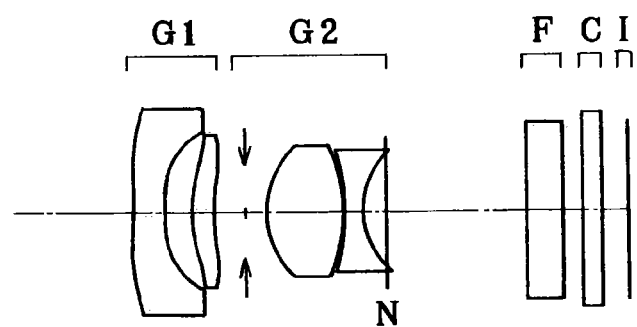

As shown in FIG. 1, the zoom lens of Example 1 is made up of a first lens group G1 having negative refracting power and a second lens group G2 having positive refracting power. For zooming from the wide-angle end to the telephoto end of the zoom lens upon focused on an infinite object point, the first lens group G1 moves toward the image plane side and the second lens group G2 moves toward the object side while the spacing between the first lens group G1 and the second lens group G2 becomes narrow.

In Example 1, the first lens group G1 is made up of a double-concave lens and a positive meniscus lens convex on its object side. The second lens group G2 is made up of a stop, a double-convex lens located in the rear thereof and a negative meniscus lens convex on its object side. Aspheric surfaces are used for all of eight lens surfaces.

Then, the light quantity control filter or shutter is located at a position 1 mm farther off the image side-surface of the negative meniscus lens in the second lens group G2 in such a way that it moves axially together with the second lens group G2.

EXAMPLE 2

Figure 2A:
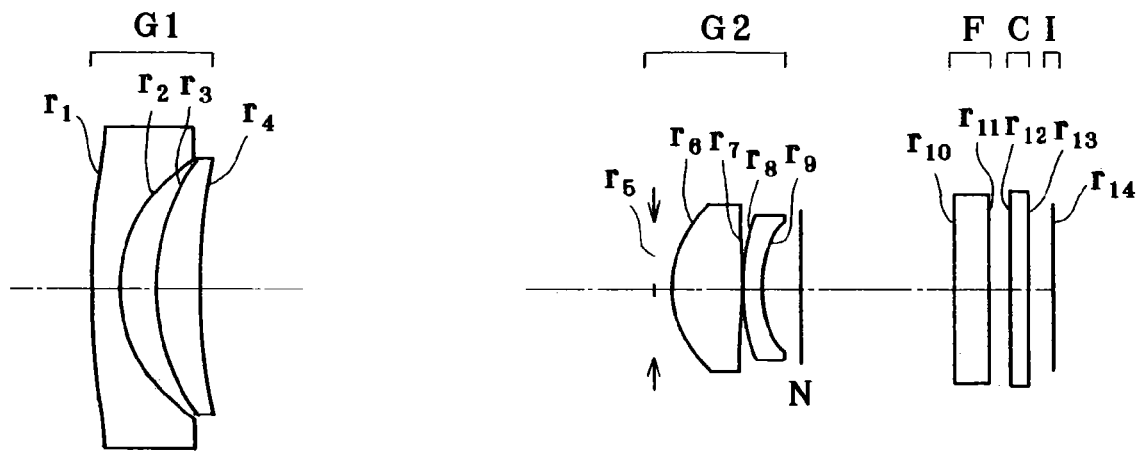
FIGS. 2(a), 2(b) and 2(c) are views for Example 2 of the zoom lens, similar to FIGS. 1(a), 1(b) and 1(c).
Figure 2B:
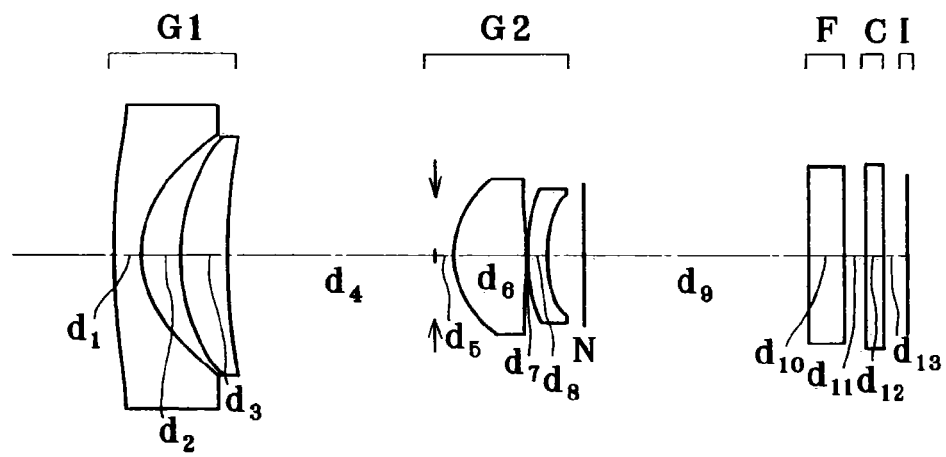
Figure 2C:
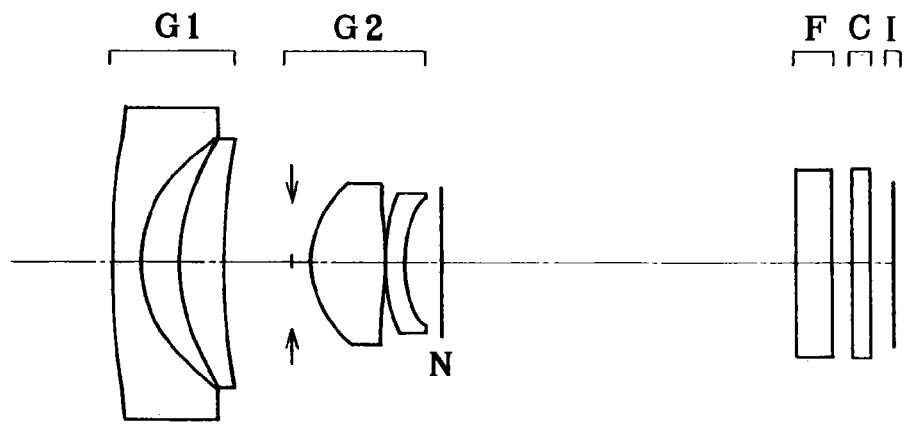

As shown in FIG. 2, the zoom lens of Example 2 is made up of a first lens group G1 having negative refracting power and a second lens group G2 having positive refracting power. For zooming from the wide-angle end to the telephoto end of the zoom lens upon focused on an infinite object point, the first lens group G1 moves toward the image plane side and the second lens group G2 moves toward the object side with a narrowing space between them.

In Example 2, the first lens group G1 is made up of a negative meniscus lens convex on its object side and a positive meniscus lens convex on its object side. The second lens group G2 is made up of a stop, a double-convex lens located in the rear thereof and a negative meniscus lens convex on its object side. Aspheric surfaces are used for all of eight lens surfaces.

Then, the light quantity control filter or shutter is located at a position 1.5 mm farther off the image side-surface of the negative meniscus lens in the second lens group G2 in such a way that it moves axially together with the second lens group G2.

EXAMPLE 3

Figure 3A:
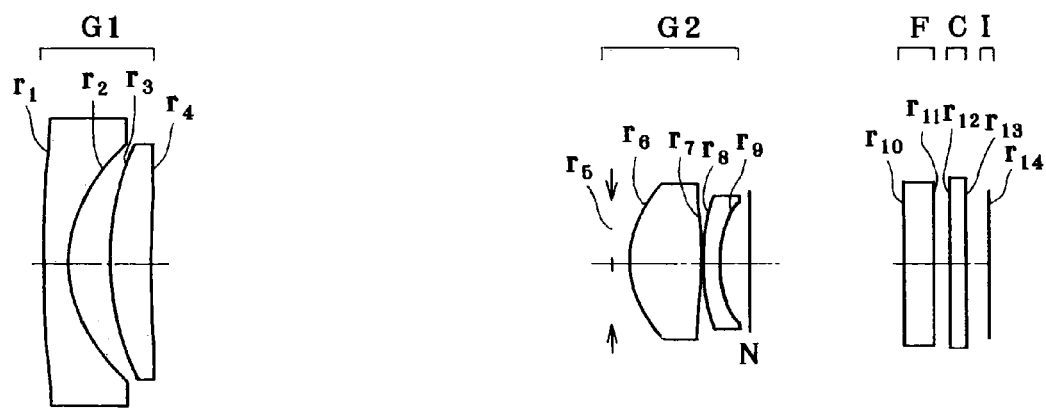
FIGS. 3(a), 3(b) and 3(c) are views for Example 3 of the zoom lens, similar to FIGS. 1(a), 1(b) and 1(c).
Figure 3B:
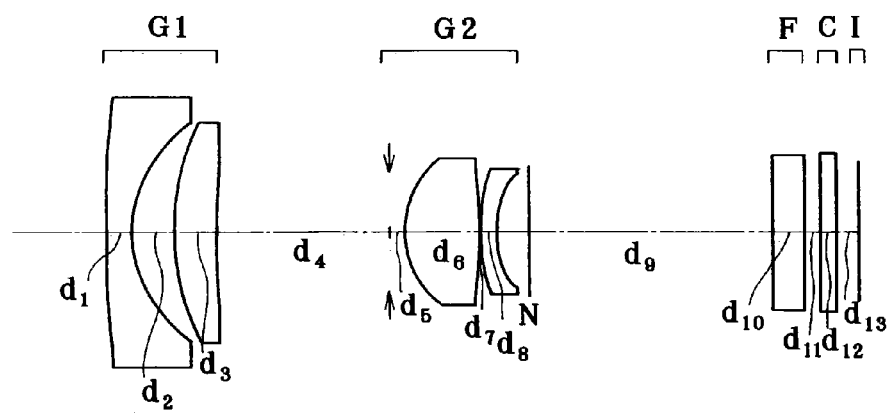
Figure 3C:
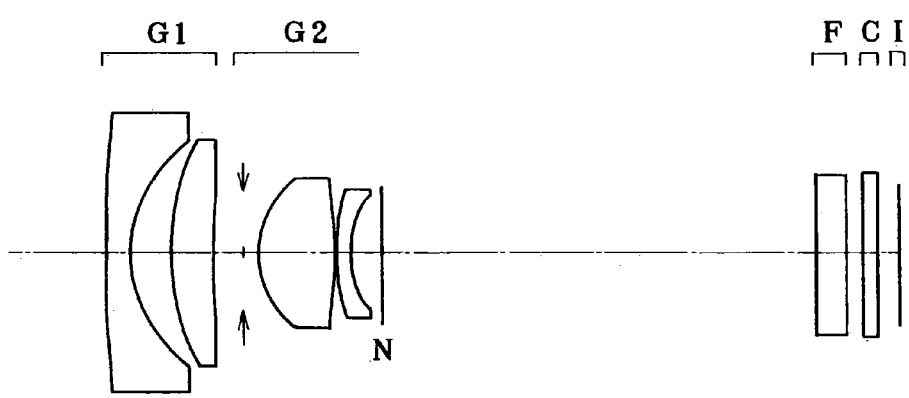

As shown in FIG. 3, the zoom lens of Example 3 is made up of a first lens group G1 having negative refracting power and a second lens group G2 having positive refracting power. For zooming from the wide-angle end to the telephoto end of the zoom lens upon focused on an infinite object point, the first lens group G1 moves toward the object side along a concave locus and comes nearer to the image plane side at the telephoto end than at the wide-angle end. The second lens group G2 moves toward the object side with a narrowing space between the first lens group G1 and the second lens group G2.

In Example 3, the first lens group G1 consists of a double-concave lens and a positive meniscus lens convex on its object side, and the second lens group G2 consists of a stop, a double-convex lens located in the rear thereof and a negative meniscus lens convex on its object side. Aspheric surfaces are used for all of eight lens surfaces.

Then, the light quantity control filter or shutter is located at a position 1.5 mm farther off the image side-surface of the negative meniscus lens in the second lens group G2 in such a way that it moves axially together with the second lens group G2.

EXAMPLE 4

Figure 4A:
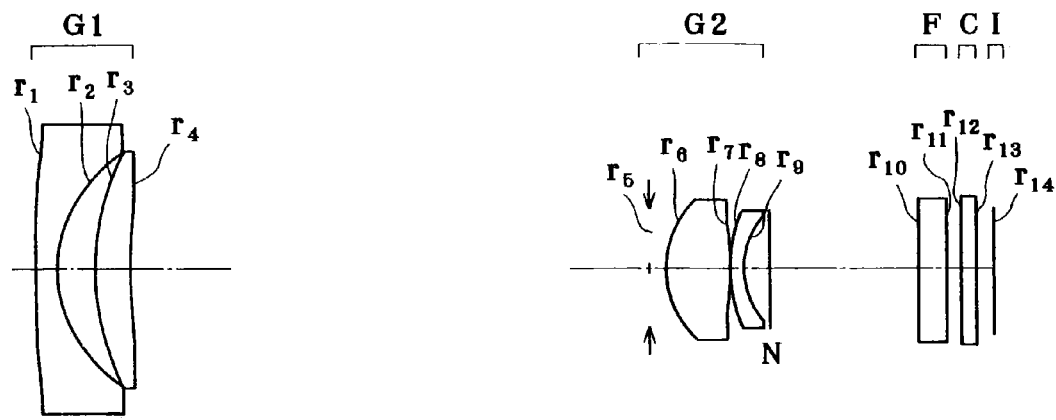
FIGS. 4(a), 4(b) and 4(c) are views for Example 4 of the zoom lens, similar to FIGS. 1(a), 1(b) and 1(c).
Figure 4B:
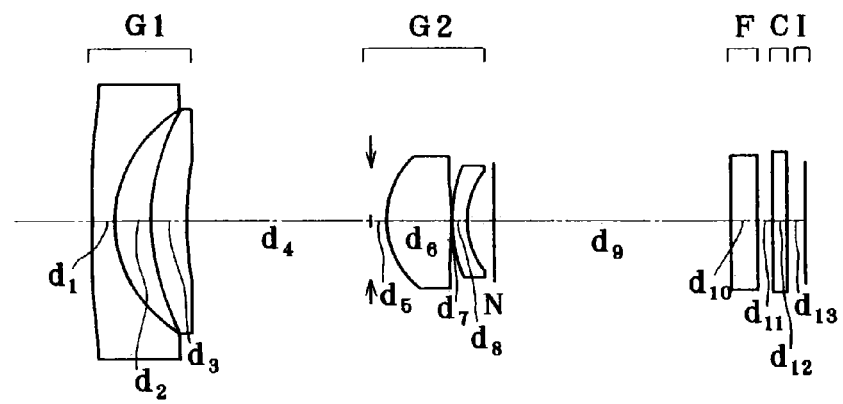
Figure 4C:
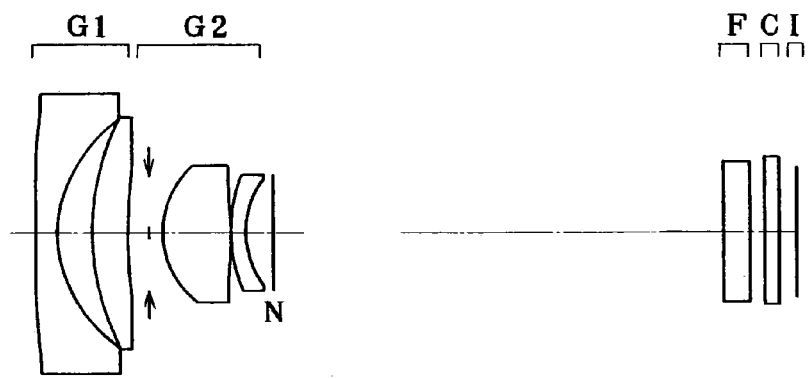

As shown in FIG. 4, the zoom lens of Example 4 is made up of a first lens group G1 having negative refracting power and a second lens group G2 having positive refracting power. For zooming from the wide-angle end to the telephoto end of the zoom lens upon focused on an infinite object point, the first lens group G1 moves toward the object side along a concave locus and comes nearer to the image plane side at the telephoto end than at the wide-angle end. The second lens group G2 moves toward the object side with a narrowing space between the first lens group G1 and the second lens group G2.

In Example 4, the first lens group G1 consists of a double-concave lens and a positive meniscus lens convex on its object side, and the second lens group G2 consists of a stop, a double-convex lens located in the rear thereof and a negative meniscus lens convex on its object side. Aspheric surfaces are used for all of eight lens surfaces.

Then, the light quantity control filter or shutter is located at a position 1.5 mm farther off the image side-surface of the negative meniscus lens in the second lens group G2 in such a way that it moves axially together with the second lens group G2.

EXAMPLE 5

Figure 5A:
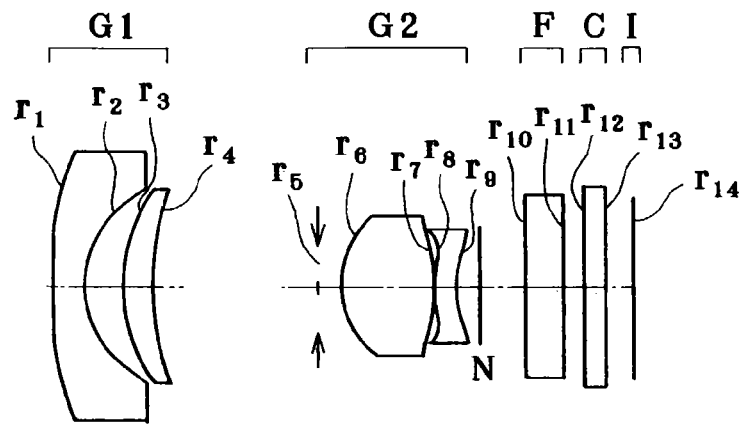
FIGS. 5(a), 5(b) and 5(c) are views for Example 5 of the zoom lens, similar to FIGS. 1(a), 1(b) and 1(c).
Figure 5B:
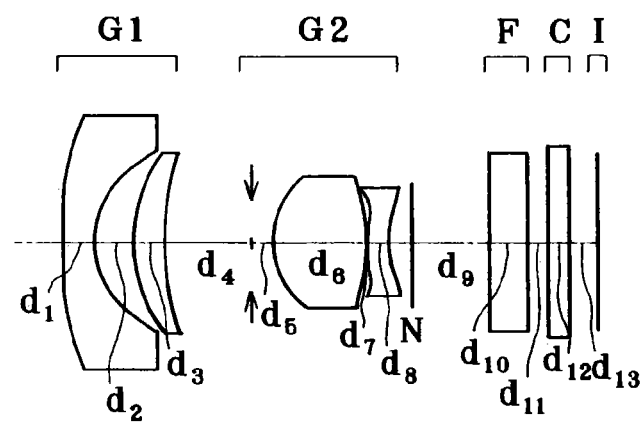
Figure 5C:
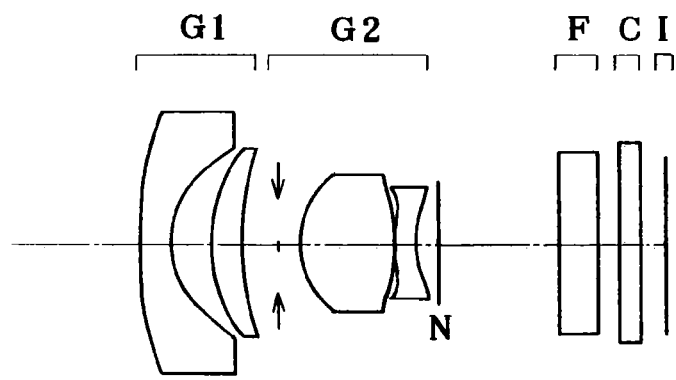

As shown in FIG. 5, the zoom lens of Example 5 is made up of a first lens group G1 having negative refracting power and a second lens group G2 having positive refracting power. For zooming from the wide-angle end to the telephoto end of the zoom lens upon focused on an infinite object point, the first lens group G1 moves toward the image plane side and the second lens group G2 moves toward the object side while the spacing between the first lens group G1 and the second lens group G2 becomes narrow.

In Example 5, the first lens group G1 consists of a negative meniscus lens convex on its object side and a positive meniscus lens convex on its object side, and the second lens group G2 consists of a stop, a double-convex lens located in the rear thereof and a negative meniscus lens convex on its object side. Aspheric surfaces are used for all of eight lens surfaces.

Then, the light quantity control filter or shutter is located at a position 1.0 mm farther off the image side-surface of the negative meniscus lens in the second lens group G2 in such a way that it moves axially together with the second lens group G2.

EXAMPLE 6

Figure 6A:
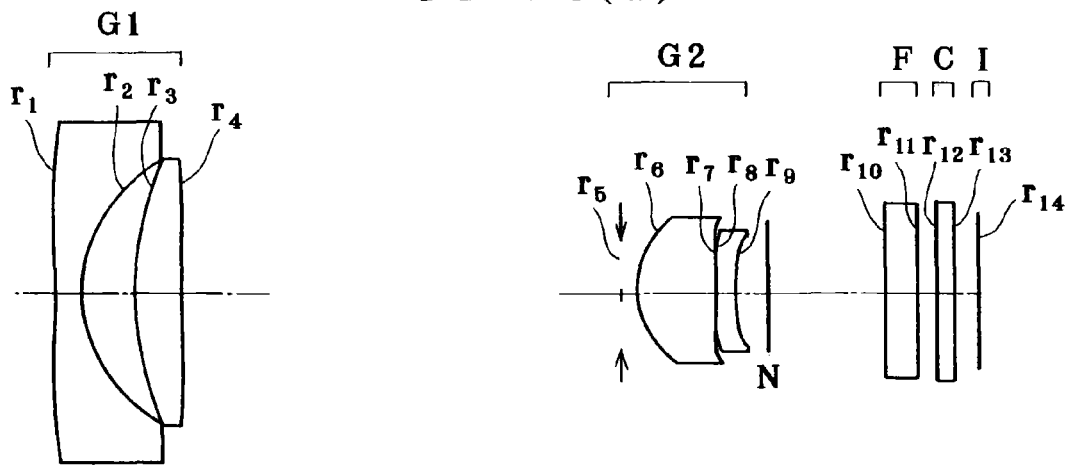
FIGS. 6(a), 6(b) and 6(c) are views for Example 6 of the zoom lens, similar to FIGS. 1(a), 1(b) and 1(c).
Figure 6B:
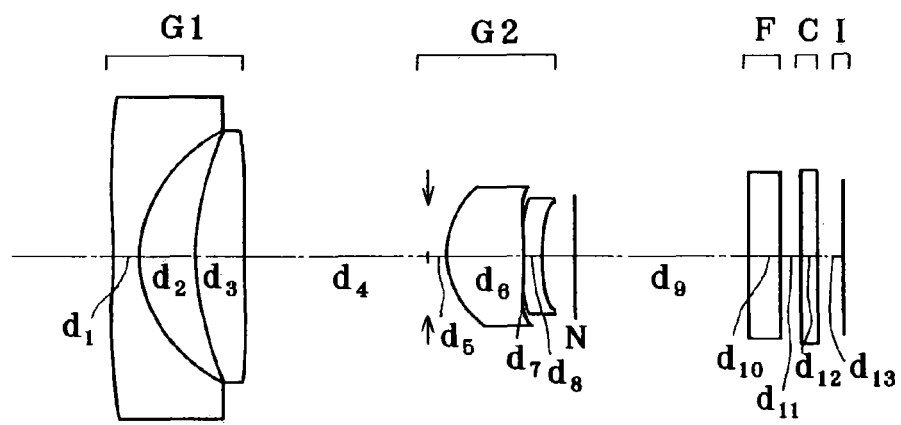
Figure 6C:
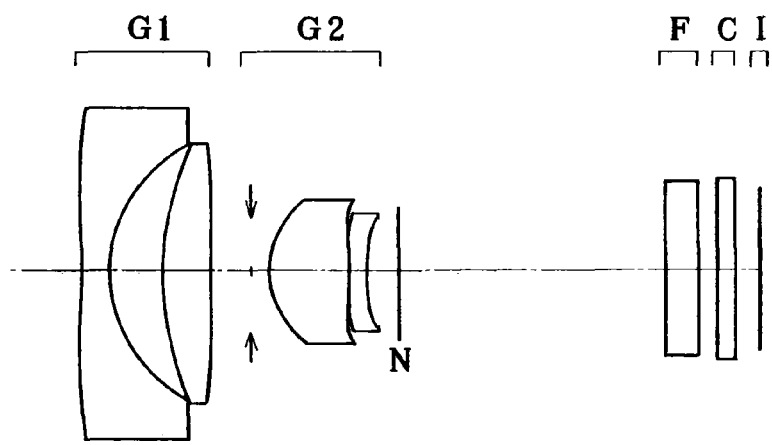

As shown in FIG. 6, the zoom lens of Example 6 is made up of a first lens group G1 having negative refracting power and a second lens group G2 having positive refracting power. For zooming from the wide-angle end to the telephoto end of the zoom lens upon focused on an infinite object point, the first lens group G1 moves toward the image plane side and the second lens group G2 moves toward the object side while the spacing between the first lens group G1 and the second lens group G2 becomes narrow.

In Example 6, the first lens group G1 consists of a double-concave lens and a positive meniscus lens convex on its object side, and the second lens group G2 consists of a stop, a double-convex lens located in the rear thereof and a double-concave lens. Aspheric surfaces are used for all of eight lens surfaces.

Then, the light quantity control filter or shutter is located at a position 1.5 mm farther off the image side-surface of the double-concave lens in the second lens group G2 in such a way that it moves axially together with the second lens group G2.

EXAMPLE 7

Figure 7A:
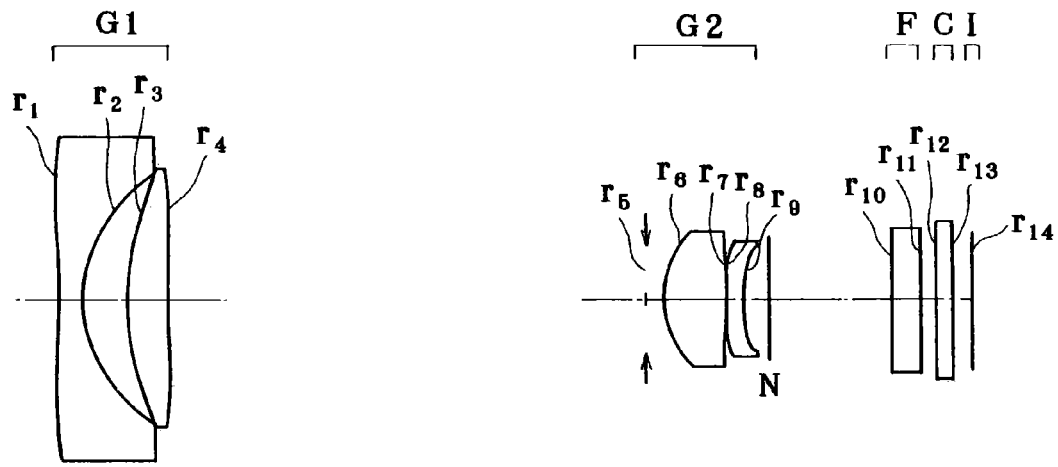
FIGS. 7(a), 7(b) and 7(c) are views for Example 7 of the zoom lens, similar to FIGS. 1(a), 1(b) and 1(c).
Figure 7B:
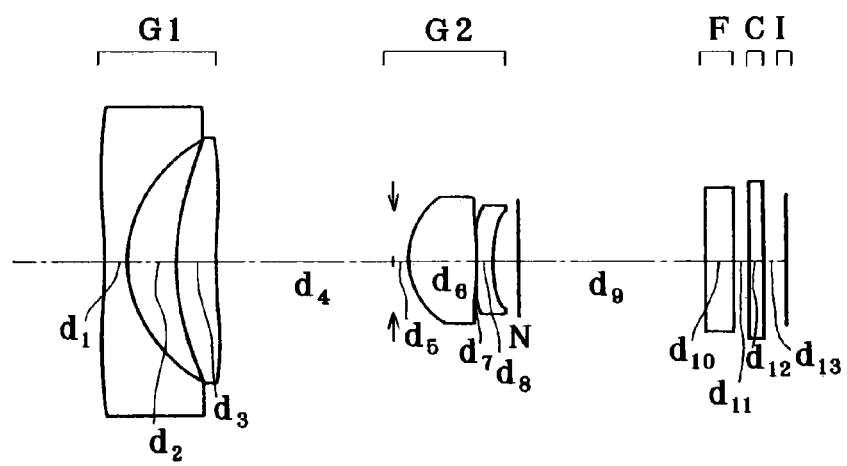
Figure 7C:
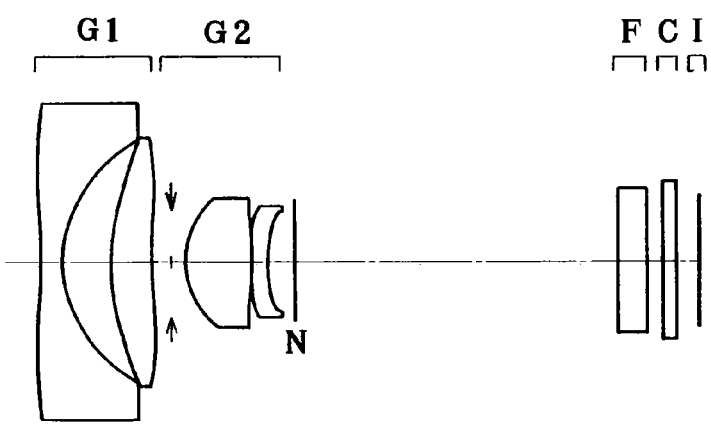

As shown in FIG. 7, the zoom lens of Example 7 is made up of a first lens group G1 having negative refracting power and a second lens group C2 having positive refracting power. For zooming from the wide-angle end to the telephoto end of the zoom lens upon focused on an infinite object point, the first lens group G1 moves toward the image plane side and the second lens group G2 moves toward the object side while the spacing between the first lens G1 and the second lens group G2 becomes narrow.

In Example 7, the first lens group G1 consists of a double-concave lens and a positive meniscus lens convex on its object side, and the second lens group G2 consists of a stop, a double-convex lens located in the rear thereof and a double-concave lens. Aspheric surfaces are used for all of eight lens surfaces.

Then, the light quantity control filter or shutter is located at a position 1.5 mm farther off the image side-surface of the double-concave lens in the second lens group G2 in such a way that it moves axially together with the second lens group G2.

EXAMPLE 8

Figure 8A:
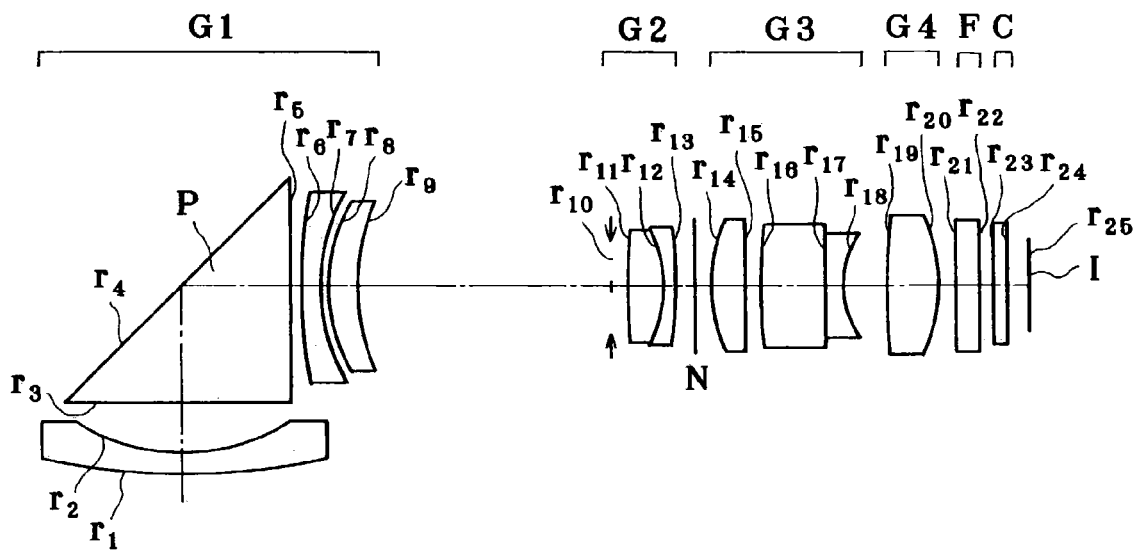
FIGS. 8(a), 8(b) and 8(c) are views for Example 8 of the zoom lens, similar to FIGS. 1(a), 1(b) and 1(c).
Figure 8B:
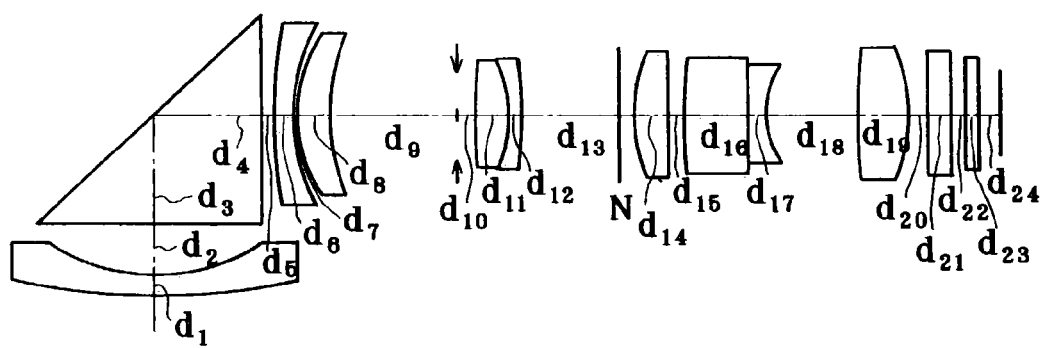
Figure 8C:
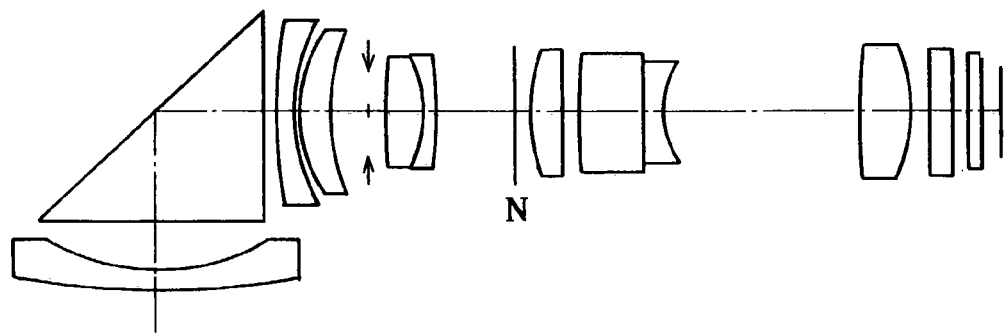

As shown in FIG. 8, the zoom lens of Example 8 is built up of a first lens group G1 composed of a negative meniscus lens convex on its object side, an optical-path bending prism P, a negative meniscus lens convex on its object side and a positive meniscus lens convex on its object side, a second lens group G2 composed of an aperture stop and a doublet consisting of a double-convex positive lens and a negative meniscus lens convex on its image plane side, a third lens group G3 composed of a positive meniscus lens convex on its object side and a doublet consisting of a planoconvex positive lens and a planoconcave lens, and a fourth lens group G4 composed of one double-convex positive lens. For zooming from the wide-angle end to the telephoto end of the zoom lens, the first lens group G1 remains fixed, the second lens group G2 moves monotonously toward the object side, the third lens group G3 moves monotonously toward the object side in such a way that its spacing with the second lens group G2 becomes wide and then narrow, and the fourth lens group G4 remains fixed. For focusing on a nearby subject, the third lens group G3 moves toward the object side.

Three aspheric surfaces are used, one at the image plane side-surface of the negative meniscus lens in the rear of the optical path-bending prism P in the first lens group G1, one at the object side-surface of the positive meniscus lens in the third lens group G3, and one at the image plane side-surface of the double-convex positive lens in the fourth lens group G4.

Then, the light quantity control filter or shutter is located 1.0 mm farther off the object side of the positive meniscus lens in the third lens group G3 in such a way that it moves axially together with the third lens group G3.

EXAMPLE 9

Figure 9A:
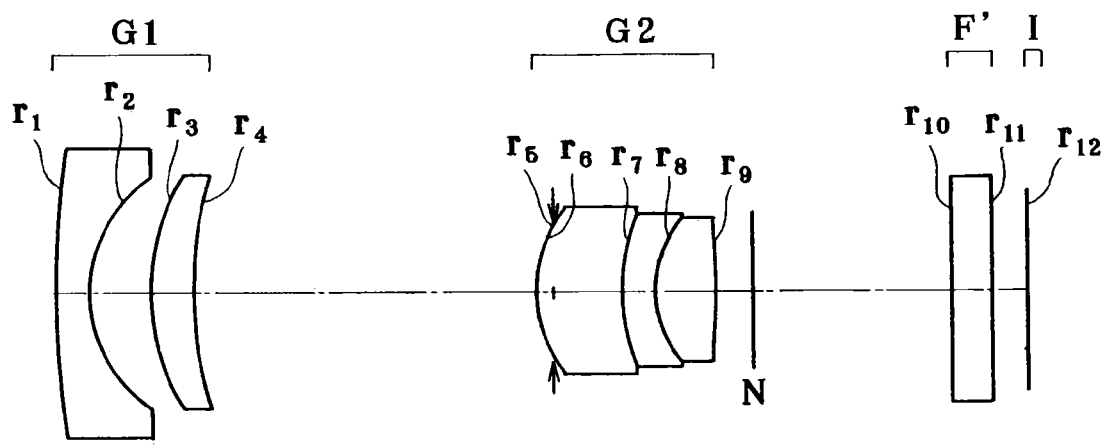
FIGS. 9(a), 9(b) and 9(c) are views for Example 9 of the zoom lens, similar to FIGS. 1(a), 1(b) and 1(c).
Figure 9B:
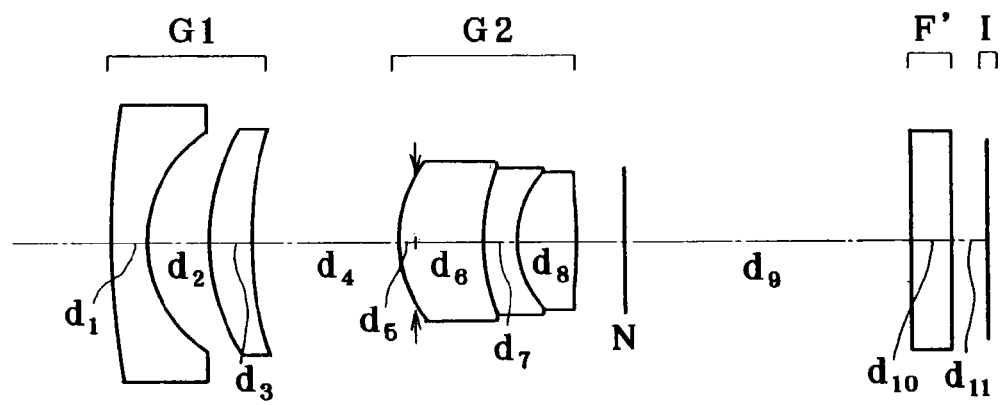
Figure 9C:
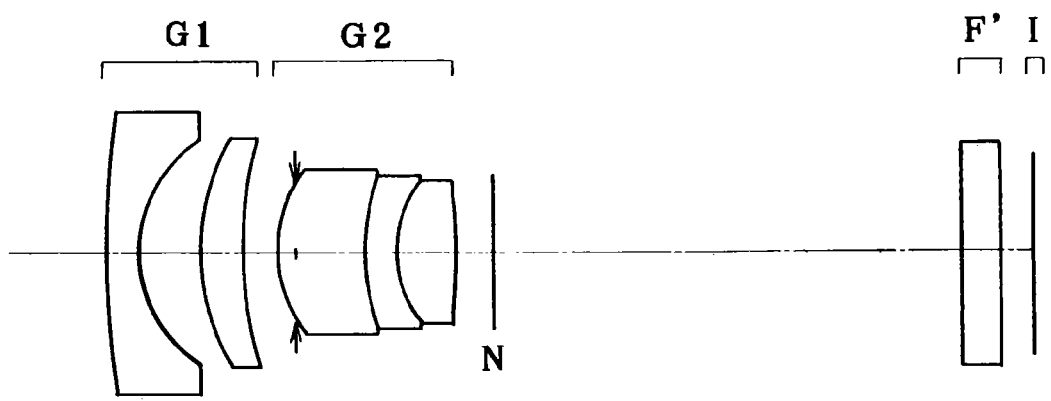

As shown in FIG. 9, the zoom lens of Example 9 is made up of a first lens group G1 having negative refracting power and a second lens group G2 having positive refracting power. For zooming from the wide-angle end to the telephoto end of the zoom lens upon focused on an infinite object point, the first lens group G1 moves toward the object side along a concave locus and comes nearer to the image plane side at the telephoto end than at the wide-angle end, and the second lens group G2 moves toward the object side. In the meantime, the spacing between the first lens group G1 and the second lens group G2 becomes narrow.

In Example 9, the first lens group G1 is composed of a negative meniscus lens convex on its object side and a positive meniscus lens convex on its object side, and the second lens group G2 is composed of a stop and a triplet consisting of a positive meniscus lens convex on its object side, located in the rear thereof, a negative meniscus lens convex on its object side and a double-convex positive lens. The stop has a round shape as viewed from its entrance side, and is formed by optically blacking the entrance convex surface in the second lens group G2. Thus, the stop is located at a position N on the image side with respect to the entrance side surface vertex in the second lens group G2, and the spacing between the stop and the entrance convex surface in the numerical data given later has a minus value. Three aspheric surfaces are used, one at the image plane side-surface of the negative meniscus lens in the first lens group G1, one at the object side-surface of the triplet in the second lens group G2 and one at the image plane side-surface of the triplet in the second lens group G2.

Then, the light quantity control filter or shutter is located 1.0 mm farther off the image side of the triplet in the second lens group G2 in such a way that it moves axially together with the second lens group G2.

EXAMPLE 10

Figure 10A:
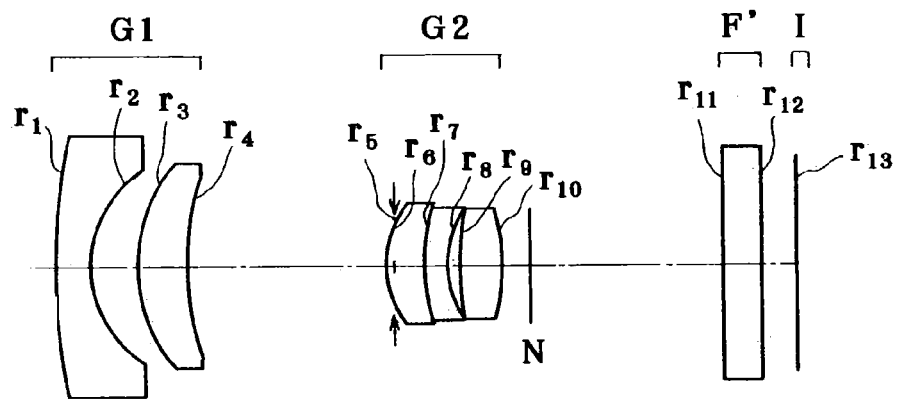
FIGS. 10(a), 10(b) and 10(c) are views for Example 10 of the zoom lens, similar to FIGS. 1(a), 1(b) and 1(c).
Figure 10B:
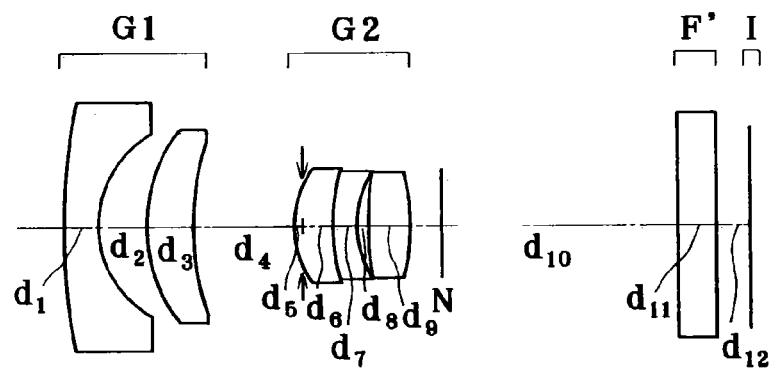
Figure 10C:
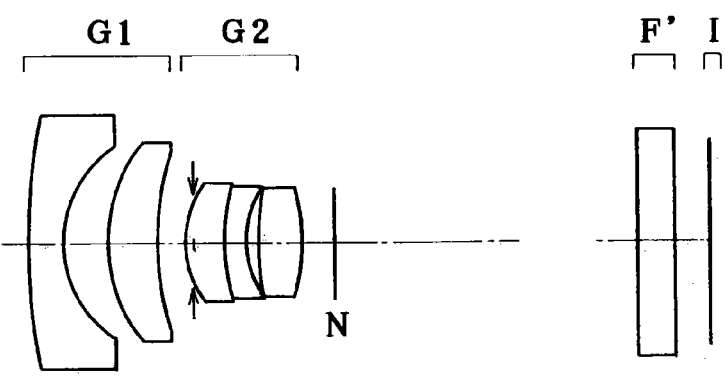

As shown in FIG. 10, the zoom lens of Example 10 is made up of a first lens group G1 having negative refracting power and a second lens group G2 having positive refracting power. For zooming from the wide-angle end to the telephoto end of the zoom lens upon focused on an infinite object point, the first lens group G1 moves toward the image plane side, and the second lens group G2 moves toward the object side. In the meantime, the spacing between the first lens group G1 and the second lens group G2 becomes narrow.

In Example 10, the first lens group G1 is composed of a negative meniscus lens convex on its object side and a positive meniscus lens convex on its object side, and the second lens group G2 is composed of a stop, a doublet consisting of a positive meniscus lens convex on its object side, located on in the rear thereof and a negative meniscus lens convex on its object side and a positive single lens. The stop has a round shape as viewed from its entrance side, and is formed by optically blacking the entrance convex surface in the second lens group G2. Thus, the stop is located at a position N on the image side with respect to the entrance side surface vertex in the second lens group G2, and the spacing between the stop and the entrance convex surface in the numerical data given later has a minus value. Two aspheric surfaces are used, one at the image plane side-surface of the negative meniscus lens in the first lens group G1, and another at the surface located nearest to the object side in the second lens group G2.

Then, the light quantity control filter or shutter is located 1.0 mm farther off the image side of the positive single lens in the second lens group G2 in such a way that it moves axially together with the second lens group G2.

EXAMPLE 11

Figure 11A:
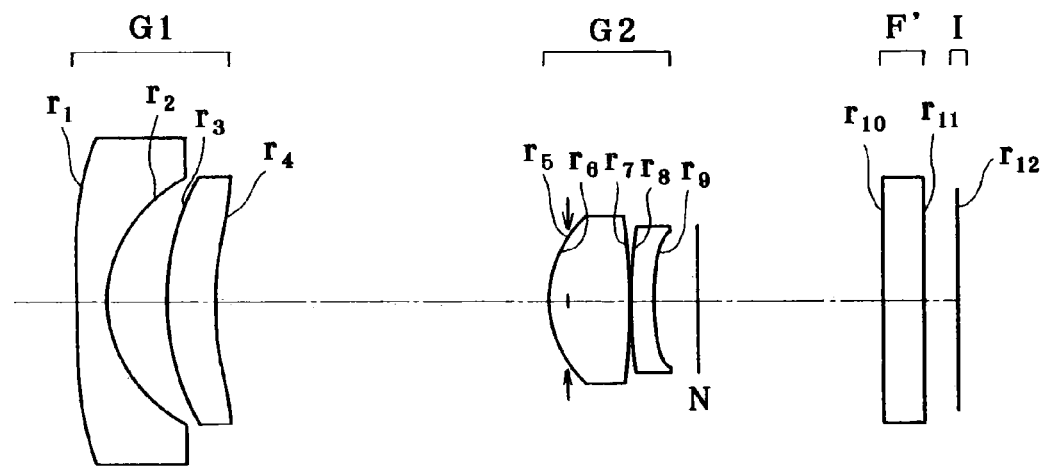
FIGS. 11(a), 11(b) and 11(c) are views for Example 11 of the zoom lens, similar to FIGS. 1(a), 1(b) and 1(c).
Figure 11B:
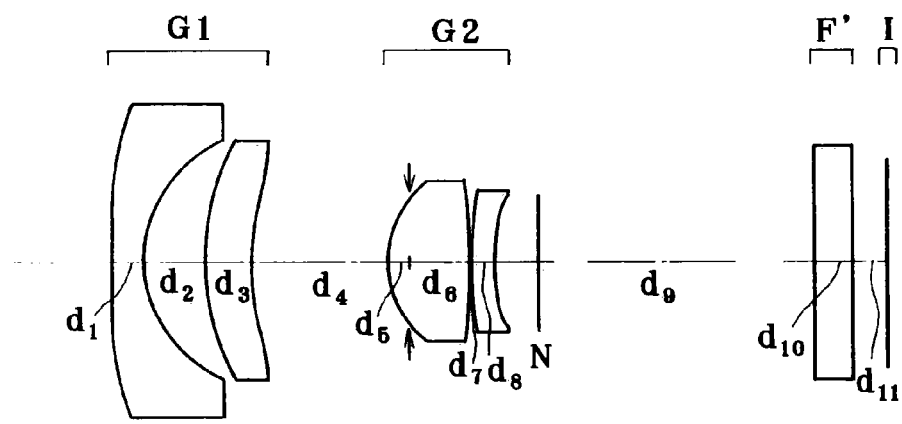
Figure 11C:
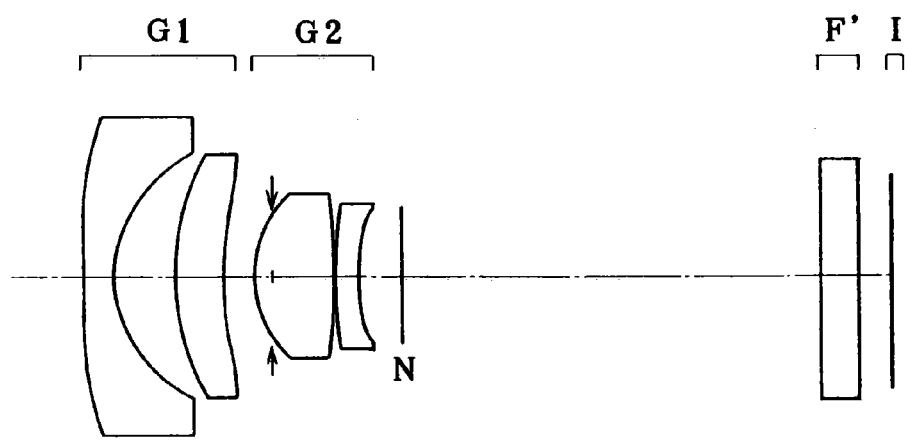

As shown in FIG. 11, the zoom lens of Example 11 is made up of a first lens group G1 having negative refracting power and a second lens group G2 having positive refracting power. For zooming from the wide-angle end to the telephoto end of the zoom lens upon focused on an infinite object point, the first lens group G1 moves toward the object side along in a concave locus, and comes nearer to the image plane side at the telephoto end than at the wide-angle end, and the second lens group G2 moves toward the object side. In the meantime, the spacing between the first lens group G1 and the second lens group G2 becomes narrow.

In Example 11, the first lens group G1 consists of a negative meniscus lens convex on its object side and a positive meniscus lens convex on its object side, and the second lens group G2 consists of a stop, a double-convex positive lens located in the rear thereof and a negative meniscus lens convex on its object side. The stop has a round shape as viewed from its entrance side, and is formed by optically blacking the entrance convex surface in the second lens group C2. Thus, the stop is located at a position N on the image side with respect to the entrance side surface vertex in the second lens group G2, and the spacing between the stop and the entrance convex surface in the numerical data given later has a minus value. Aspheric surfaces are used for all of eight lens surfaces.

Then, the light quantity control filter or shutter is located 1.5 mm farther off the image side of the negative meniscus lens in the second lens group G2 in such a way that it moves axially together with the second lens group G2.

EXAMPLE 12

Figure 12A:
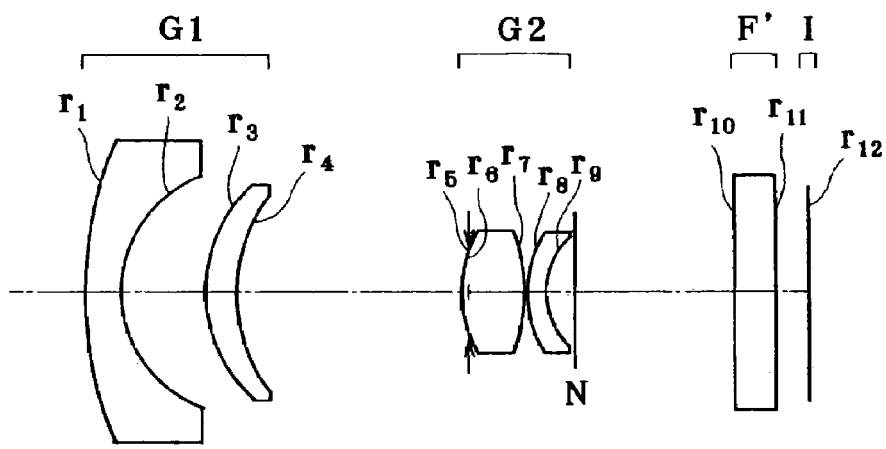
FIGS. 12(a), 12(b) and 12(c) are views for Example 12 of the zoom lens, similar to FIGS. 1(a), 1(b) and 1(c).
Figure 12B:
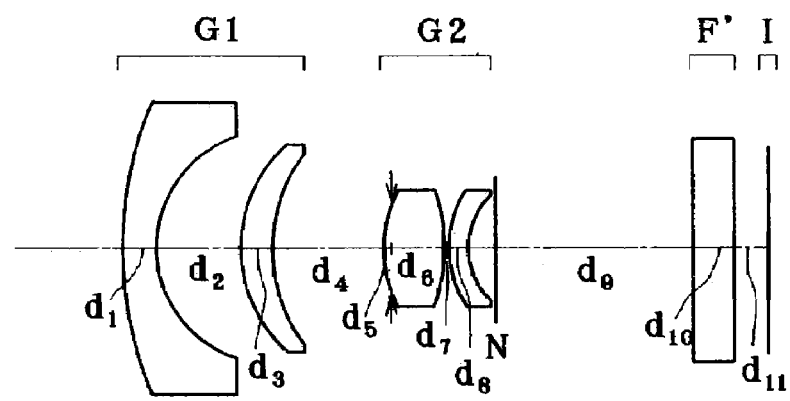
Figure 12C:
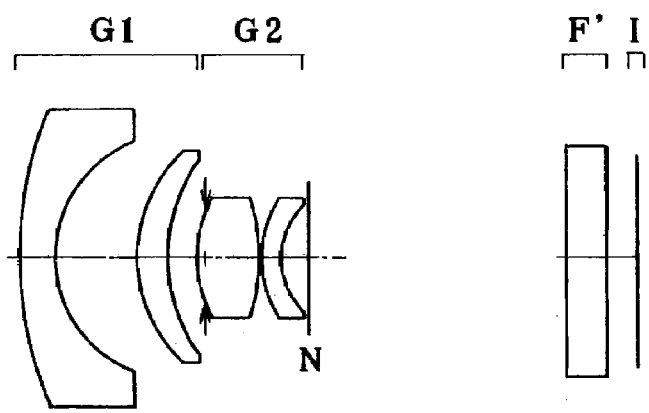
Figure 13A:
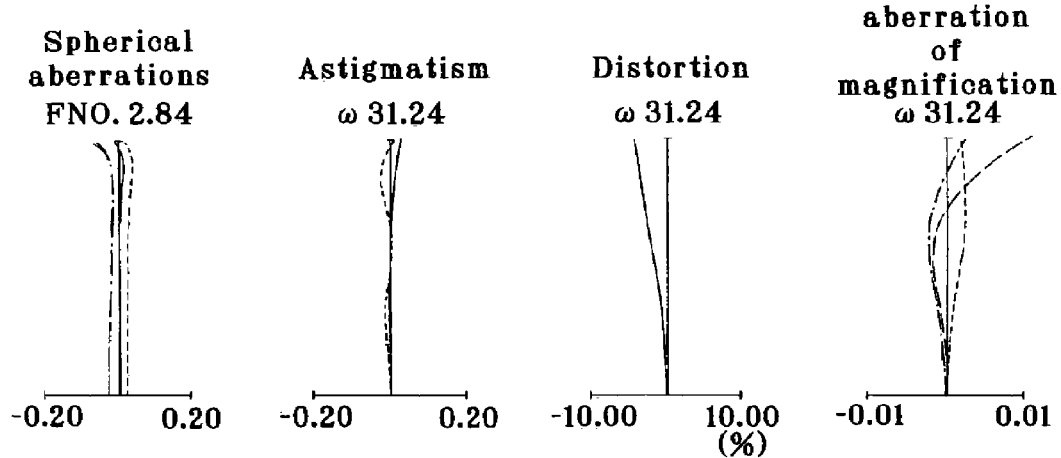
FIGS. 13(a), 13(b) and 13(c) are aberration diagrams for Example 1 upon focused on an infinite object point.
Figure 13B:
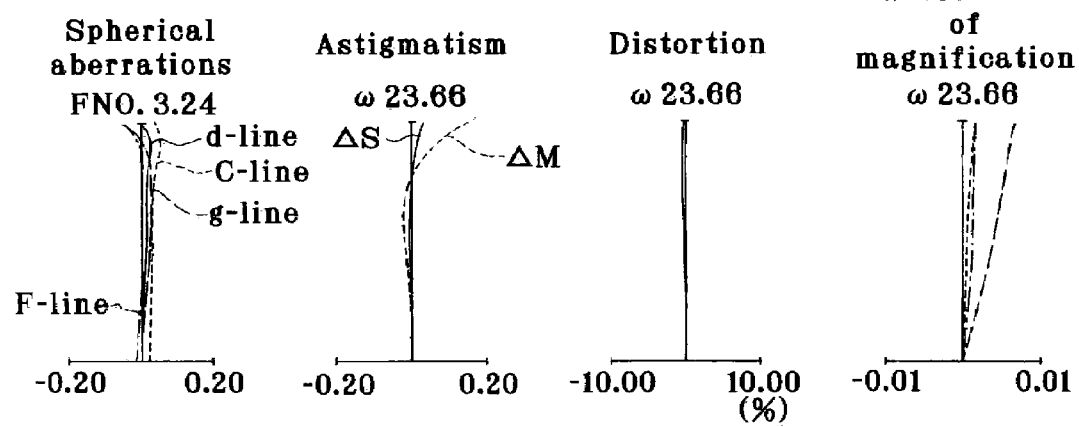
Figure 13C:
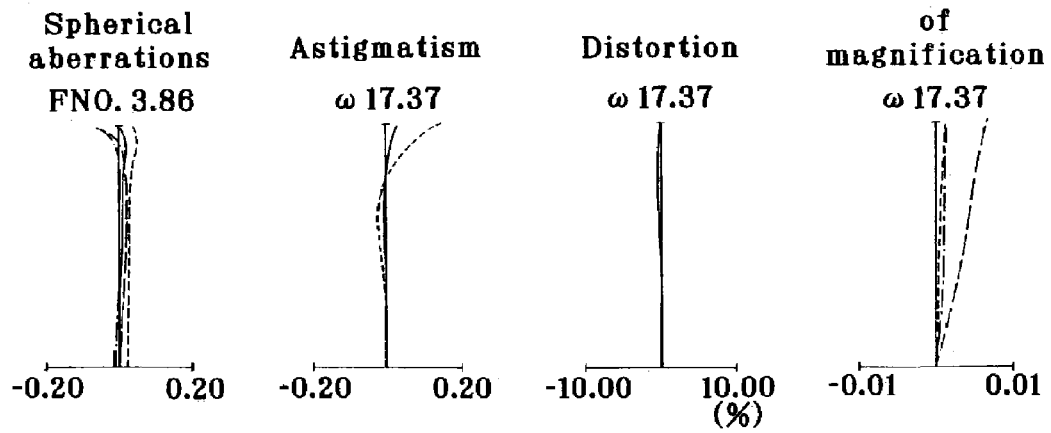
Figure 14A:
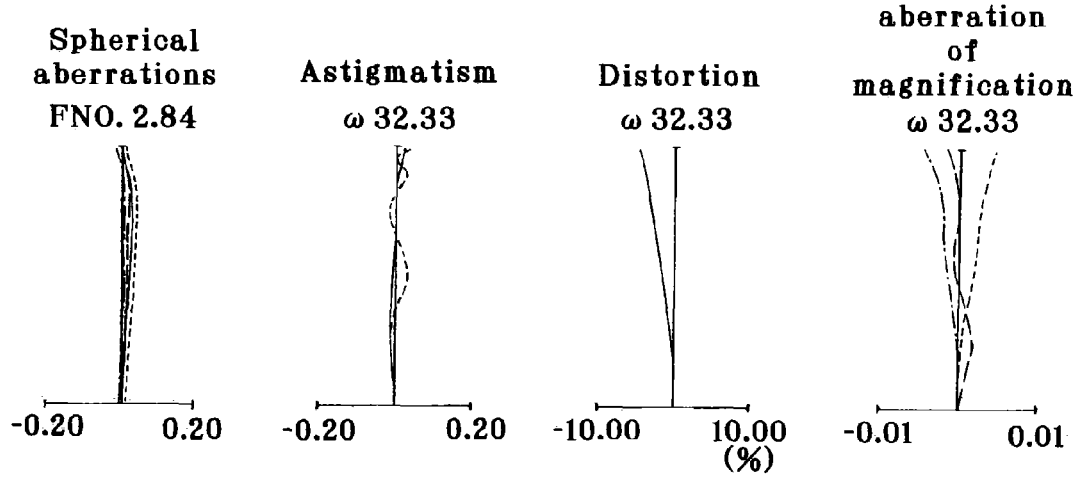
FIGS. 14(a), 14(b) and 14(c) are aberration diagrams for Example 2 upon focused on an infinite object point.
Figure 14B:
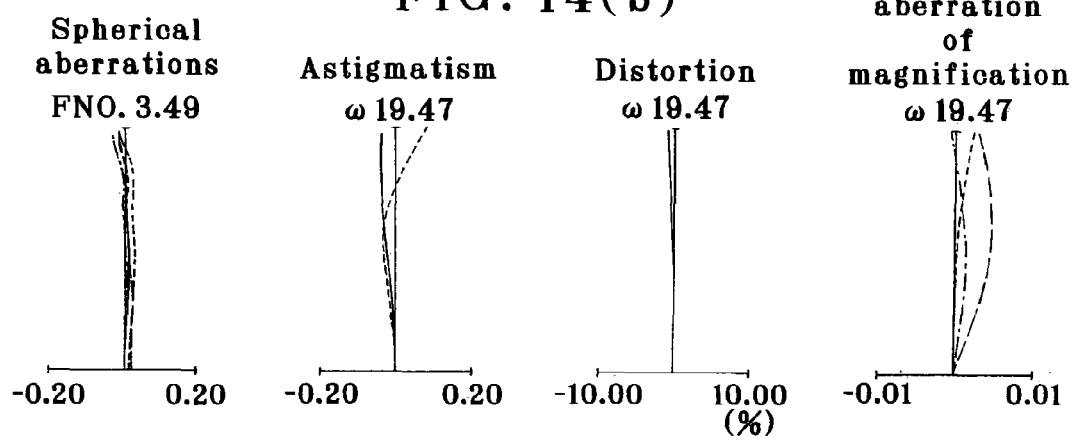
Figure 14C:
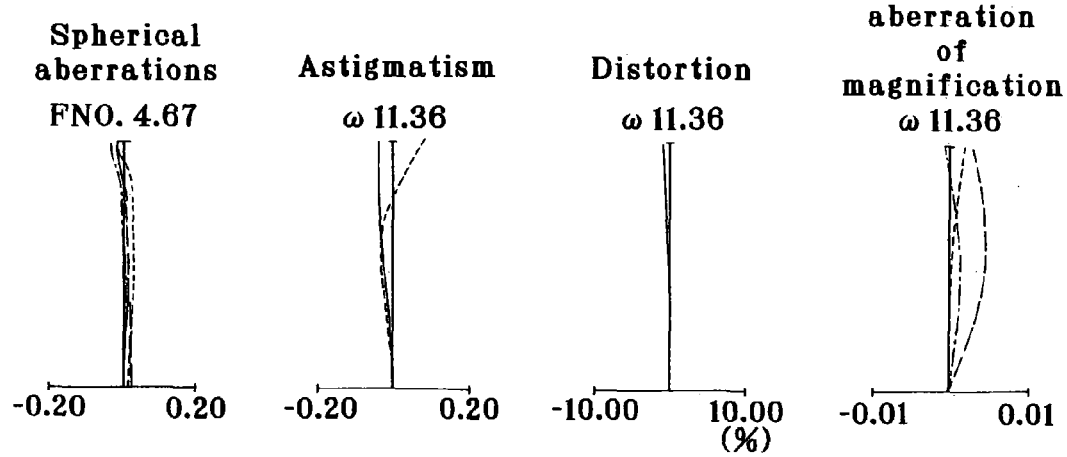
Figure 15A:
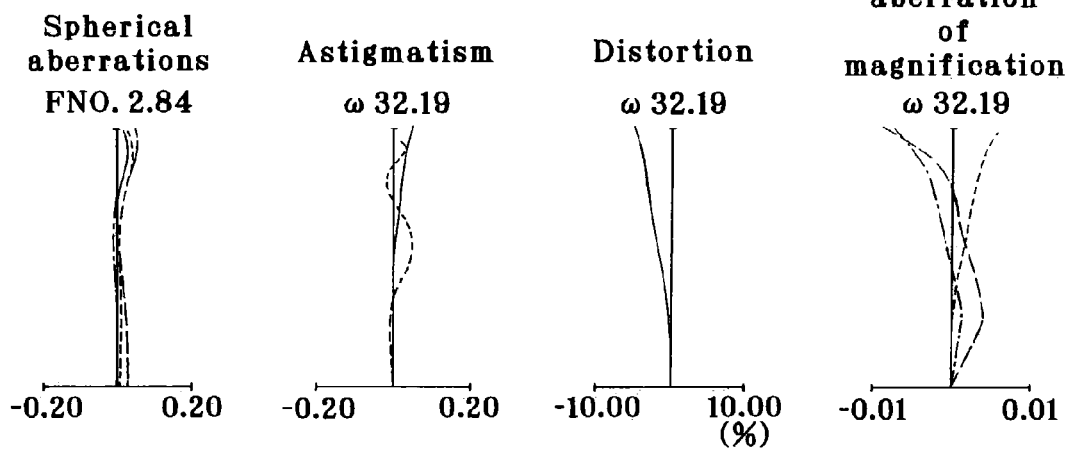
FIGS. 15(a), 15(b) and 15(c) are aberration diagrams for Example 3 upon focused on an infinite object point.
Figure 15B:
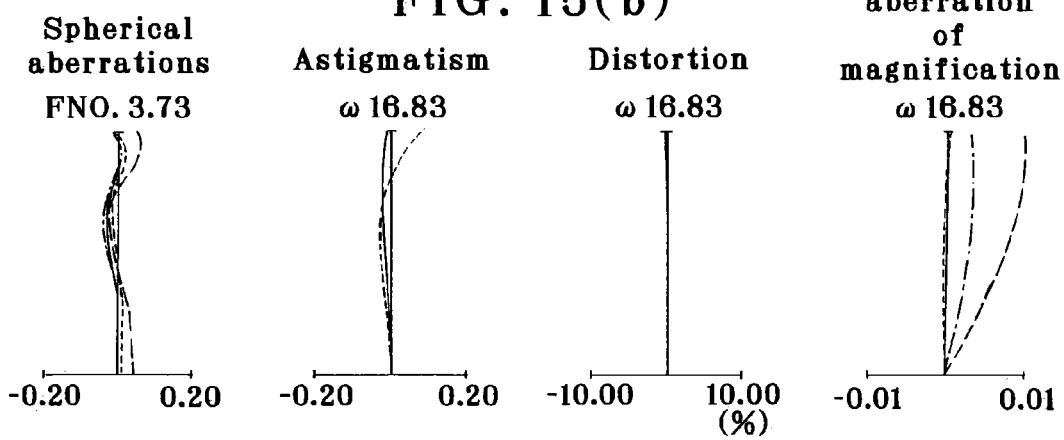
Figure 15C:
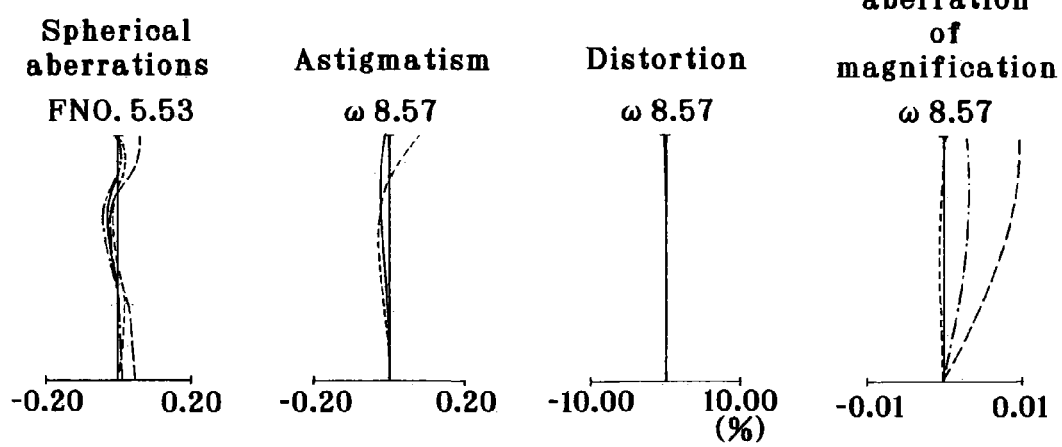
Figure 16A:
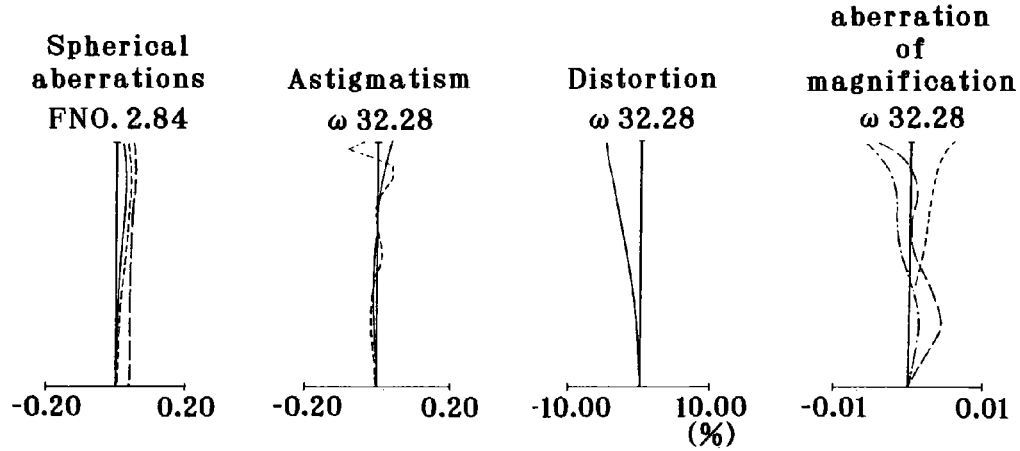
FIGS. 16(a), 16(b) and 16(c) are aberration diagrams for Example 4 upon focused on an infinite object point.
Figure 16B:
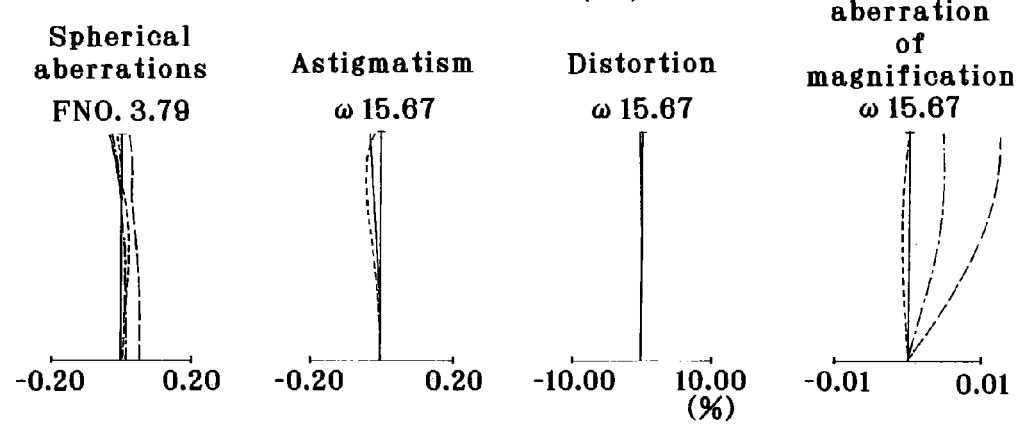
Figure 16C:
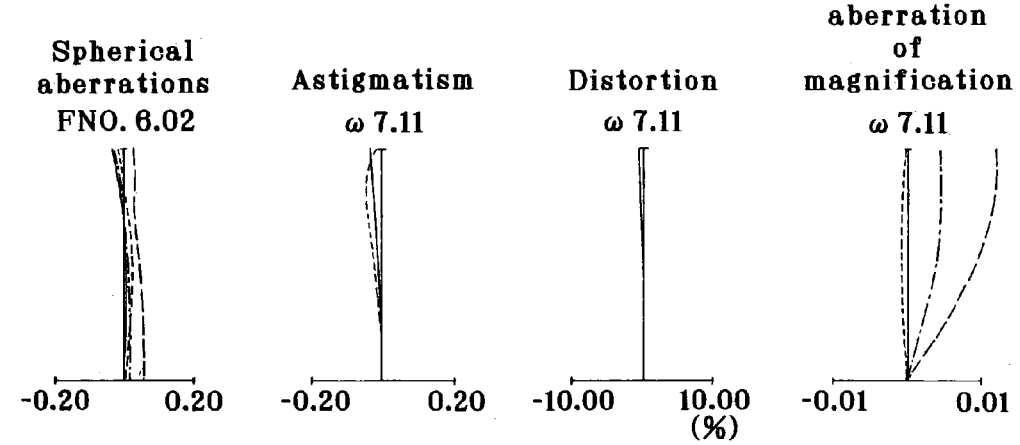
Figure 17A:
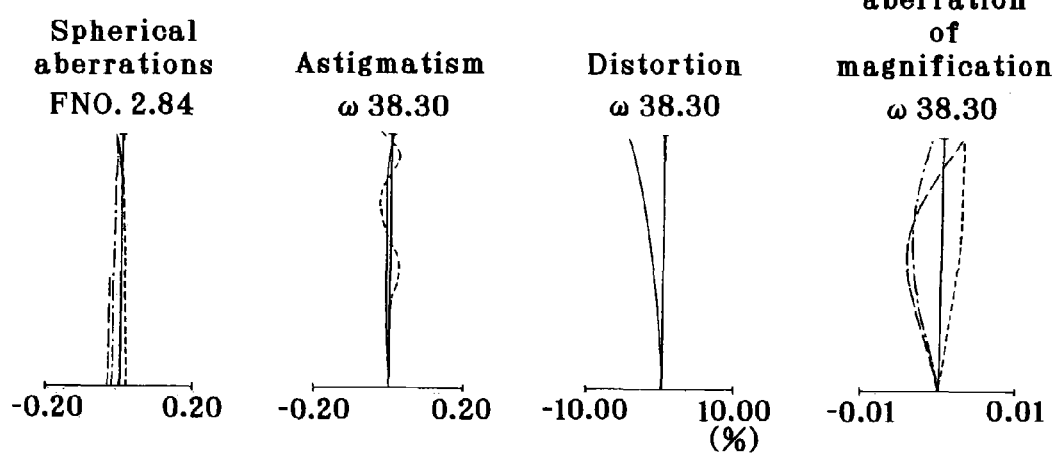
FIGS. 17(a), 17(b) and 17(c) are aberration diagrams for Example 5 upon focused on an infinite object point.
Figure 17B:
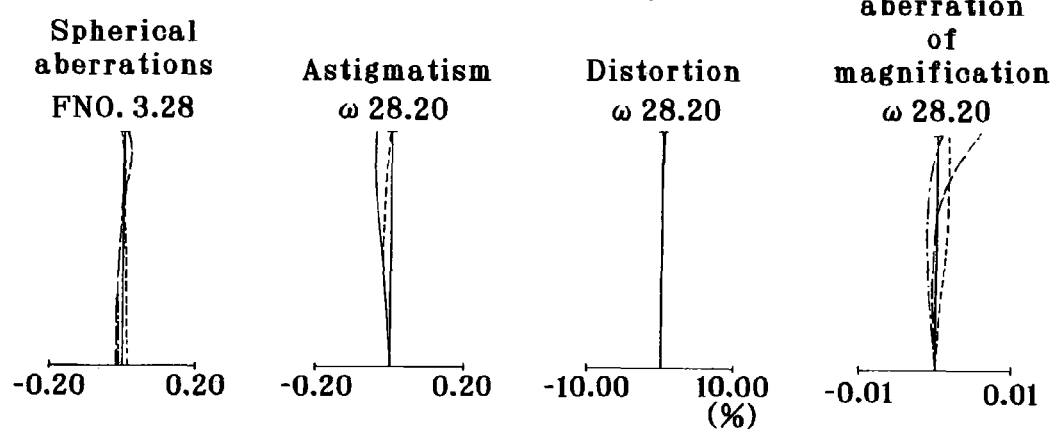
Figure 17C:
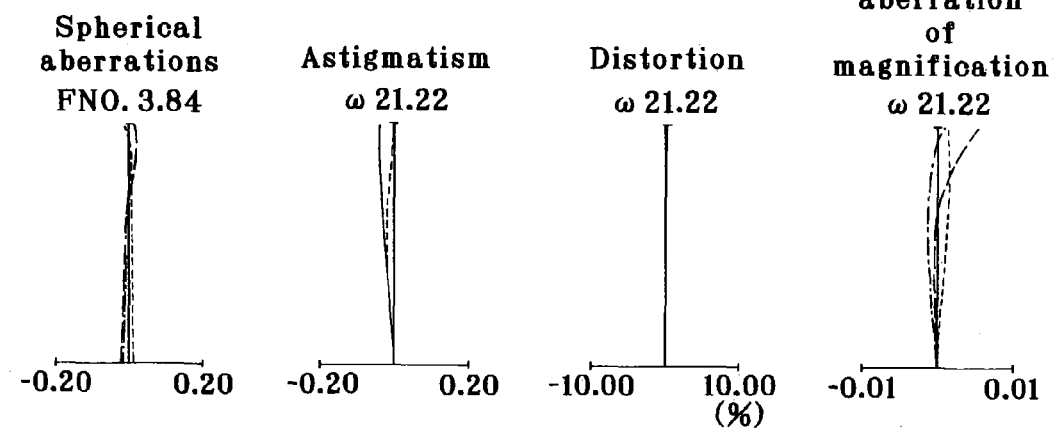
Figure 18A:
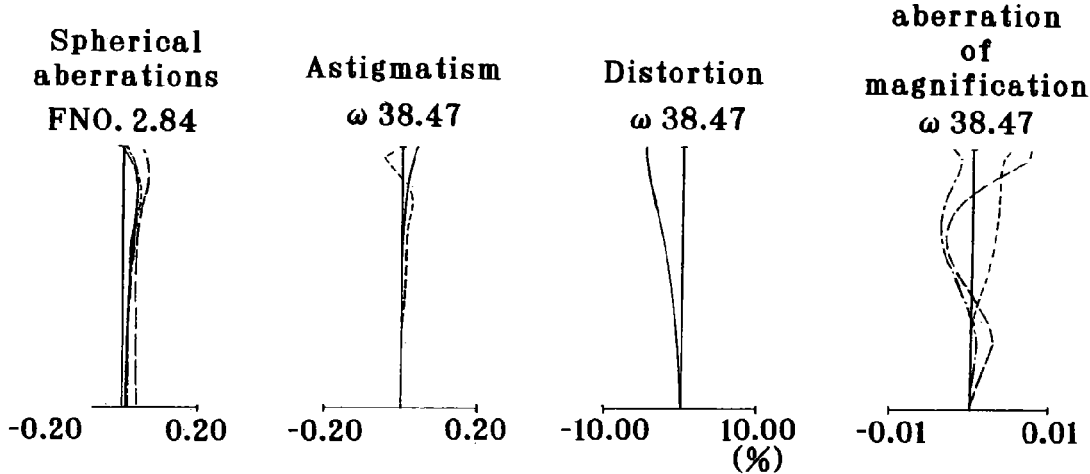
FIGS. 18(a), 18(b) and 18(c) are aberration diagrams for Example 6 upon focused on an infinite object point.
Figure 18B:
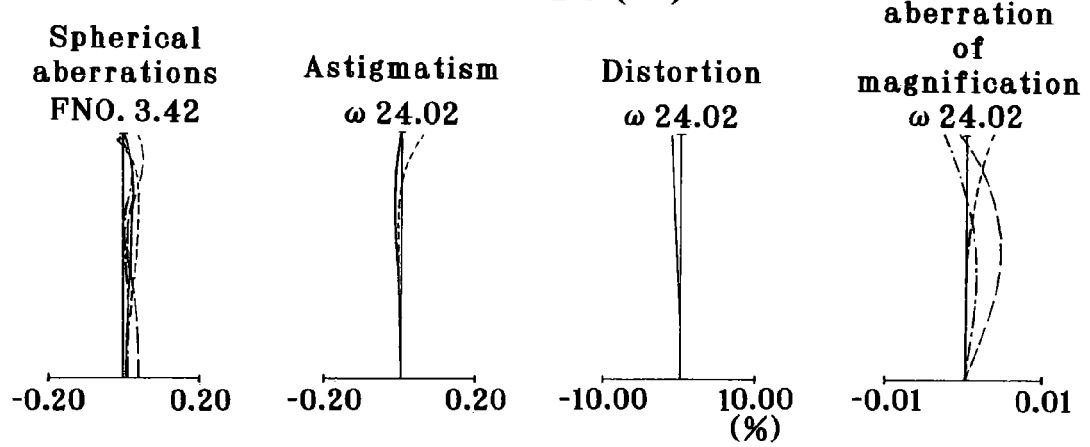
Figure 18C:
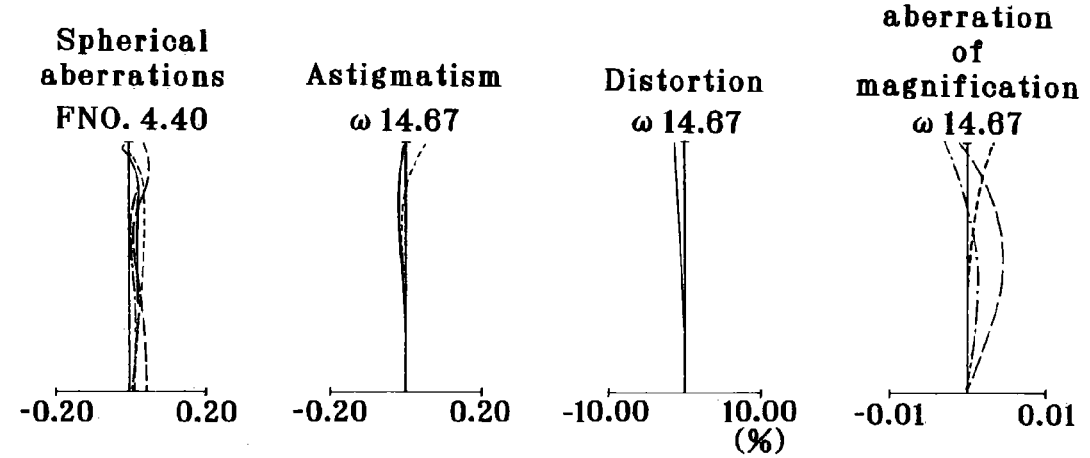
Figure 19A:
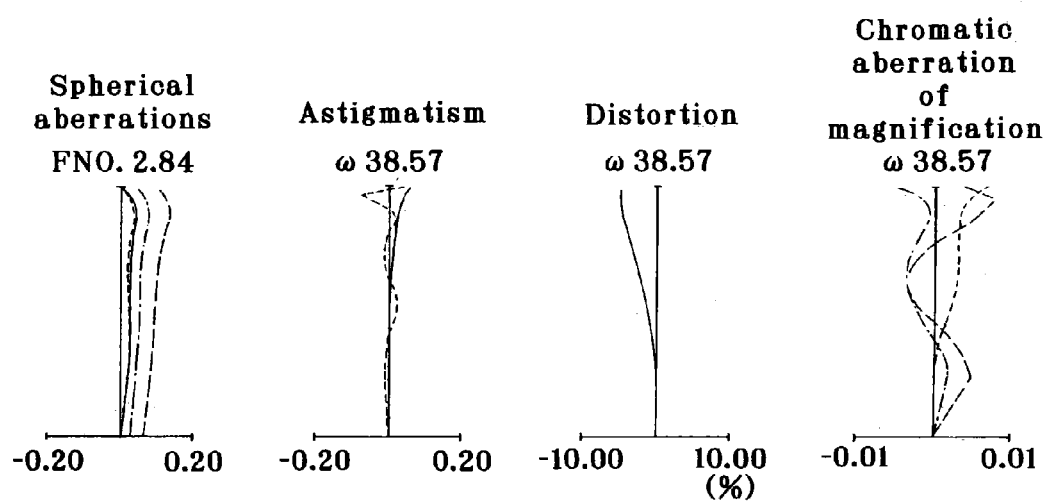
FIGS. 19(a), 19(b) and 19(c) are aberration diagrams for Example 7 upon focused on an infinite object point.
Figure 19B:
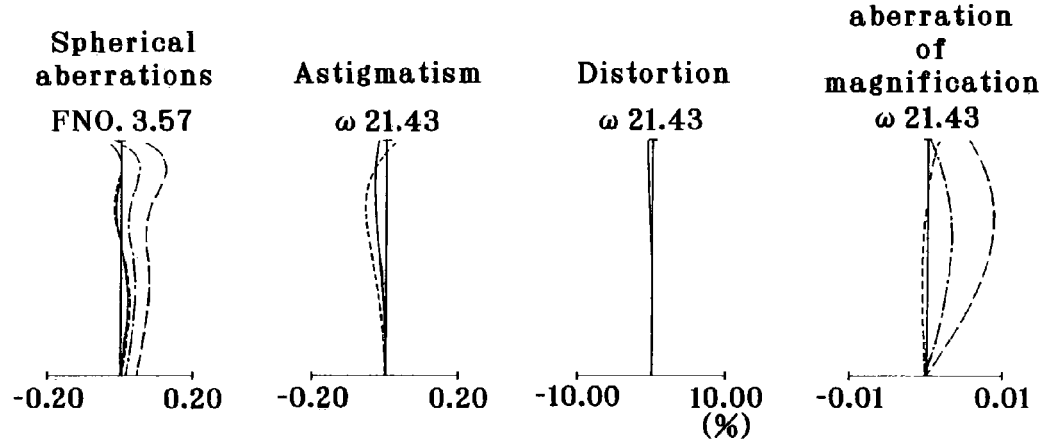
Figure 19C:
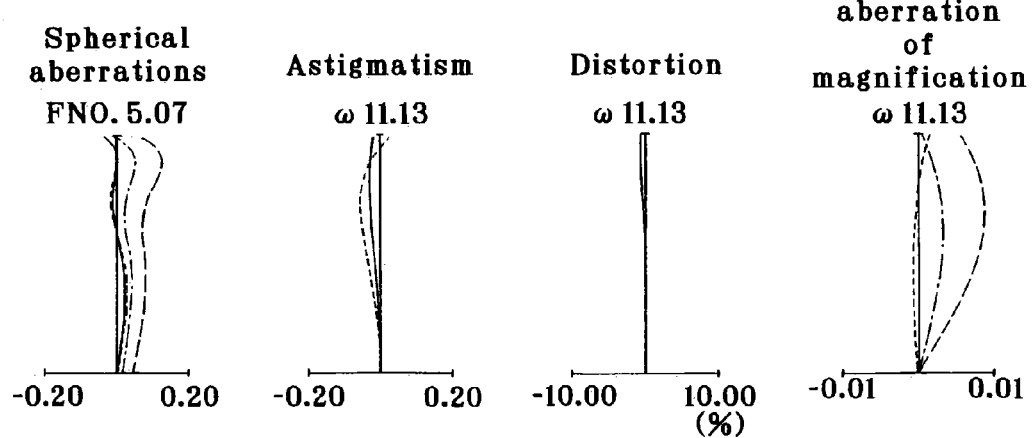
Figure 20A:
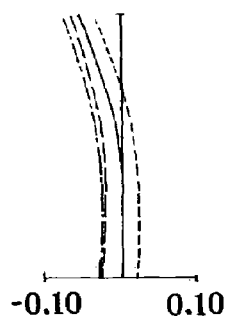
FIGS. 20(a), 20(b) and 20(c) are aberration diagrams for Example 8 upon focused on an infinite object point.
Figure 20A:
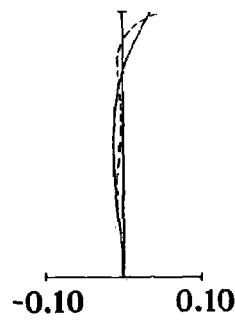
Figure 20A:
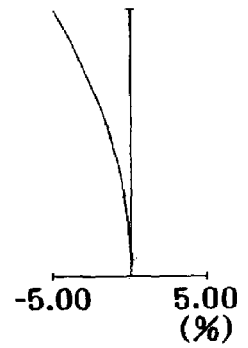
Figure 20A:
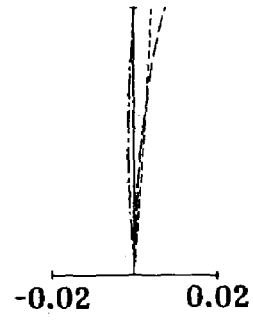
Figure 20B:
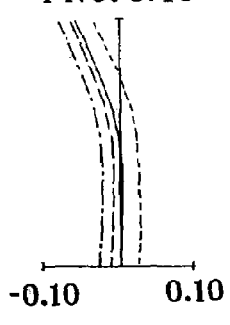
Figure 20B:
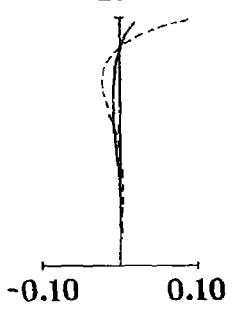
Figure 20B:
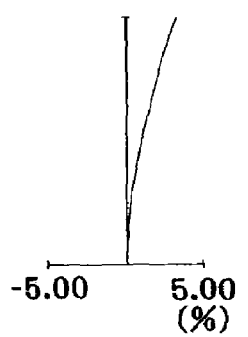
Figure 20B:
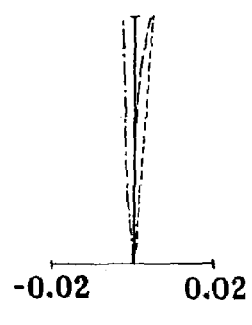
Figure 20C:
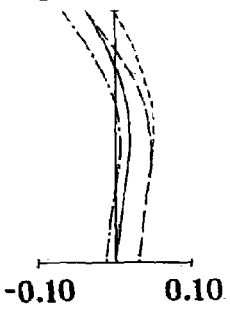
Figure 20C:
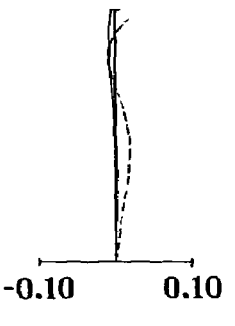
Figure 20C:
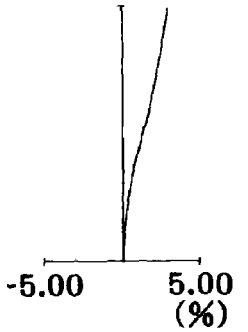
Figure 20C:
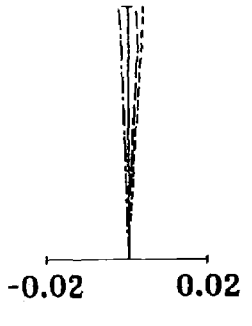
Figure 21A:
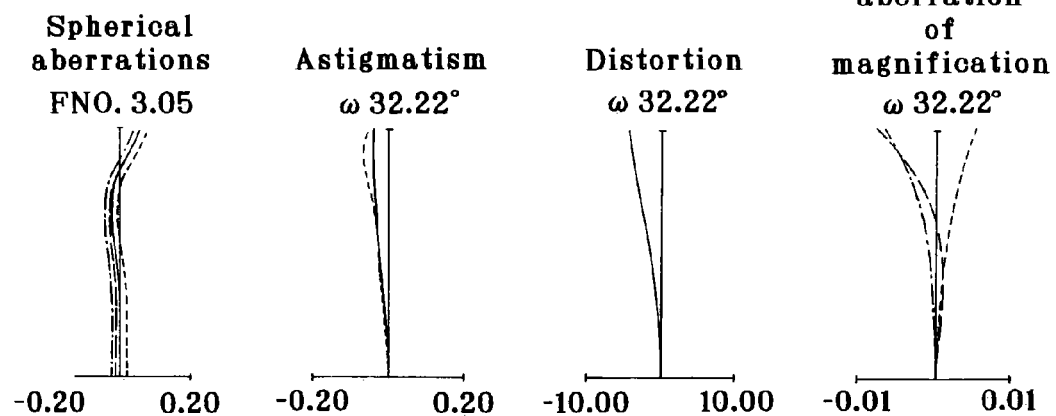
FIGS. 21(a), 21(b) and 21(c) are aberration diagrams for Example 9 upon focused on an infinite object point.
Figure 21B:
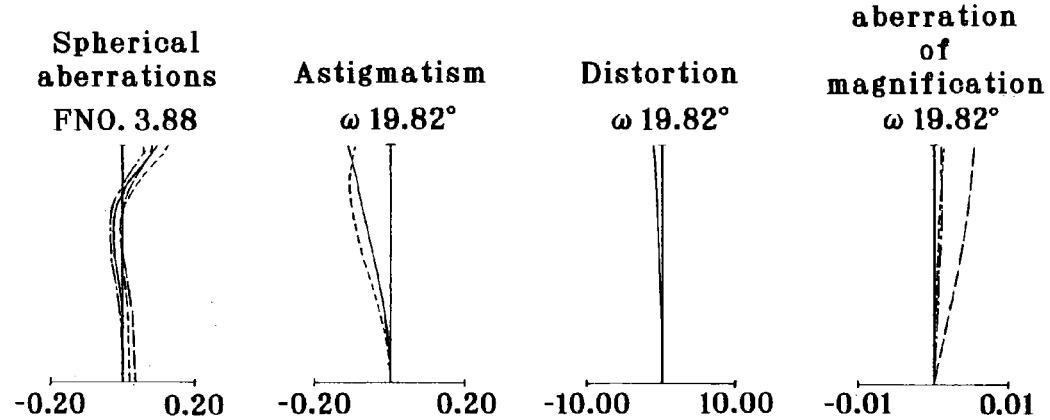
Figure 21C:
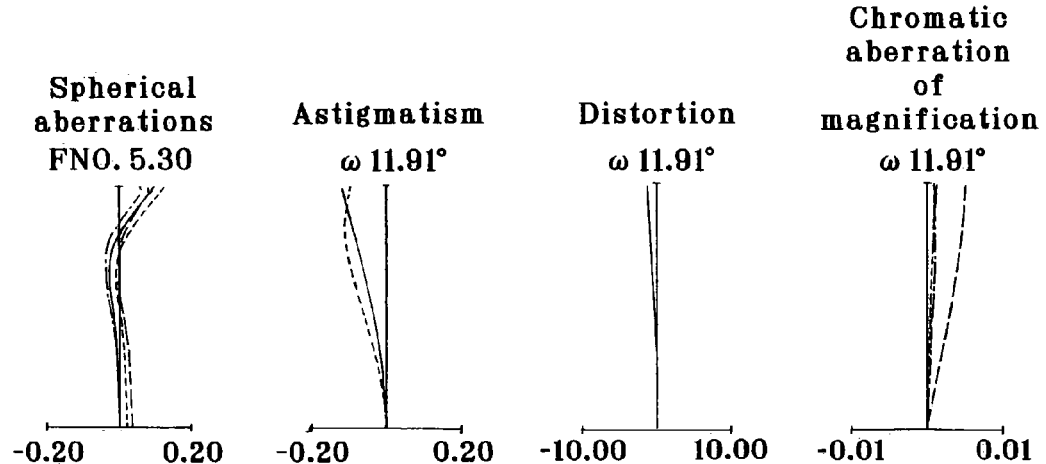
Figure 22A:
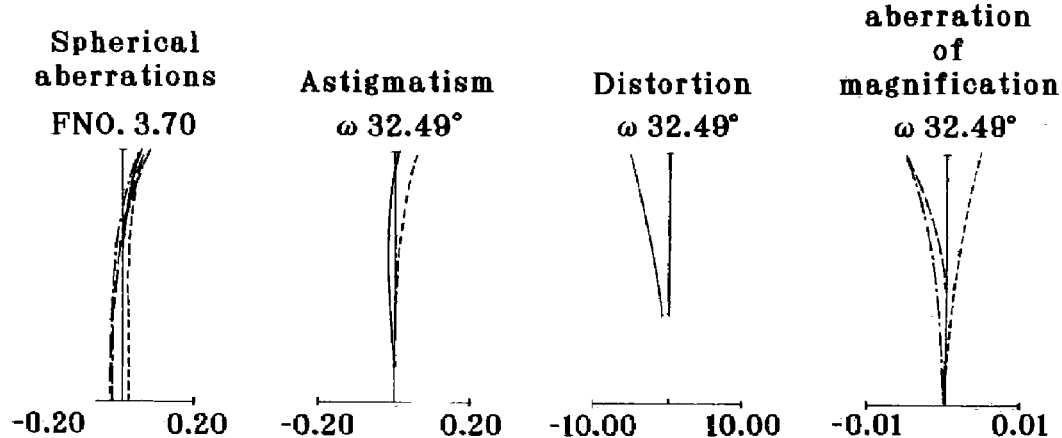
FIGS. 22(a), 22(b) and 22(c) are aberration diagrams for Example 10 upon focused on an infinite object point.
Figure 22B:
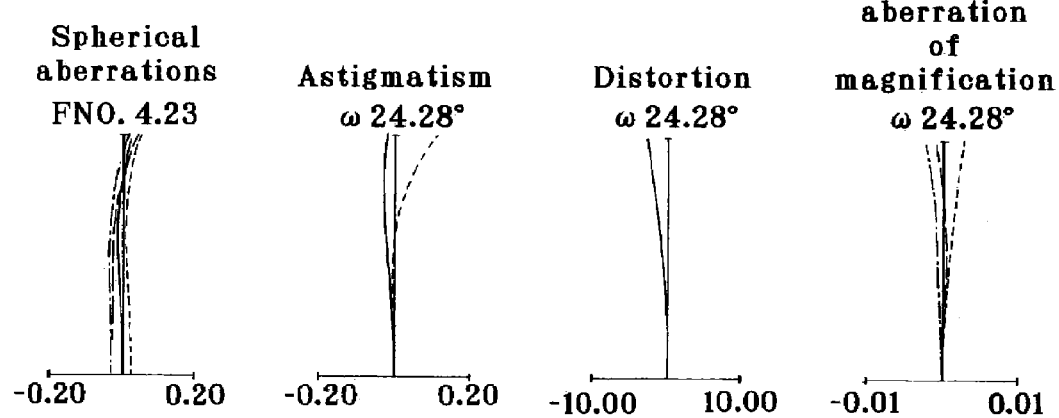
Figure 22C:
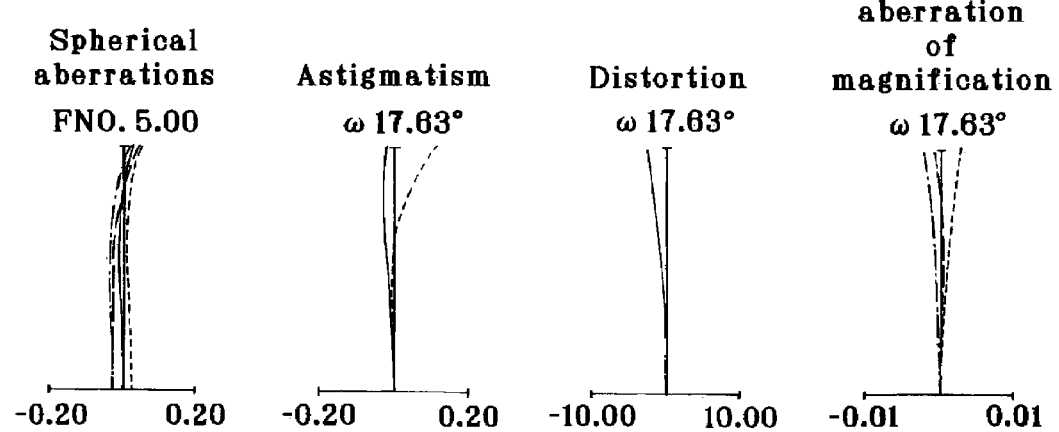
Figure 23A:
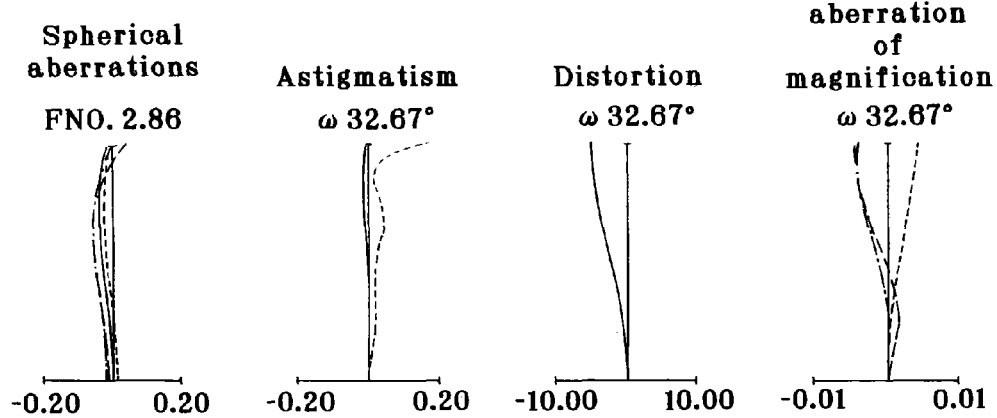
FIGS. 23(a), 23(b) and 23(c) are aberration diagrams for Example 11 upon focused on an infinite object point.
Figure 23B:
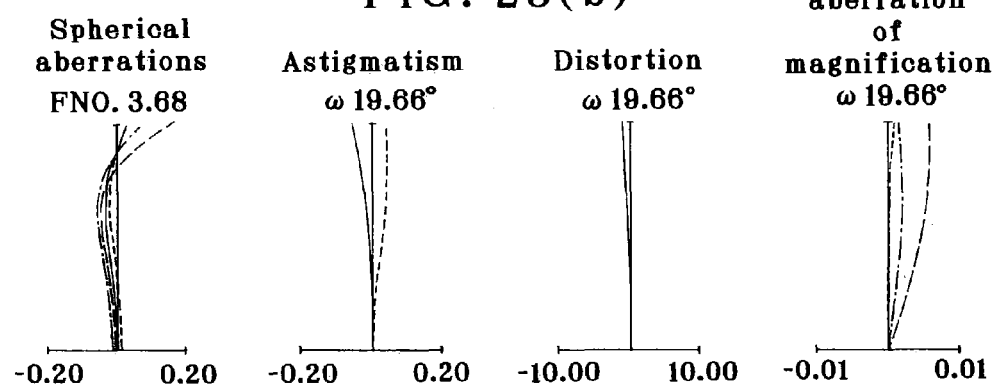
Figure 23C:
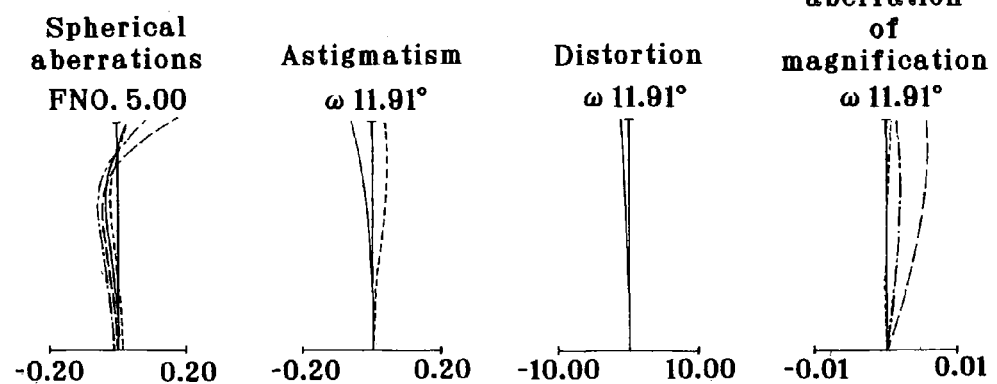
Figure 24A:
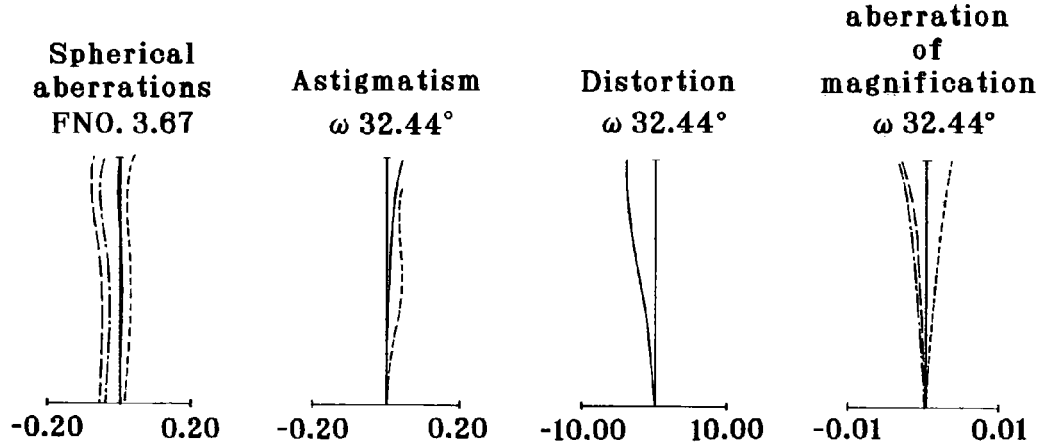
FIGS. 24(a), 24(b) and 24(c) are aberration diagrams for Example 12 upon focused on an infinite object point.
Figure 24B:
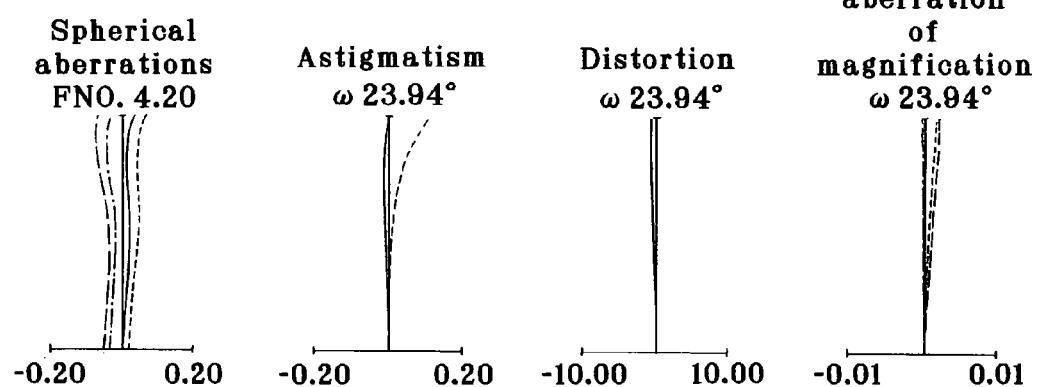
Figure 24C:
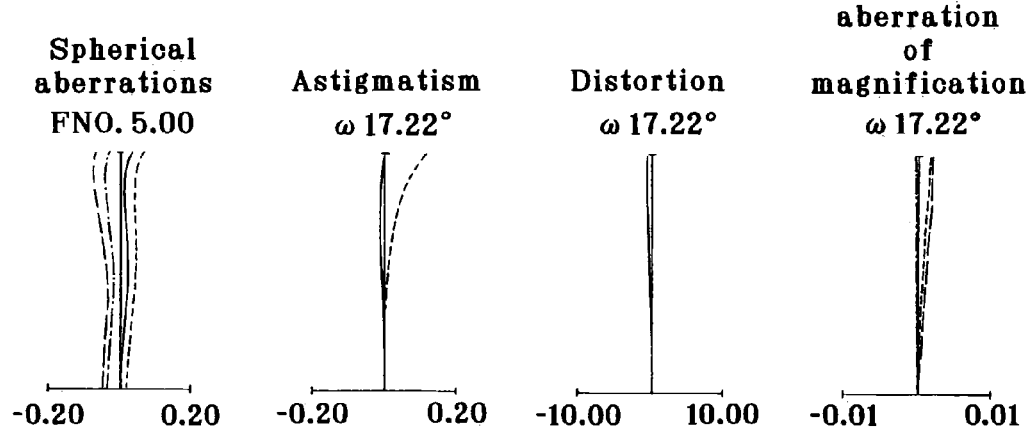

As shown in FIG. 12, the zoom lens of Example 12 is made up of a first lens group G1 having negative refracting power and a second lens group G2 having positive refracting power. For zooming from the wide-angle end to the telephoto end of the zoom lens upon focused on an infinite object point, the first lens group G1 moves toward the image plane side, and the second lens group G2 moves toward the object side. In the meantime, the spacing between the first lens group G1 and the second lens group G2 becomes narrow.

In Example 12, the first lens group G1 consists of a negative meniscus lens convex on its object side and a positive meniscus lens convex on its object side, and the second lens group G2 consists of a stop, a double-convex positive lens located in the rear thereof and a negative meniscus lens convex on its object side. The stop has a round shape as viewed from its entrance side, and is formed by optically blacking the entrance convex surface in the second lens group G2. Thus, the stop is located at a position N on the image side with respect to the entrance side surface vertex in the second lens group G2, and the spacing between the stop and the entrance convex surface in the numerical data given later has a minus value. Four aspheric surfaces are used, two at both surfaces of the negative meniscus lens in the first lens group G1 and two at both surfaces of the double-convex positive lens in the second lens group G2.

Then, the light quantity control filter or shutter is located 1.0 mm farther off the image side of the negative meniscus lens in the second lens group G2 in such a way that it moves axially together with the second lens group G2.

The numerical data on each example are given below. Symbols used hereinafter but not hereinbefore have the following meanings:
f: focal length of the zoom lens
2ω: angle of view
$F_{NO}$: F-number
WE: wide-angle end
ST: intermediate state
TE: telephoto end
$r_1, r_2, \ldots$: radius of curvature of each lens surface
$d_1, d_2, \ldots$: spacing between adjacent lens surfaces
$n_{d1}, n_{d2}, \ldots$: d-line refractive index of each lens
$v_{d1}, v_{d2}, \ldots$: Abbe number of each lens Here let x be an optical axis on condition that the direction of propagation of light is positive and y be a direction orthogonal to the optical axis. Then, aspheric configuration is given by $$x=(y^2/r)/[1+\{1-(K+1)(y/r)^2\}1/2]+A_4y^4+A_6y^6+A_8y^8+A_{10}y^{10}$$

where r is a paraxial radius of curvature, K is a conical coefficient, and $A_4, A_6, A_8$ and $A_{10}$ are the fourth, sixth, eighth and tenth aspheric coefficients, respectively.

EXAMPLE 1

| | | | |
|---|---|---|---|
| $r_1 = -12.193$ (Aspheric) | $d_1 = 1.20$ | $n_{d1} = 1.78800$ | $v_{d1} = 47.37$ |
| $r_2 = 10.585$ (Aspheric) | $d_2 = 1.14$ | | |
| $r_3 = 6.202$ (Aspheric) | $d_3 = 0.84$ | $n_{d2} = 1.84666$ | $v_{d2} = 23.78$ |
| $r_4 = 7.845$ (Aspheric) | $d_4 =$ (Variable) | | |
| $r_5 = \infty$ (Stop) | $d_5 = 0.80$ | | |
| $r_6 = 3.456$ (Aspheric) | $d_6 = 3.10$ | $n_{d3} = 1.69350$ | $v_{d3} = 53.21$ |
| $r_7 = -5.866$ (Aspheric) | $d_7 = 0.00$ | | |
| $r_8 = 59.892$ (Aspheric) | $d_8 = 0.80$ | $n_{d4} = 1.80518$ | $v_{d4} = 25.42$ |
| $r_9 = 3.400$ (Aspheric) | $d_9 =$ (Variable) | | |
| $r_{10} = \infty$ | $d_{10} = 1.44$ | $n_{d5} = 1.54771$ | $v_{d5} = 62.84$ |
| $r_{11} = \infty$ | $d_{11} = 0.80$ | | |
| $r_{12} = \infty$ | $d_{12} = 0.80$ | $n_{d6} = 1.51633$ | $v_{d6} = 64.14$ |
| $r_{13} = \infty$ | $d_{13} = 1.00$ | | |
| $r_{14} = \infty$ (Image Plane) | | | |

| Aspherical Coefficients |
|---|

1st surface

K = 0.000
$A_4 = 7.28875 \times 10^{-3}$
$A_6 = -3.16079 \times 10^{-4}$
$A_8 = 5.59240 \times 10^{-6}$
$A_{10} = 0$ 2nd surface K = 0.000
$A_4 = 6.08993 \times 10^{-3}$
$A_6 = 7.92220 \times 10^{-4}$
$A_8 = -3.77695 \times 10^{-5}$
$A_{10} = 0$ 3rd surface K = 0.000
$A_4 = -8.25212 \times 10^{-3}$
$A_6 = 1.05654 \times 10^{-3}$
$A_8 = -5.98956 \times 10^{-5}$
$A_{10} = 0$ 4th surface K = 0.000
$A_4 = -8.12513 \times 10^{-3}$
$A_6 = 7.44821 \times 10^{-4}$
$A_8 = -4.70205 \times 10^{-5}$
$A_{10} = 0$ 6th surface K = 0.000
$A_4 = -5.56006 \times 10^{-4}$
$A_6 = 3.61032 \times 10^{-5}$
$A_8 = -1.57815 \times 10^{-5}$
$A_{10} = 0$ 7th surface K = 0.000
$A_4 = 2.56154 \times 10^{-3}$
$A_6 = -5.93015 \times 10^{-4}$
$A_8 = 8.21499 \times 10^{-5}$
$A_{10} = 0$ -continued 8th surface K = 0.000
$A_4 = -1.61498 \times 10^{-2}$
$A_6 = 2.62229 \times 10^{-4}$
$A_8 = 1.11700 \times 10^{-4}$
$A_{10} = 0$ 9th surface K = 0.000
$A_4 = -1.33711 \times 10^{-2}$
$A_6 = 1.83066 \times 10^{-3}$
$A_8 = 1.80922 \times 10^{-4}$
$A_{10} = 0$ Zooming Data (∞)

| | WE | ST | TE |
|---|---|---|---|
| f (mm) | 5.700 | 7.600 | 10.500 |
| $F_{NO}$ | 2.84 | 3.24 | 3.86 |
| 2 ω (°) | 62.48 | 47.32 | 34.74 |
| $d_4$ | 5.79 | 3.28 | 1.20 |
| $d_9$ | 3.55 | 4.78 | 6.67 |

EXAMPLE 2

| | | | |
|---|---|---|---|
| $r_1$ = 742.482 (Aspheric) | $d_1$ = 1.20 | $n_{d1}$ = 1.88300 | $v_{d1}$ = 40.76 |
| $r_2$ = 5.785 (Aspheric) | $d_2$ = 1.66 | | |
| $r_3$ = 7.599 (Aspheric) | $d_3$ = 1.88 | $n_{d2}$ = 1.84666 | $v_{d2}$ = 23.78 |
| $r_4$ = 16.421 (Aspheric) | $d_4$ = (Variable) | | |
| $r_5$ = ∞ (Stop) | $d_5$ = 0.80 | | |
| $r_6$ = 4.194 (Aspheric) | $d_6$ = 3.18 | $n_{d3}$ = 1.49700 | $v_{d3}$ = 81.54 |
| $r_7$ = −20.581 (Aspheric) | $d_7$ = 0.00 | | |
| $r_8$ = 13.506 (Aspheric) | $d_8$ = 0.80 | $n_{d4}$ = 1.84666 | $v_{d4}$ = 23.78 |
| $r_9$ = 6.472 (Aspheric) | $d_9$ = (Variable) | | |
| $r_{10}$ = ∞ | $d_{10}$ = 1.44 | $n_{d5}$ = 1.54771 | $v_{d5}$ = 62.84 |
| $r_{11}$ = ∞ | $d_{11}$ = 0.80 | | |
| $r_{12}$ = ∞ | $d_{12}$ = 0.80 | $n_{d6}$ = 1.51633 | $v_{d6}$ = 64.14 |
| $r_{13}$ = ∞ | $d_{13}$ = 1.00 | | |
| $r_{14}$ = ∞ (Image Plane) | | | |

Aspherical Coefficients

1st surface

K = 0.000
$A_4 = 9.25825 \times 10^{-4}$
$A_6 = -2.08555 \times 10^{-5}$
$A_8 = 1.29524 \times 10^{-7}$
$A_{10} = 0$ 2nd surface K = 0.000
$A_4 = -1.75234 \times 10^{-4}$
$A_6 = 6.38980 \times 10^{-5}$
$A_8 = -2.65816 \times 10^{-6}$
$A_{10} = 0$ 3rd surface K = 0.000
$A_4 = -1.50510 \times 10^{-3}$
$A_6 = 3.91584 \times 10^{-5}$
$A_8 = -3.01945 \times 10^{-7}$
$A_{10} = 0$ 4th surface K = 0.000
$A_4 = -1.01332 \times 10^{-3}$
$A_6 = 1.61802 \times 10^{-5}$ -continued $A_8 = 1.03000 \times 10^{-7}$
$A_{10} = 0$ 6th surface K = 0.000
$A_4 = -7.98420 \times 10^{-4}$
$A_6 = -1.86068 \times 10^{-5}$
$A_8 = -2.94687 \times 10^{-6}$
$A_{10} = 0$ 7th surface K = 0.000
$A_4 = 2.17134 \times 10^{-3}$
$A_6 = -3.36530 \times 10^{-4}$
$A_8 = 2.23456 \times 10^{-5}$
$A_{10} = 0$ 8th surface K = 0.000
$A_4 = 3.99355 \times 10^{-3}$
$A_6 = -2.87967 \times 10^{-4}$
$A_8 = 1.70044 \times 10^{-5}$
$A_{10} = 0$ 9th surface K = 0.000
$A_4 = 5.40085 \times 10^{-3}$
$A_6 = -1.35135 \times 10^{-5}$
$A_8 = 3.54182 \times 10^{-5}$
$A_{10} = 0$ Zooming Data (∞)

| | WE | ST | TE |
|---|---|---|---|
| f (mm) | 5.472 | 9.450 | 16.492 |
| $F_{NO}$ | 2.84 | 3.49 | 4.67 |
| 2 ω (°) | 64.66 | 38.94 | 22.72 |
| $d_4$ | 19.39 | 9.00 | 2.90 |
| $d_9$ | 8.11 | 11.30 | 16.96 |

EXAMPLE 3

| | | | |
|---|---|---|---|
| $r_1$ = −79.529 (Aspheric) | $d_1$ = 1.20 | $n_{d1}$ = 1.88300 | $v_{d1}$ = 40.76 |
| $r_2$ = 6.338 (Aspheric) | $d_2$ = 2.02 | | |
| $r_3$ = 9.087 (Aspheric) | $d_3$ = 2.14 | $n_{d2}$ = 1.84666 | $v_{d2}$ = 23.78 |
| $r_4$ = 25.643 (Aspheric) | $d_4$ = (Variable) | | |
| $r_5$ = ∞ (Stop) | $d_5$ = 0.80 | | |
| $r_6$ = 4.591 (Aspheric) | $d_6$ = 3.76 | $n_{d3}$ = 1.49700 | $v_{d3}$ = 81.54 |
| $r_7$ = −19.255 (Aspheric) | $d_7$ = 0.00 | | |
| $r_8$ = 13.328 (Aspheric) | $d_8$ = 0.80 | $n_{d4}$ = 1.84666 | $v_{d4}$ = 23.78 |
| $r_9$ = 6.340 (Aspheric) | $d_9$ = (Variable) | | |
| $r_{10}$ = ∞ | $d_{10}$ = 1.44 | $n_{d5}$ = 1.54771 | $v_{d5}$ = 62.84 |
| $r_{11}$ = ∞ | $d_{11}$ = 0.80 | | |
| $r_{12}$ = ∞ | $d_{12}$ = 0.80 | $n_{d6}$ = 1.51633 | $v_{d6}$ = 64.14 |
| $r_{13}$ = ∞ | $d_{13}$ = 1.00 | | |
| $r_{14}$ = ∞ (Image Plane) | | | |

Aspherical Coefficients

1st surface

K = 0.000
$A_4 = 6.90799 \times 10^{-4}$
$A_6 = -1.17782 \times 10^{-5}$
$A_8 = 4.88182 \times 10^{-8}$
$A_{10} = 0$ 2nd surface K = 0.000
$A_4 = -4.06939 \times 10^{-4}$
$A_6 = 4.52557 \times 10^{-5}$ -continued $A_8 = -1.51312 \times 10^{-6}$
$A_{10} = 0$ 3rd surface $K = 0.000$
$A_4 = -1.03153 \times 10^{-3}$
$A_6 = 2.23306 \times 10^{-5}$
$A_8 = -2.57487 \times 10^{-7}$
$A_{10} = 0$ 4th surface $K = 0.000$
$A_4 = -5.56360 \times 10^{-4}$
$A_6 = 4.49314 \times 10^{-6}$
$A_8 = 1.08906 \times 10^{-8}$
$A_{10} = 0$ 6th surface $K = 0.000$
$A_4 = -5.80555 \times 10^{-4}$
$A_6 = -3.39765 \times 10^{-6}$
$A_8 = -2.44132 \times 10^{-6}$
$A_{10} = 0$ 7th surface $K = 0.000$
$A_4 = 2.25406 \times 10^{-3}$
$A_6 = -2.80904 \times 10^{-4}$
$A_8 = 1.27498 \times 10^{-5}$
$A_{10} = 0$ 8th surface $K = 0.000$
$A_4 = 2.85554 \times 10^{-3}$
$A_6 = -2.15203 \times 10^{-4}$
$A_8 = 8.69324 \times 10^{-6}$
$A_{10} = 0$ 9th surface $K = 0.000$
$A_4 = 3.48116 \times 10^{-3}$
$A_6 = 3.63247 \times 10^{-6}$
$A_8 = 1.69137 \times 10^{-5}$
$A_{10} = 0$ Zooming Data (∞)

| | WE | ST | TE |
|---|---|---|---|
| f (mm) | 5.500 | 11.000 | 22.000 |
| $F_{NO}$ | 2.84 | 3.73 | 5.53 |
| 2 ω (°) | 64.38 | 33.66 | 17.14 |
| $d_4$ | 23.03 | 8.67 | 1.49 |
| $d_9$ | 9.02 | 13.72 | 23.11 |

EXAMPLE 4

| $r_1 = -60.278$ (Aspheric) | $d_1 = 1.20$ | $n_{d1} = 1.88300$ | $\nu_{d1} = 40.76$ |
|---|---|---|---|
| $r_2 = 7.222$ (Aspheric) | $d_2 = 2.07$ | | |
| $r_3 = 8.952$ (Aspheric) | $d_3 = 2.08$ | $n_{d2} = 1.84666$ | $\nu_{d2} = 23.78$ |
| $r_4 = 22.635$ (Aspheric) | $d_4 = $ (Variable) | | |
| $r_5 = \infty$ (Stop) | $d_5 = 0.80$ | | |
| $r_6 = 4.814$ (Aspheric) | $d_6 = 3.81$ | $n_{d3} = 1.49700$ | $\nu_{d3} = 81.54$ |
| $r_7 = -24.368$ (Aspheric) | $d_7 = 0.00$ | | |
| $r_8 = 12.210$ (Aspheric) | $d_8 = 0.80$ | $n_{d4} = 1.84666$ | $\nu_{d4} = 23.78$ |
| $r_9 = 6.177$ (Aspheric) | $d_9 = $ (Variable) | | |
| $r_{10} = \infty$ | $d_{10} = 1.44$ | $n_{d5} = 1.54771$ | $\nu_{d5} = 62.84$ |
| $r_{11} = \infty$ | $d_{11} = 0.80$ | | |
| $r_{12} = \infty$ | $d_{12} = 0.80$ | $n_{d6} = 1.51633$ | $\nu_{d6} = 64.14$ |
| $r_{13} = \infty$ | $d_{13} = 1.00$ | | |
| $r_{14} = \infty$ (Image Plane) | | | |

Aspherical Coefficients

1st surface $K = 0.000$
$A_4 = 6.00951 \times 10^{-4}$
$A_6 = -8.43631 \times 10^{-6}$
$A_8 = 3.37449 \times 10^{-8}$
$A_{10} = 0$ 2nd surface $K = 0.000$
$A_4 = -3.72010 \times 10^{-4}$
$A_6 = 2.79016 \times 10^{-5}$
$A_8 = -6.20166 \times 10^{-7}$
$A_{10} = 0$ 3rd surface $K = 0.000$
$A_4 = -1.09669 \times 10^{-3}$
$A_6 = 1.28385 \times 10^{-5}$
$A_8 = -4.91592 \times 10^{-8}$
$A_{10} = 0$ 4th surface $K = 0.000$
$A_4 = -6.10641 \times 10^{-4}$
$A_6 = 3.03012 \times 10^{-6}$
$A_8 = 3.35101 \times 10^{-8}$
$A_{10} = 0$ 6th surface $K = 0.000$
$A_4 = -3.63773 \times 10^{-4}$
$A_6 = -1.22811 \times 10^{-5}$
$A_8 = -8.74615 \times 10^{-7}$
$A_{10} = 0$ 7th surface $K = 0.000$
$A_4 = 1.68273 \times 10^{-3}$
$A_6 = -1.42484 \times 10^{-4}$
$A_8 = 6.05817 \times 10^{-6}$
$A_{10} = 0$ 8th surface $K = 0.000$
$A_4 = 1.58428 \times 10^{-3}$
$A_6 = -8.00129 \times 10^{-6}$
$A_8 = -1.87986 \times 10^{-6}$
$A_{10} = 0$ 9th surface $K = 0.000$
$A_4 = 2.15661 \times 10^{-3}$
$A_6 = 1.52232 \times 10^{-4}$
$A_8 = 2.48220 \times 10^{-6}$
$A_{10} = 0$ Zooming Data (∞)

| | WE | ST | TE |
|---|---|---|---|
| f (mm) | 5.500 | 11.870 | 26.600 |
| $F_{NO}$ | 2.84 | 3.79 | 6.02 |
| 2 ω (°) | 62.56 | 31.34 | 14.22 |
| $d_4$ | 29.63 | 10.40 | 1.20 |
| $d_9$ | 9.74 | 15.00 | 27.15 |

EXAMPLE 5

| | | | |
|---|---|---|---|
| $r_1 = 72.039$ (Aspheric) | $d_1 = 1.20$ | $n_{d1} = 1.88300$ | $\nu_{d1} = 40.76$ |
| $r_2 = 4.217$ (Aspheric) | $d_2 = 1.62$ | | |
| $r_3 = 5.885$ (Aspheric) | $d_3 = 1.27$ | $n_{d2} = 1.84666$ | $\nu_{d2} = 23.78$ |
| $r_4 = 9.267$ (Aspheric) | $d_4 =$ (Variable) | | |
| $r_5 = \infty$ (Stop) | $d_5 = 0.80$ | | |
| $r_6 = 3.053$ (Aspheric) | $d_6 = 3.93$ | $n_{d3} = 1.49700$ | $\nu_{d3} = 81.54$ |
| $r_7 = -6.282$ (Aspheric) | $d_7 = 0.00$ | | |
| $r_8 = 6.618$ (Aspheric) | $d_8 = 0.80$ | $n_{d4} = 1.84666$ | $\nu_{d4} = 23.78$ |
| $r_9 = 3.348$ (Aspheric) | $d_9 =$ (Variable) | | |
| $r_{10} = \infty$ | $d_{10} = 1.44$ | $n_{d5} = 1.54771$ | $\nu_{d5} = 62.84$ |
| $r_{11} = \infty$ | $d_{11} = 0.80$ | | |
| $r_{12} = \infty$ | $d_{12} = 0.80$ | $n_{d6} = 1.51633$ | $\nu_{d6} = 64.14$ |
| $r_{13} = \infty$ | $d_{13} = 1.00$ | | |
| $r_{14} = \infty$ (Image Plane) | | | |

Aspherical Coefficients

1st surface $K = 0.000$
$A_4 = 3.17076 \times 10^{-3}$
$A_6 = -1.37514 \times 10^{-4}$
$A_8 = 1.96035 \times 10^{-6}$
$A_{10} = 0$ 2nd surface $K = 0.000$
$A_4 = 3.08247 \times 10^{-3}$
$A_6 = 3.63679 \times 10^{-4}$
$A_8 = -3.34382 \times 10^{-5}$
$A_{10} = 0$ 3rd surface $K = 0.000$
$A_4 = -1.89408 \times 10^{-3}$
$A_6 = 2.05447 \times 10^{-4}$
$A_8 = -6.40061 \times 10^{-6}$
$A_{10} = 0$ 4th surface $K = 0.000$
$A_4 = -2.03988 \times 10^{-3}$
$A_6 = 1.30917 \times 10^{-4}$
$A_8 = -2.56924 \times 10^{-6}$
$A_{10} = 0$ 6th surface $K = 0.000$
$A_4 = -1.61253 \times 10^{-3}$
$A_6 = -7.47302 \times 10^{-5}$
$A_8 = -2.30842 \times 10^{-5}$
$A_{10} = 0$ 7th surface $K = 0.000$
$A_4 = 3.13913 \times 10^{-3}$
$A_6 = -1.53242 \times 10^{-3}$
$A_8 = 1.98597 \times 10^{-4}$
$A_{10} = 0$ 8th surface $K = 0.000$
$A_4 = -1.43433 \times 10^{-2}$
$A_6 = -2.19219 \times 10^{-3}$
$A_8 = 6.46815 \times 10^{-5}$
$A_{10} = 0$ 9th surface $K = 0.000$
$A_4 = -1.54578 \times 10^{-2}$
$A_6 = -1.19883 \times 10^{-3}$ -continued $A_8 = 2.38275 \times 10^{-4}$
$A_{10} = 0$

Zooming Data ($\infty$)

| | WE | ST | TE |
|---|---|---|---|
| f (mm) | 4.38 | 6.18 | 8.45 |
| $F_{NO}$ | 2.84 | 3.28 | 3.84 |
| $2\omega$ (°) | 76.60 | 56.40 | 42.44 |
| $d_4$ | 6.59 | 3.46 | 1.42 |
| $d_9$ | 2.77 | 4.13 | 5.86 |

EXAMPLE 6

| | | | |
|---|---|---|---|
| $r_1 = -31.474$ (Aspheric) | $d_1 = 1.20$ | $n_{d1} = 1.88300$ | $\nu_{d1} = 40.76$ |
| $r_2 = 6.197$ (Aspheric) | $d_2 = 2.48$ | | |
| $r_3 = 10.479$ (Aspheric) | $d_3 = 2.20$ | $n_{d2} = 1.84666$ | $\nu_{d2} = 23.78$ |
| $r_4 = 47.491$ (Aspheric) | $d_4 =$ (Variable) | | |
| $r_5 = \infty$ (Stop) | $d_5 = 0.80$ | | |
| $r_6 = 3.789$ (Aspheric) | $d_6 = 3.61$ | $n_{d3} = 1.49700$ | $\nu_{d3} = 81.54$ |
| $r_7 = -16.623$ (Aspheric) | $d_7 = 0.00$ | | |
| $r_8 = -39.726$ (Aspheric) | $d_8 = 0.80$ | $n_{d4} = 1.84666$ | $\nu_{d4} = 23.78$ |
| $r_9 = 14.332$ (Aspheric) | $d_9 =$ (Variable) | | |
| $r_{10} = \infty$ | $d_{10} = 1.44$ | $n_{d5} = 1.54771$ | $\nu_{d5} = 62.84$ |
| $r_{11} = \infty$ | $d_{11} = 0.80$ | | |
| $r_{12} = \infty$ | $d_{12} = 0.80$ | $n_{d6} = 1.51633$ | $\nu_{d6} = 64.14$ |
| $r_{13} = \infty$ | $d_{13} = 1.00$ | | |
| $r_{14} = \infty$ (Image Plane) | | | |

Aspherical Coefficients

1st surface $K = 0.000$
$A_4 = 9.59521 \times 10^{-4}$
$A_6 = -1.72098 \times 10^{-5}$
$A_8 = 1.13583 \times 10^{-7}$
$A_{10} = 0$ 2nd surface $K = 0.000$
$A_4 = -3.60488 \times 10^{-4}$
$A_6 = 3.77368 \times 10^{-5}$
$A_8 = -1.07135 \times 10^{-6}$
$A_{10} = 0$ 3rd surface $K = 0.000$
$A_4 = -1.01828 \times 10^{-3}$
$A_6 = 1.27783 \times 10^{-5}$
$A_8 = 1.61699 \times 10^{-7}$
$A_{10} = 0$ 4th surface $K = 0.000$
$A_4 = -5.67770 \times 10^{-4}$
$A_6 = 1.51253 \times 10^{-6}$
$A_8 = 1.26398 \times 10^{-7}$
$A_{10} = 0$ 6th surface $K = 0.000$
$A_4 = -8.01515 \times 10^{-4}$
$A_6 = -2.76063 \times 10^{-5}$
$A_8 = -3.86277 \times 10^{-6}$
$A_{10} = 0$ 7th surface $K = 0.000$
$A_4 = 9.05298 \times 10^{-3}$
$A_6 = -1.86656 \times 10^{-3}$ -continued $A_8 = 1.48924 \times 10^{-4}$
$A_{10} = 0$ 8th surface $K = 0.000$
$A_4 = 9.67002 \times 10^{-3}$
$A_6 = -1.17161 \times 10^{-3}$
$A_8 = 7.64468 \times 10^{-5}$
$A_{10} = 0$ 9th surface $K = 0.000$
$A_4 = 7.85242 \times 10^{-3}$
$A_6 = 1.15922 \times 10^{-4}$
$A_8 = 3.78215 \times 10^{-5}$
$A_{10} = 0$

| Zooming Data (∞) | | | |
|---|---|---|---|
| | WE | ST | TE |
| f (mm) | 4.380 | 7.516 | 12.700 |
| $F_{NO}$ | 2.84 | 3.42 | 4.40 |
| 2ω (°) | 76.94 | 48.04 | 29.34 |
| $d_4$ | 19.85 | 8.42 | 1.91 |
| $d_9$ | 6.61 | 9.22 | 13.52 |

EXAMPLE 7

| | | | |
|---|---|---|---|
| $r_1 = -21.847$ (Aspheric) | $d_1 = 1.20$ | $n_{d1} = 1.88300$ | $\nu_{d1} = 40.76$ |
| $r_2 = 6.937$ (Aspheric) | $d_2 = 2.47$ | | |
| $r_3 = 9.213$ (Aspheric) | $d_3 = 2.21$ | $n_{d2} = 1.84666$ | $\nu_{d2} = 23.78$ |
| $r_4 = 32.046$ (Aspheric) | $d_4 = $ (Variable) | | |
| $r_5 = \infty$ (Stop) | $d_5 = 0.80$ | | |
| $r_6 = 3.998$ (Aspheric) | $d_6 = 3.54$ | $n_{d3} = 1.49700$ | $\nu_{d3} = 81.54$ |
| $r_7 = -21.908$ (Aspheric) | $d_7 = 0.00$ | | |
| $r_8 = -33.149$ (Aspheric) | $d_8 = 0.80$ | $n_{d4} = 1.84666$ | $\nu_{d4} = 23.78$ |
| $r_9 = 17.323$ (Aspheric) | $d_9 = $ (Variable) | | |
| $r_{10} = \infty$ | $d_{10} = 1.44$ | $n_{d5} = 1.54771$ | $\nu_{d5} = 62.84$ |
| $r_{11} = \infty$ | $d_{11} = 0.80$ | | |
| $r_{12} = \infty$ | $d_{12} = 0.80$ | $n_{d6} = 1.51633$ | $\nu_{d6} = 64.14$ |
| $r_{13} = \infty$ | $d_{13} = 1.00$ | | |
| $r_{14} = \infty$ (Image Plane) | | | |

Aspherical Coefficients

1st surface $K = 0.000$
$A_4 = 9.33410 \times 10^{-4}$
$A_6 = -1.30751 \times 10^{-5}$
$A_8 = 6.70483 \times 10^{-8}$
$A_{10} = 0$ 2nd surface $K = 0.000$
$A_4 = -6.18417 \times 10^{-4}$
$A_6 = 4.10180 \times 10^{-5}$
$A_8 = -7.84432 \times 10^{-7}$
$A_{10} = 0$ 3rd surface $K = 0.000$
$A_4 = -1.01784 \times 10^{-3}$
$A_6 = 4.66075 \times 10^{-6}$
$A_8 = 1.15224 \times 10^{-7}$
$A_{10} = 0$ 4th surface $K = 0.000$
$A_4 = -3.78733 \times 10^{-4}$
$A_6 = -7.08997 \times 10^{-6}$ -continued $A_8 = 1.63277 \times 10^{-7}$
$A_{10} = 0$ 6th surface $K = 0.000$
$A_4 = -8.04530 \times 10^{-4}$
$A_6 = -3.34025 \times 10^{-5}$
$A_8 = -6.46621 \times 10^{-6}$
$A_{10} = 0$ 7th surface $K = 0.000$
$A_4 = 2.52254 \times 10^{-3}$
$A_6 = -4.58004 \times 10^{-4}$
$A_8 = 3.15723 \times 10^{-5}$
$A_{10} = 0$ 8th surface $K = 0.000$
$A_4 = 7.40135 \times 10^{-3}$
$A_6 = -3.03505 \times 10^{-4}$
$A_8 = 1.41481 \times 10^{-5}$
$A_{10} = 0$ 9th surface $K = 0.000$
$A_4 = 8.67706 \times 10^{-3}$
$A_6 = 1.94947 \times 10^{-4}$
$A_8 = 2.90374 \times 10^{-5}$
$A_{10} = 0$

| Zooming Data (∞) | | | |
|---|---|---|---|
| | WE | ST | TE |
| f (mm) | 4.380 | 8.500 | 16.900 |
| $F_{NO}$ | 2.84 | 3.57 | 5.07 |
| 2ω (°) | 77.14 | 42.86 | 22.26 |
| $d_4$ | 25.20 | 9.37 | 1.00 |
| $d_9$ | 7.72 | 11.24 | 18.43 |

EXAMPLE 8

| | | | |
|---|---|---|---|
| $r_1 = 41.9739$ | $d_1 = 1.2000$ | $n_{d1} = 1.77250$ | $\nu_{d1} = 49.60$ |
| $r_2 = 11.1642$ | $d_2 = 2.9000$ | | |
| $r_3 = \infty$ | $d_3 = 6.5000$ | $n_{d2} = 1.78590$ | $\nu_{d2} = 44.20$ |
| $r_4 = \infty$ (Reflecting surface) | $d_4 = 6.0000$ | $n_{d3} = 1.78590$ | $\nu_{d3} = 44.20$ |
| $r_5 = \infty$ | $d_5 = 0.3971$ | | |
| $r_6 = 28.0000$ | $d_6 = 1.2000$ | $n_{d4} = 1.74330$ | $\nu_{d4} = 49.33$ |
| $r_7 = 11.3578$ (Aspheric) | $d_7 = 0.3457$ | | |
| $r_8 = 9.4845$ | $d_8 = 1.7925$ | $n_{d5} = 1.84666$ | $\nu_{d5} = 23.78$ |
| $r_9 = 14.2959$ | $d_9 = $ (Variable) | | |
| $r_{10} = \infty$ (Stop) | $d_{10} = 1.0000$ | | |
| $r_{11} = 47.8757$ | $d_{11} = 1.9600$ | $n_{d6} = 1.72916$ | $\nu_{d6} = 54.68$ |
| $r_{12} = -9.0806$ | $d_{12} = 0.7000$ | $n_{d7} = 1.72825$ | $\nu_{d7} = 28.46$ |
| $r_{13} = -25.4395$ | $d_{13} = $ (Variable) | | |
| $r_{14} = 9.1761$ (Aspheric) | $d_{14} = 1.9500$ | $n_{d8} = 1.74330$ | $\nu_{d8} = 49.33$ |
| $r_{15} = 75.3616$ | $d_{15} = 0.8461$ | | |
| $r_{16} = 24.3002$ | $d_{16} = 3.8969$ | $n_{d9} = 1.74330$ | $\nu_{d9} = 49.33$ |
| $r_{17} = \infty$ | $d_{17} = 1.0000$ | $n_{d10} = 1.72825$ | $\nu_{d10} = 28.46$ |
| $r_{18} = 4.8249$ | $d_{18} = $ (Variable) | | |
| $r_{19} = 49.5382$ | $d_{19} = 2.7500$ | $n_{d11} = 1.69350$ | $\nu_{d11} = 53.20$ |
| $r_{20} = -10.0407$ (Aspheric) | $d_{20} = 0.8269$ | | |
| $r_{21} = \infty$ | $d_{21} = 1.4400$ | $n_{d12} = 1.54771$ | $\nu_{d12} = 62.84$ |
| $r_{22} = \infty$ | $d_{22} = 0.8000$ | | |
| $r_{23} = \infty$ | $d_{23} = 0.8000$ | $n_{d13} = 1.51633$ | $\nu_{d13} = 64.14$ |
| $r_{24} = \infty$ | $d_{24} = 1.0447$ | | |
| $r_{25} = \infty$ (Image Plane) | | | |

-continued

Aspherical Coefficients

7th surface

K = 0
$A_4 = 2.2504 \times 10^{-5}$
$A_6 = 2.6875 \times 10^{-6}$
$A_8 = -1.2962 \times 10^{-7}$
$A_{10} = 2.8718 \times 10^{-9}$ 14th surface K = 0
$A_4 = -9.8664 \times 10^{-5}$
$A_6 = 4.0400 \times 10^{-6}$
$A_8 = -4.4986 \times 10^{-7}$
$A_{10} = 1.3851 \times 10^{-8}$ 20th surface K = 0
$A_4 = 5.3089 \times 10^{-4}$
$A_6 = -1.6198 \times 10^{-5}$
$A_8 = 4.4581 \times 10^{-7}$
$A_{10} = -4.9080 \times 10^{-9}$ Zooming Data (∞)

|  | WE | ST | TE |
|---|---|---|---|
| f (mm) | 6.02622 | 9.31725 | 14.28897 |
| $F_{NO}$ | 2.7652 | 3.4888 | 4.5271 |
| 2ω (°) | 62.00 | 43.00 | 29.00 |
| $d_9$ | 14.24100 | 6.97804 | 2.00694 |
| $d_{13}$ | 2.10000 | 6.51339 | 5.34809 |
| $d_{18}$ | 2.46549 | 5.31403 | 11.45279 |

EXAMPLE 9

| $r_1 = 37.425$ | $d_1 = 1.20$ | $n_{d1} = 1.80610$ | $v_{d1} = 40.92$ |
|---|---|---|---|
| $r_2 = 4.340$ (Aspheric) | $d_2 = 2.33$ | | |
| $r_3 = 8.271$ | $d_3 = 1.62$ | $n_{d2} = 1.84666$ | $v_{d2} = 23.78$ |
| $r_4 = 16.244$ | $d_4 = $ (Variable) | | |
| $r_5 = \infty$ (Stop) | $d_5 = -0.69$ | | |
| $r_6 = 4.921$ (Aspheric) | $d_6 = 3.18$ | $n_{d3} = 1.58313$ | $v_{d3} = 59.38$ |
| $r_7 = 7.888$ | $d_7 = 1.19$ | $n_{d4} = 1.84666$ | $v_{d4} = 23.78$ |
| $r_8 = 4.000$ | $d_8 = 2.21$ | $n_{d5} = 1.51633$ | $v_{d5} = 64.14$ |
| $r_9 = -18.220$ (Aspheric) | $d_9 = $ (Variable) | | |
| $r_{10} = \infty$ | $d_{10} = 1.40$ | $n_{d6} = 1.51633$ | $v_{d6} = 64.14$ |
| $r_{11} = \infty$ | $d_{11} = 1.23$ | | |
| $r_{12} = \infty$ (Image Plane) | | | |

Aspherical Coefficients

2nd surface

K = −0.616
$A_4 = 4.19816 \times 10^{-5}$
$A_6 = 3.00998 \times 10^{-6}$
$A_8 = -5.10775 \times 10^{-7}$
$A_{10} = 1.25720 \times 10^{-8}$ 6th surface K = −1.054
$A_4 = 5.11035 \times 10^{-4}$
$A_6 = 5.98520 \times 10^{-5}$
$A_8 = -7.46930 \times 10^{-6}$
$A_{10} = 4.30043 \times 10^{-7}$ 9th surface K = −3.568
$A_4 = 1.01719 \times 10^{-3}$
$A_6 = 2.98170 \times 10^{-4}$ -continued $A_8 = -5.10422 \times 10^{-5}$
$A_{10} = 5.07257 \times 10^{-6}$ Zooming Data (∞)

|  | WE | ST | TE |
|---|---|---|---|
| f (mm) | 5.950 | 10.090 | 17.100 |
| $F_{NO}$ | 3.05 | 3.88 | 5.30 |
| 2ω (°) | 64.44 | 39.64 | 23.82 |
| $d_4$ | 13.06 | 6.02 | 1.87 |
| $d_9$ | 8.41 | 12.17 | 18.56 |

EXAMPLE 10

| $r_1 = 24.168$ | $d_1 = 1.20$ | $n_{d1} = 1.77250$ | $v_{d1} = 49.60$ |
|---|---|---|---|
| $r_2 = 3.625$ (Aspheric) | $d_2 = 1.71$ | | |
| $r_3 = 5.714$ | $d_3 = 1.68$ | $n_{d2} = 1.75520$ | $v_{d2} = 27.51$ |
| $r_4 = 10.180$ | $d_4 = $ (Variable) | | |
| $r_5 = \infty$ (Stop) | $d_5 = -0.35$ | | |
| $r_6 = 3.233$ (Aspheric) | $d_6 = 1.43$ | $n_{d3} = 1.58313$ | $v_{d3} = 59.38$ |
| $r_7 = 6.623$ | $d_7 = 0.80$ | $n_{d4} = 1.80809$ | $v_{d4} = 22.76$ |
| $r_8 = 3.386$ | $d_8 = 0.44$ | | |
| $r_9 = 11.388$ | $d_9 = 1.55$ | $n_{d5} = 1.61800$ | $v_{d5} = 63.33$ |
| $r_{10} = -6.894$ | $d_{10} = $ (Variable) | | |
| $r_{11} = \infty$ | $d_{11} = 1.40$ | $n_{d6} = 1.51633$ | $v_{d6} = 64.14$ |
| $r_{12} = \infty$ | $d_{12} = 0.60$ | | |
| $r_{13} = \infty$ | $d_{13} = 0.50$ | $n_{d7} = 1.51633$ | $v_{d7} = 64.14$ |
| $r_{14} = \infty$ | $d_{14} = 0.20$ | | |
| $r_{15} = \infty$ (Image Plane) | | | |

Aspherical Coefficients

2nd surface

K = −0.465
$A_4 = -3.25794 \times 10^{-11}$
$A_6 = 3.11677 \times 10^{-13}$
$A_8 = -8.29472 \times 10^{-7}$
$A_{10} = 0$ 6th surface K = −0.640
$A_4 = -2.72851 \times 10^{-7}$
$A_6 = 6.13668 \times 10^{-6}$
$A_8 = 5.73050 \times 10^{-6}$
$A_{10} = 0$ Zooming Data (∞)

|  | WE | ST | TE |
|---|---|---|---|
| f (mm) | 5.943 | 8.190 | 11.468 |
| $F_{NO}$ | 3.70 | 4.23 | 5.00 |
| 2ω (°) | 64.98 | 48.56 | 35.26 |
| $d_4$ | 7.41 | 3.96 | 1.35 |
| $d_{10}$ | 7.75 | 9.51 | 12.06 |

EXAMPLE 11

| $r_1 = 12462.55 \times 10^3$ (Aspheric) | $d_1 = 1.20$ | $n_{d1} = 1.77250$ | $v_{d1} = 49.60$ |
|---|---|---|---|
| $r_2 = 5.496$ (Aspheric) | $d_2 = 2.11$ | $n_{d2} = 1.82114$ | $v_{d2} = 24.06$ |
| $r_3 = 7.122$ (Aspheric) | $d_3 = 1.80$ | $n_{d3} = 1.49700$ | $v_{d3} = 81.54$ |
| $r_4 = 10.794$ (Aspheric) | $d_4 = $ (Variable) | $n_{d4} = 1.80809$ | $v_{d4} = 22.76$ |
| $r_5 = $ (Stop) | $d_5 = -0.80$ | $n_{d5} = 1.51633$ | $v_{d5} = 64.14$ |

-continued $r_6 = 3.761$ (Aspheric)   $d_6 = 3.00$
$r_7 = -18.002$ (Aspheric)  $d_7 = 0.10$
$r_8 = 31057.39 \times 10^4$  $d_8 = 0.80$
(Aspheric)
$r_9 = 13.522$ (Aspheric)   $d_9 =$ (Variable)
$r_{10} = \infty$            $d_{10} = 1.40$
$r_{11} = \infty$            $d_{11} = 1.21$
$r_{12} = \infty$ (Image Plane)

Aspherical Coefficients
1st surface

K = 155897576578.712
$A_4 = 8.38348 \times 10^{-4}$
$A_6 = -7.53985 \times 10^{-6}$
$A_8 = -7.27194 \times 10^{-13}$
$A_{10} = -3.30876 \times 10^{-16}$
2nd surface K = 0.000
$A_4 = 8.09861 \times 10^{-8}$
$A_6 = 5.42172 \times 10^{-5}$
$A_8 = 1.55129 \times 10^{-8}$
$A_{10} = -1.43967 \times 10^{-13}$
3rd surface K = -4.030
$A_4 = 7.11686 \times 10^{-11}$
$A_6 = 1.34660 \times 10^{-13}$
$A_8 = 5.65779 \times 10^{-11}$
$A_{10} = 6.30109 \times 10^{-9}$
4th surface K = -0.009
$A_4 = -1.08004 \times 10^{-3}$
$A_6 = -6.22520 \times 10^{-8}$
$A_8 = 1.29836 \times 10^{-13}$
$A_{10} = -9.49582 \times 10^{-15}$
6th surface K = -0.291
$A_4 = 5.61401 \times 10^{-6}$
$A_6 = 9.69717 \times 10^{-7}$
$A_8 = 3.44988 \times 10^{-6}$
$A_{10} = 6.10050 \times 10^{-8}$
7th surface K = 0.000
$A_4 = 4.23632 \times 10^{-3}$
$A_6 = -4.72010 \times 10^{-4}$
$A_8 = 9.20080 \times 10^{-6}$
$A_{10} = 8.25389 \times 10^{-7}$
8th surface K = -9001283945.651
$A_4 = 6.72716 \times 10^{-3}$
$A_6 = -5.24190 \times 10^{-4}$
$A_8 = 7.77385 \times 10^{-6}$
$A_{10} = -5.06707 \times 10^{-7}$
9th surface K = 0.000
$A_4 = 7.65620 \times 10^{-3}$
$A_6 = -2.71735 \times 10^{-8}$
$A_8 = 2.11395 \times 10^{-5}$
$A_{10} = 3.97777 \times 10^{-6}$ Zooming Data ($\infty$)

|  | WE | ST | TE |
|---|---|---|---|
| f (mm) | 5.906 | 10.178 | 17.050 |
| $F_{NO}$ | 2.86 | 3.68 | 5.00 |
| $2\omega(°)$ | 65.34 | 39.32 | 23.82 |
| $d_4$ | 12.76 | 5.72 | 1.80 |
| $d_9$ | 8.25 | 11.60 | 17.00 |

EXAMPLE 12

$r_1 = 16.208$ (Aspheric)   $d_1 = 1.20$   $n_{d1} = 1.69350$   $v_{d1} = 53.21$
$r_2 = 4.307$ (Aspheric)    $d_2 = 3.00$   $n_{d2} = 1.78470$   $v_{d2} = 26.29$
$r_3 = 5.183$               $d_3 = 1.05$   $n_{d3} = 1.49700$   $v_{d3} = 81.54$
$r_4 = 5.749$               $d_4 =$ (Variable)  $n_{d4} = 1.80809$   $v_{d4} = 22.76$
$r_5 = \infty$ (Stop)       $d_5 = -0.30$  $n_{d5} = 1.51633$   $v_{d5} = 64.14$
$r_6 = 3.994$ (Aspheric)    $d_6 = 2.22$
$r_7 = -7.208$ (Aspheric)   $d_7 = 0.10$
$r_8 = 3.928$               $d_8 = 0.70$
$r_9 = 2.591$               $d_9 =$ (Variable)
$r_{10} = \infty$           $d_{10} = 1.40$
$r_{11} = \infty$           $d_{11} = 1.14$
$r_{12} = \infty$ (Image Plane)

Aspherical Coefficients
1st surface

K = 4.649
$A_4 = -5.99321 \times 10^{-5}$
$A_6 = 8.63310 \times 10^{-7}$
$A_8 = 8.17942 \times 10^{-10}$
$A_{10} = 0$
2nd surface K = 0.002
$A_4 = -2.45506 \times 10^{-6}$
$A_6 = -7.04344 \times 10^{-6}$
$A_8 = -5.87327 \times 10^{-7}$
$A_{10} = 0$
6th surface K = -0.869
$A_4 = -1.68712 \times 10^{-3}$
$A_6 = 6.67467 \times 10^{-5}$
$A_8 = -6.39445 \times 10^{-5}$
$A_{10} = 0$
7th surface K = 3.594
$A_4 = 1.13704 \times 10^{-3}$
$A_6 = -6.24521 \times 10^{-6}$
$A_8 = -3.84390 \times 10^{-5}$
$A_{10} = 0$ Zooming Data ($\infty$)

|  | WE | ST | TE |
|---|---|---|---|
| f (mm) | 5.908 | 8.174 | 11.533 |
| $F_{NO}$ | 3.67 | 4.20 | 5.00 |
| $2\omega(°)$ | 64.88 | 47.88 | 34.44 |
| $d_4$ | 8.19 | 4.27 | 1.30 |
| $d_9$ | 6.49 | 7.92 | 10.10 |

FIGS. 13 to 24 are aberration diagrams indicative of spherical aberrations, comae, distortions and chromatic aberrations of magnification of Examples 1 to 12 upon focused on an infinite object point. In these diagrams, (a) stand for aberrations at the wide-angle end, (b) those in the intermediate state and (c) those at the telephoto end.

The values concerning condition (1) in Examples 1 to 12 are enumerated below.

|  | Example | | | | | |
|---|---|---|---|---|---|---|
|  | 1 | 2 | 3 | 4 | 5 | 6 |
| Wide-angle α | 5.70 | 6.28 | 6.86 | 6.91 | 6.53 | 6.71 |
| Wide-angle β | 6.59 | 10.65 | 11.56 | 12.28 | 5.81 | 9.15 |
| Wide-angle α/β | 0.86 | 0.59 | 0.59 | 0.56 | 1.12 | 0.73 |
| Telephoto end α | 5.70 | 6.28 | 6.86 | 6.91 | 6.53 | 6.71 |

-continued

| | | | | | | |
|---|---|---|---|---|---|---|
| Telephoto end β | 9.71 | 19.50 | 25.65 | 29.69 | 8.90 | 16.06 |
| Telephoto end α/β | 0.59 | 0.32 | 0.27 | 0.23 | 0.73 | 0.42 |

| | Example | | | | | |
|---|---|---|---|---|---|---|
| | 7 | 8 | 9 | 10 | 11 | 12 |
| Wide-angle α | 6.64 | 4.76 | 6.62 | 4.87 | 4.60 | 4.72 |
| Wide-angle β | 10.26 | 18.82 | 16.66 | 14.32 | 13.96 | 11.75 |
| Wide-angle α/β | 0.65 | 0.25 | 0.40 | 0.34 | 0.33 | 0.40 |
| Telephoto end α | 6.64 | 8.01 | 6.62 | 4.87 | 4.60 | 4.72 |
| Telephoto end β | 20.97 | 27.81 | 26.81 | 18.63 | 22.71 | 15.36 |
| Telephoto end α/β | 0.32 | 0.29 | 0.25 | 0.26 | 0.20 | 0.31 |

The values of $\phi\alpha$, $\phi\beta$ (=$\phi\beta'$) concerning conditions (2) and (4) in Examples 1 to 12 and the values of $\phi\beta/\phi\alpha$ (=$\phi\beta'/\phi\alpha$) at the wide-angle end are also tabulated below.

| | Example | | | | | |
|---|---|---|---|---|---|---|
| | 1 | 2 | 3 | 4 | 5 | 6 |
| $\phi\alpha$ | 3.67 | 5.33 | 5.91 | 6.27 | 3.34 | 4.90 |
| $\phi\beta$ | 4.07 | 4.80 | 5.12 | 5.28 | 4.09 | 4.51 |
| $\phi\beta/\phi\alpha$ at the wide-angle end | 1.11 | 0.90 | 0.87 | 0.84 | 1.22 | 0.92 |

| | Example | | | | | |
|---|---|---|---|---|---|---|
| | 7 | 8 | 9 | 10 | 11 | 12 |
| $\phi\alpha$ | 5.32 | 5.20 | 5.13 | 3.30 | 5.04 | 3.20 |
| $\phi\beta$ | 4.80 | 5.68 | 4.61 | 3.47 | 4.60 | 3.62 |
| $\phi\beta/\phi\alpha$ at the wide-angle end | 0.90 | 1.09 | 0.90 | 1.05 | 0.91 | 1.13 |

In each example, the second lens group G2 (Examples 1-7 and 9-12) or the fourth lens group G4 (Example 8) is provided on its image side with a low-pass filter F or F' having a near-infrared sharp cut coat on its entrance surface side. This near-infrared sharp cut coat is designed to have a transmittance of at least 80% at 600 nm wavelength and a transmittance of up to 10% at 700 nm wavelength. More specifically, the near-infrared sharp cut coat has a multilayer structure made up of such 27 layers as mentioned below provided that the design wavelength is 780 nm.

Substrate Material Physical Thickness (nm) λ/4

| | | | |
|---|---|---|---|
| 1st layer | Al$_2$O$_3$ | 58.96 | 0.50 |
| 2nd layer | TiO$_2$ | 84.19 | 1.00 |
| 3rd layer | SiO$_2$ | 134.14 | 1.00 |
| 4th layer | TiO$_2$ | 84.19 | 1.00 |
| 5th layer | SiO$_2$ | 134.14 | 1.00 |
| 6th layer | TiO$_2$ | 84.19 | 1.00 |
| 7th layer | SiO$_2$ | 134.14 | 1.00 |
| 8th layer | TiO$_2$ | 84.19 | 1.00 |
| 9th layer | SiO$_2$ | 134.14 | 1.00 |
| 10th layer | TiO$_2$ | 84.19 | 1.00 |
| 11th layer | SiO$_2$ | 134.14 | 1.00 |
| 12th layer | TiO$_2$ | 84.19 | 1.00 |
| 13th layer | SiO$_2$ | 134.14 | 1.00 |
| 14th layer | TiO$_2$ | 84.19 | 1.00 |
| 15th layer | SiO$_2$ | 178.41 | 1.33 |
| 16th layer | TiO$_2$ | 101.03 | 1.21 |
| 17th layer | SiO$_2$ | 167.67 | 1.25 |
| 18th layer | TiO$_2$ | 96.82 | 1.15 |
| 19th layer | SiO$_2$ | 147.55 | 1.05 |
| 20th layer | TiO$_2$ | 84.19 | 1.00 |
| 21st layer | SiO$_2$ | 160.97 | 1.20 |
| 22nd layer | TiO$_2$ | 84.19 | 1.00 |
| 23rd layer | SiO$_2$ | 154.26 | 1.15 |
| 24th layer | TiO$_2$ | 95.13 | 1.13 |
| 25th layer | SiO$_2$ | 160.97 | 1.20 |
| 26th layer | TiO$_2$ | 99.34 | 1.18 |
| 27th layer | SiO$_2$ | 87.19 | 0.65 |

Air

Figure 25:
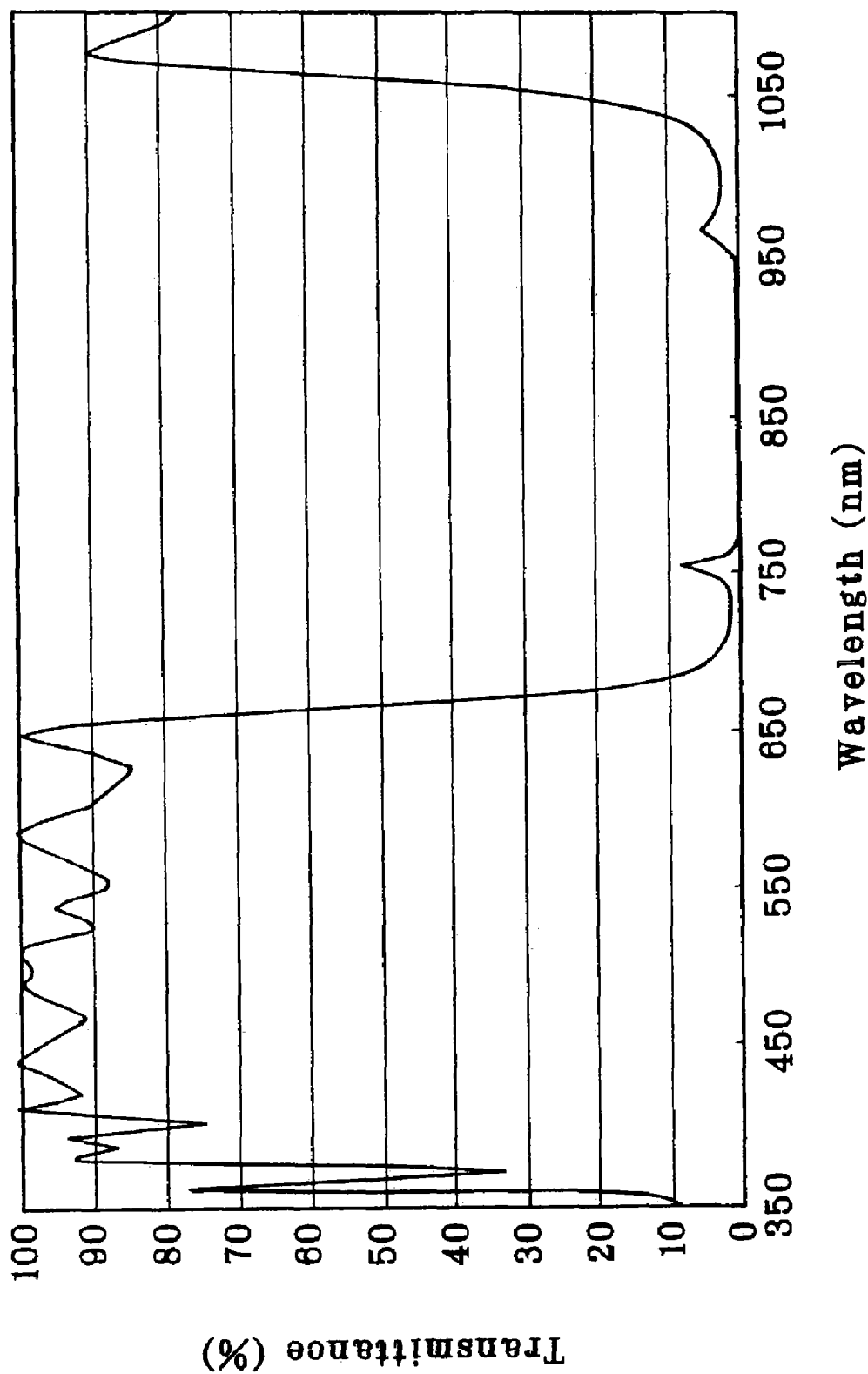
FIG. 25 is illustrative of the transmittance characteristics of one example of a near-infrared sharp cut coat.

The aforesaid near-infrared sharp cut coat has such transmittance characteristics as shown in FIG. 25.

Figure 26:
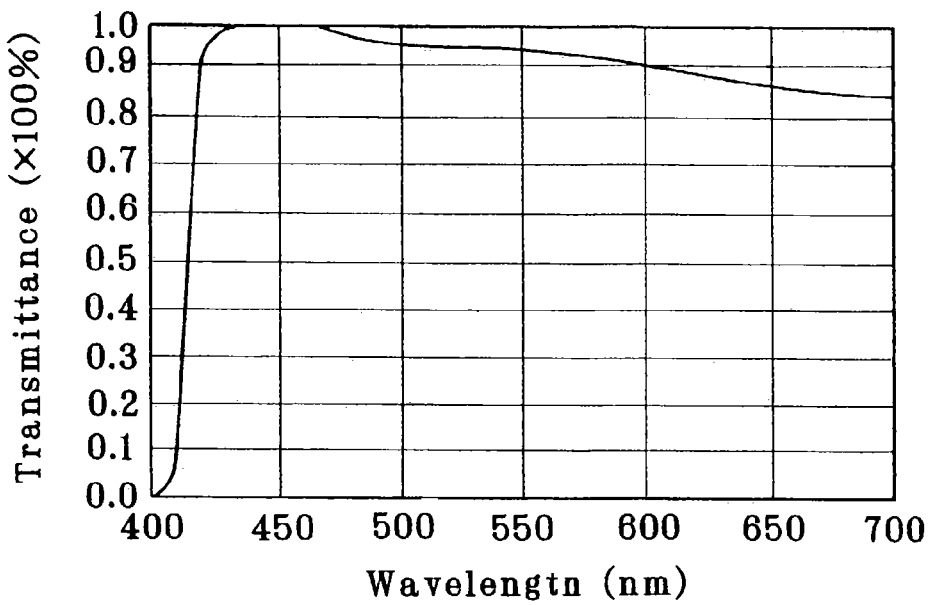
FIG. 26 is illustrative of the transmittance characteristics of one example of a color filter located on the exit surface side of a low-pass filter.

The low-pass filter F is provided on its exit surface side with a color filter or coat for reducing the transmission of colors at such a short wavelength range as shown in FIG. 26, thereby making the color reproducibility of an electronic image much higher.

Preferably, that filter or coat should be designed such that the ratio of the transmittance of 420 nm wavelength with respect to the highest transmittance of a wavelength that is found in the range of 400 nm to 700 nm is at least 15% and that the ratio of 400 nm wavelength with respect to the highest wavelength transmittance is up to 6%.

It is thus possible to reduce a discernible difference between the colors perceived by the human eyes and the colors of the image to be picked up and reproduced. In other words, it is possible to prevent degradation in images due to the fact that a color of short wavelength less likely to be perceived through the human sense of sight can be readily seen by the human eyes.

When the ratio of the 400 nm wavelength transmittance is greater than 6%, the short wavelength region less likely to be perceived by the human eyes would be reproduced with perceivable wavelengths. Conversely, when the ratio of the 420 nm wavelength transmittance is less than 15%, a wavelength range perceivable by the human eyes is less likely to be reproduced, putting colors in an ill-balanced state.

Such means for limiting wavelengths can be more effective for imaging systems using a complementary colors mosaic filter.

In each of the aforesaid examples, coating is applied in such a way that, as shown in FIG. 26, the transmittance for 400 nm wavelength is 0%, the transmittance for 420 nm is 90%, and the transmittance for 440 nm peaks or reaches 100%.

With the synergistic action of the aforesaid near-infrared sharp cut coat and that coating, the transmittance for 400 nm is set at 0%, the transmittance for 420 nm at 80%, the transmittance for 600 nm at 82%, and the transmittance for 700 nm at 2% with the transmittance for 450 nm wavelength peaking at 99%, thereby ensuring more faithful color reproduction.

The low-pass filter F is made up of three different filter elements stacked one upon another in the optical axis direction, each filter element having crystal axes in directions where, upon projected onto the image plane, the azimuth angle is horizontal (=0°) and ±45° therefrom. Three such filter elements are mutually displaced by a μm in the horizontal direction and by SQRT(½)×a in the ±45° direction for the purpose of moiré control, wherein SQRT means a square root.

Figure 27:
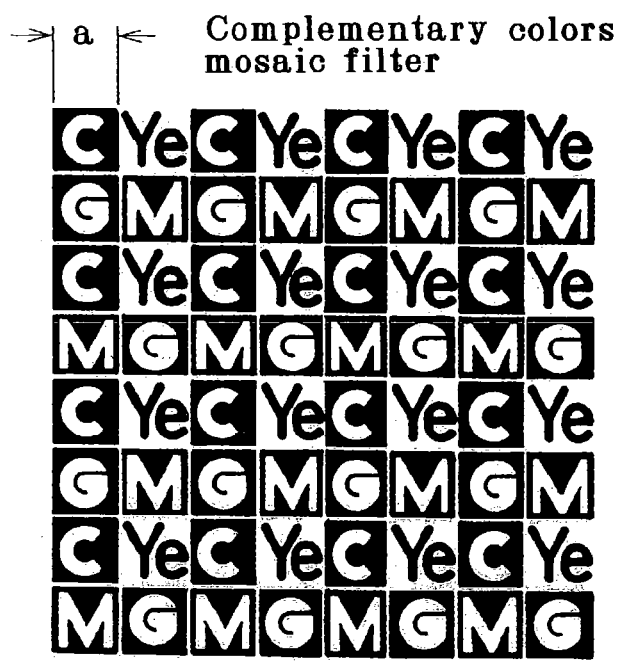
FIG. 27 is illustrative of how color filter elements are arranged for a complementary colors filter.

The image pickup plane I of a CCD is provided thereon with a complementary colors mosaic filter wherein, as shown in FIG. 27, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

To be more specific, the complementary colors mosaic filter is composed of at least four different color filter elements as shown in FIG. 27, which should preferably have such characteristics as given below.

Each green color filter element G has a spectral strength peak at a wavelength $G_p$, each yellow filter element $Y_e$ has a spectral strength peak at a wavelength $Y_p$, each cyan filter element C has a spectral strength peak at a wavelength $C_p$, and each magenta filter element M has spectral strength peaks at wavelengths $M_{p1}$ and $M_{p2}$, and these wavelengths satisfy the following conditions.

$$510 \text{ nm} < G_p < 540 \text{ nm}$$

$$5 \text{ nm} < Y_p - G_p < 35 \text{ nm}$$

$$-100 \text{ nm} < C_p - G_p < -5 \text{ nm}$$

$$430 \text{ nm} < M_{p1} < 480 \text{ nm}$$

$$580 \text{ nm} < M_{p2} < 640 \text{ nm}$$

To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with their spectral strength peak.

Figure 28:
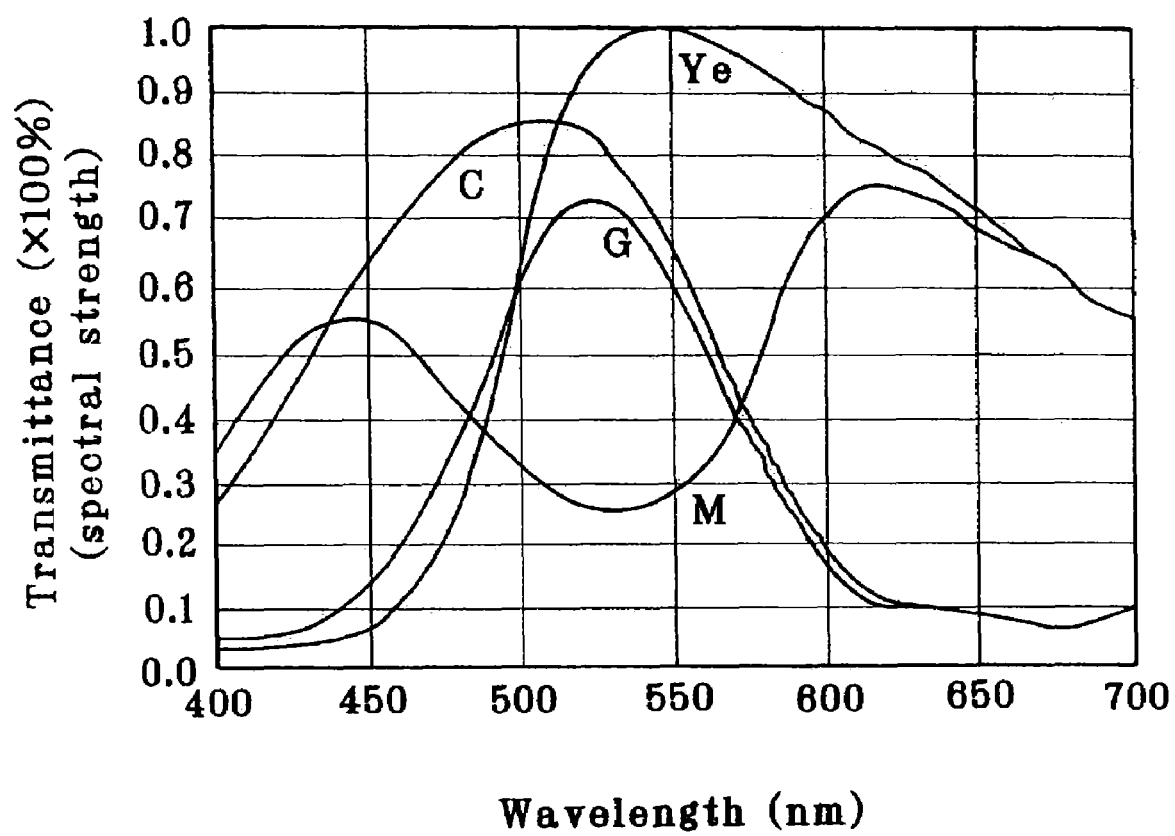
FIG. 28 is illustrative of one example of the wavelength characteristics of the complementary colors filter.

One example of the wavelength characteristics in the aforesaid respective examples is shown in FIG. 28. The green filter element G has a spectral strength peak at 525 nm. The yellow filter element $Y_e$ has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for $Y_e$, 97% for C and 38% for M.

For such a complementary colors filter, such signal processing as mentioned below is electrically carried out by means of a controller (not shown) (or a controller used with digital cameras).

For luminance signals, $$Y = |G + M + Y_e + C| \times 1/4$$

For chromatic signals, $$R - Y = |(M + Y_e) - (G + C)|$$

$$B - Y = |(M + C) - (G + Y_e)|$$

Through this signal processing, the signals from the complementary colors filter are converted into R (red), G (green) and B (blue) signals.

Now for, it is noted that the aforesaid near-infrared sharp cut coat may be located anywhere on the optical path, and that the number of low-pass filters F may be either two as mentioned above or one.

In the zoom lens used with the electronic imaging system according to the invention, the aperture stop of fixed shape (fixed stop) and the light quantity control filter or shutter are provided. As already described, the fixed stop should preferably be configured such that when $1.5 \times 10^3 \times a/1 \text{ mm} < F$ where F is the full-aperture F-number at the telephoto end and a is the minimum pixel pitch in mm of the electronic image pickup device, the length of the aperture stop in the vertical or horizontal direction of the image pickup plane is longer than the length of the aperture stop in the diagonal direction of the image pickup plane.

Figures 29A, 29B, 29C:
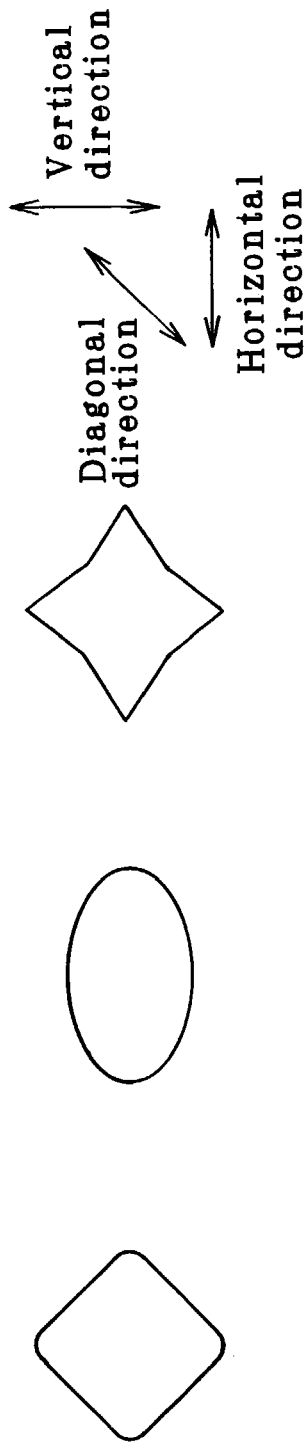
FIGS. 29(a), 29(b) and 29(c) are illustrative of a fixed stop used with the zoom lens of the invention comprising a fixed stop and a filter or a shutter, especially examples of the shape of that fixed stop when it is larger than the theoretical F-number limit.

By use of, for instance, any one of the configurations shown in FIGS. 29(a), 29(b) and 29(c), the influence of diffraction can be minimized. For photography where it is desired to minimize the influence of diffraction in the horizontal direction in particular, it is preferable to use an oblong aperture stop.

Alternatively, the fixed stop should preferably be configured such that when $1.5 \times 10^3 \times a/1 \text{ mm} > F$, the length of the aperture stop in the vertical or horizontal direction of the image pickup plane is shorter than the length of the aperture stop in the diagonal direction of the image pickup plane.

Figures 30A, 30B, 30C:
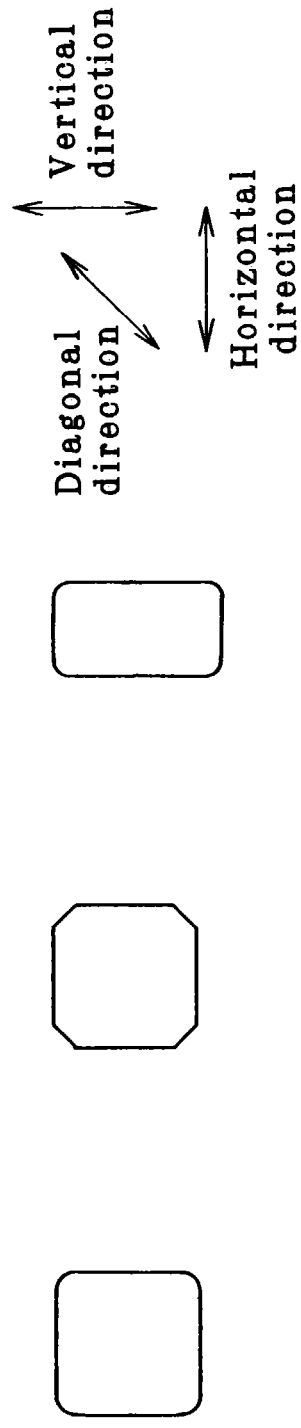
FIGS. 30(a), 30(b) and 30(c) are illustrative of a fixed stop used with the zoom lens of the invention comprising a fixed stop and a filter or a shutter, especially examples of the shape of that fixed stop when it is smaller than the theoretical F-number limit.

By use of, for instance, any one of the configurations shown in FIGS. 30(a), 30(b) and 30(c), the influence of geometrical aberrations can be minimized. For photography where it is desired to minimize the influence of geometrical aberrations in the horizontal direction in particular, it is preferable to use an oblong aperture stop.

Figure 31:
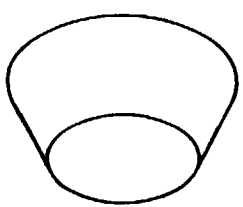
FIG. 31 is illustrative of one exemplary funnel-form fixed stop.

Referring here to numerical data on zoom lenses, the spacing between the fixed stop and the subsequent lens surface has often a minus value due to the fact that the lens surface is positioned with respect to the fixed stop position in the opposite direction to the optical axis direction. In such cases, the fixed stop takes a plane plate form. However, it is acceptable to use an optically blacked lens surface having a circular aperture (see FIG. 34), a funnel-form stop applied over the lens surface along the gradient of the convex lens (see FIG. 31) or a stop formed by a lens holding barrel.

Figure 32:
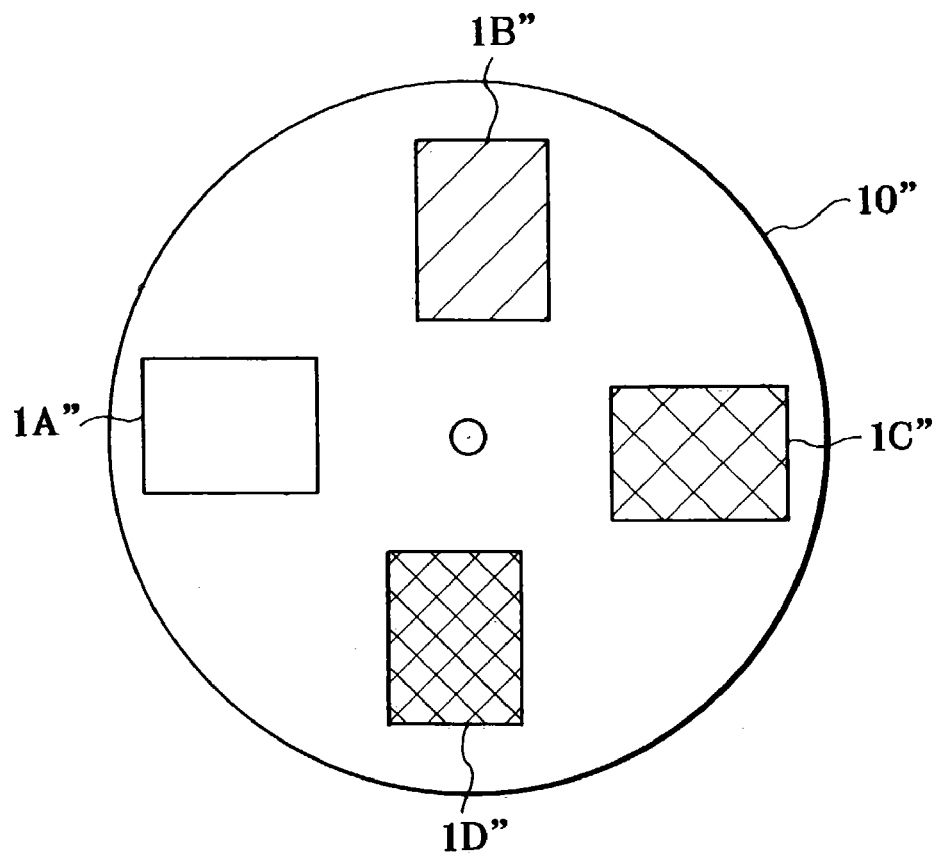
FIG. 32 is illustrative of a turret-form light quantity control filter that can be used in the invention.

For light quantity control, it is acceptable to use a turret-form filter that, as shown in FIG. 32, comprises a turret 10" having a plain or hollow aperture 1A", an aperture 1B" defined by an ND filter having a transmittance of ½, an aperture 1C" defined by an ND filter having a transmittance of ¼, an aperture 1D" defined by an ND filter having a transmittance of ⅛, etc.

Figure 33:
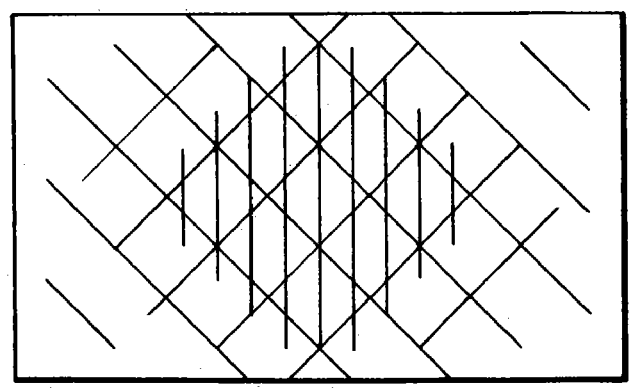
FIG. 33 is illustrative of one example of a filter that reduces variations of light quantity.

For the light quantity control filter, it is also acceptable to use a filter surface capable of performing light quantity control in such a way as to reduce light quantity variations, for instance, a filter in which, as shown in FIG. 33, the quantity of light decreases concentrically toward its center in such a way that for a dark subject, uniform transmittance is achieved while the quantity of light at its center is preferentially ensured, and for a bright subject alone, brightness variations are made up for.

Figure 34:
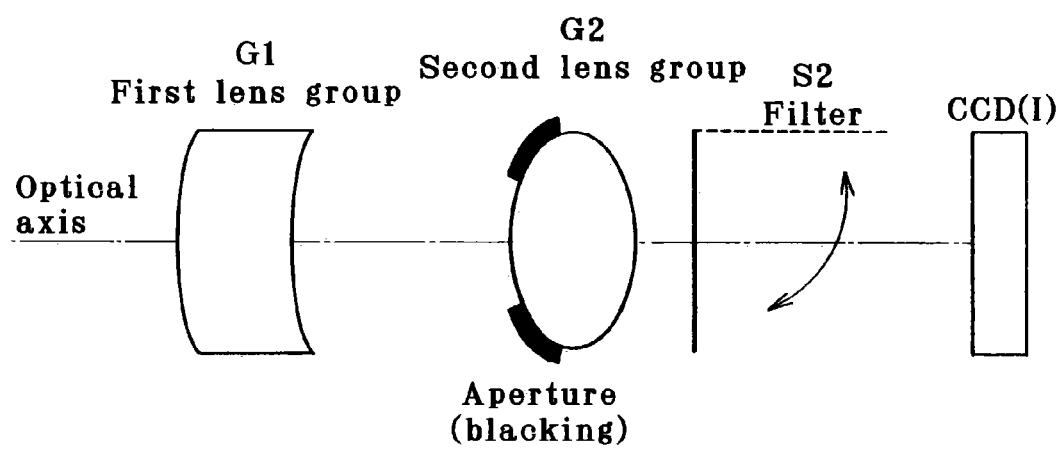
FIG. 34 is illustrative of one example of a filter that can be inserted in or de-inserted from an optical path by fluctuation (rocking or swaying movement).

Further, as schematically shown in FIG. 34, it is acceptable to insert or de-insert a filter S2 in or from an optical path by fluctuation (rocking or swaying movement). This in turn makes space savings possible because there is some space after the second lens group G2.

Figure 35:
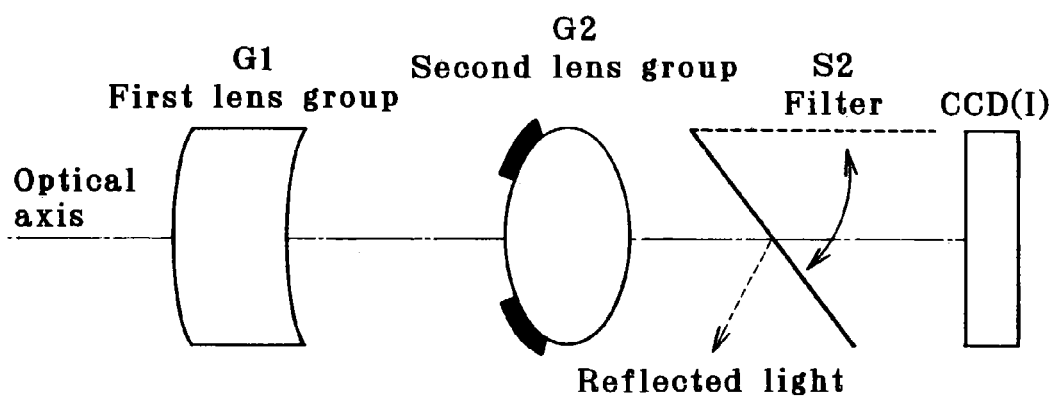
FIG. 35 is illustrative of the structure for insertion or de-insertion by fluctuation of a filter for reducing ghosts due to reflected light.

It is also acceptable to tilt the light quantity control filter S2 with respect to the optical axis as schematically shown in FIG. 35, so that ghosts due to light reflected at ND filters can be reduced or eliminated. With the filter S2 having a fluctuating structure, fast phototaking operation is achievable because the angle of movement upon fluctuation can be set within an acute range.

The light quantity control filter could be formed of two polarizing filter elements of which the polarization directions are varied for light quantity control. Instead of or in addition to the filter, a shutter could be used. For that shutter, various shutters represented by a focal plane shutter having a moving curtain located in the vicinity of the image plane, a double-blade lens shutter located in the optical path, a focal plane shutter and a liquid crystal shutter could be used.

Figure 36:
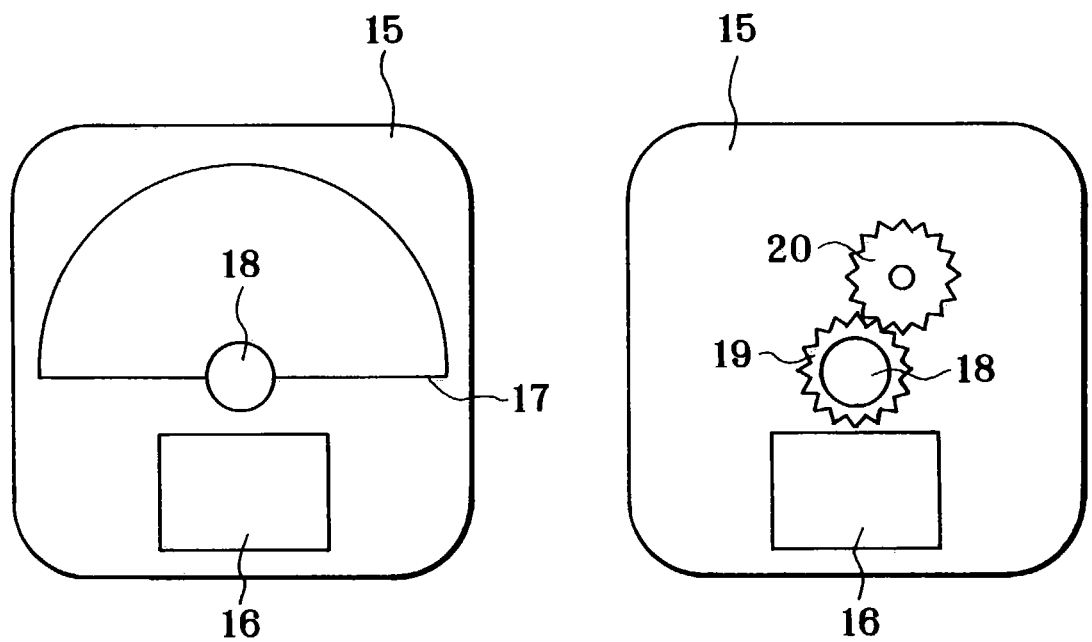
FIG. 36 is a front and a rear view of one example of a rotary focal plane shutter.
Figure 37A:
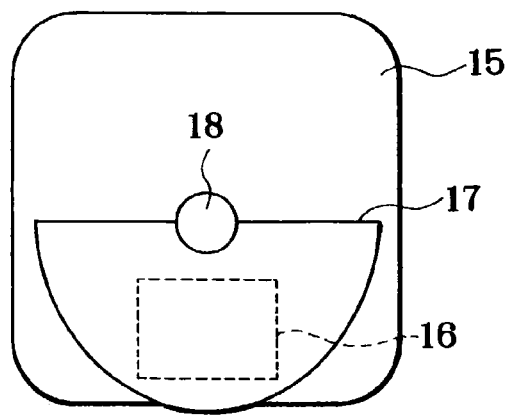
FIGS. 37(a), 37(b), 37(c) and 37(d) are illustrative of how the rotary shutter curtain of the shutter of FIG. 36 is rotated.
Figure 37B:
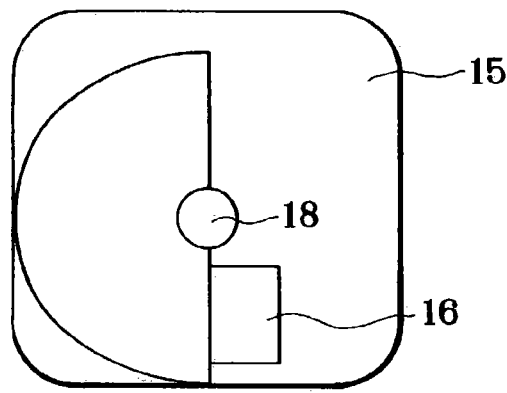
Figure 37C:
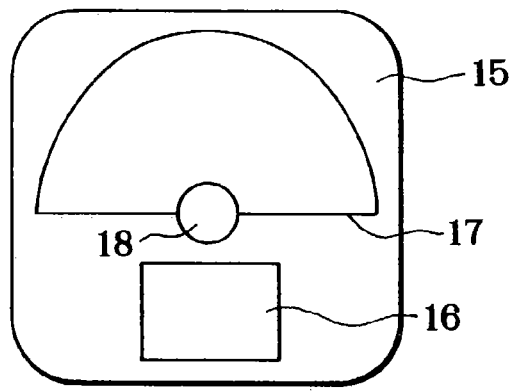
Figure 37D:
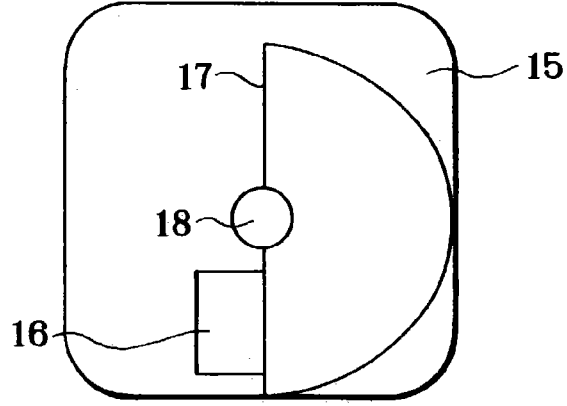

FIG. 36 is illustrative of one example of the shutter used herein. FIGS. 36(a) and 36(b) are a rear and a front view of a rotary focal plane shutter that is a sort of the focal plane shutter. Reference numeral 15 is a shutter substrate that is to be located just before the image plane or at any desired position in the optical path. The substrate 15 is provided with an aperture 16 through which an effective light beam through an optical system is transmitted. Numeral 17 is a rotary shutter curtain, and 18 a rotary shaft of the rotary shutter curtain 17. The rotary shaft 18 rotates with respect to the substrate 15, and is integral with the rotary shutter curtain 17. The rotary shaft 18 is engaged with gears 19 and 20 on the surface of the substrate 15. The gears 19 and 20 are connected to a motor not shown.

As the motor not shown is driven, the rotary shutter curtain 17 is rotated around the rotary shaft 18 via the gears 19 and 20.

Having a substantially semi-circular shape, the rotary shutter curtain 17 is rotated to open or close the aperture 16 in the substrate 15 to perform a shutter role. The shutter speed is then controlled by varying the speed of rotation of the rotary shutter curtain 17.

FIGS. 37(a) to 37(d) are illustrative of how the rotary shutter curtain 17 is rotated as viewed from the image plane side. The rotary shutter curtain 17 is displaced in time order of (a), (b), (c), (d) and (a).

By locating the aperture stop of fixed shape and the light quantity control filter or shutter at different positions in the zoom lens, it is thus possible to obtain an imaging system in which, while high image quality is maintained with the influence of diffraction minimized, the quantity of light is controlled by the filter or shutter, and the length of the zoom lens can be cut down as well.

The present electronic imaging system constructed as described above may be applied to phototaking systems where object images formed through zoom lenses are received at image pickup devices such as CCDs or silver-halide films, inter alia, digital cameras or video cameras as well as PCs and telephone sets that are typical information processors, in particular, easy-to-carry cellular phones. Given below are some such embodiments.

Figure 38:
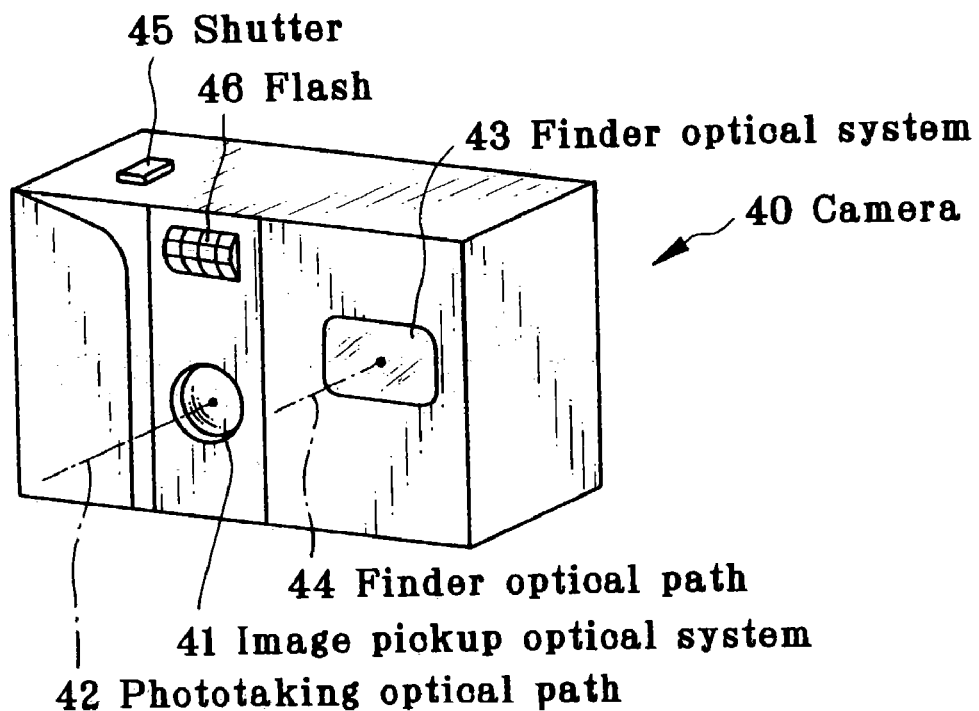
FIG. 38 is a front perspective view illustrative of the appearance of a digital camera incorporating the zoom lens of the invention.
Figure 39:
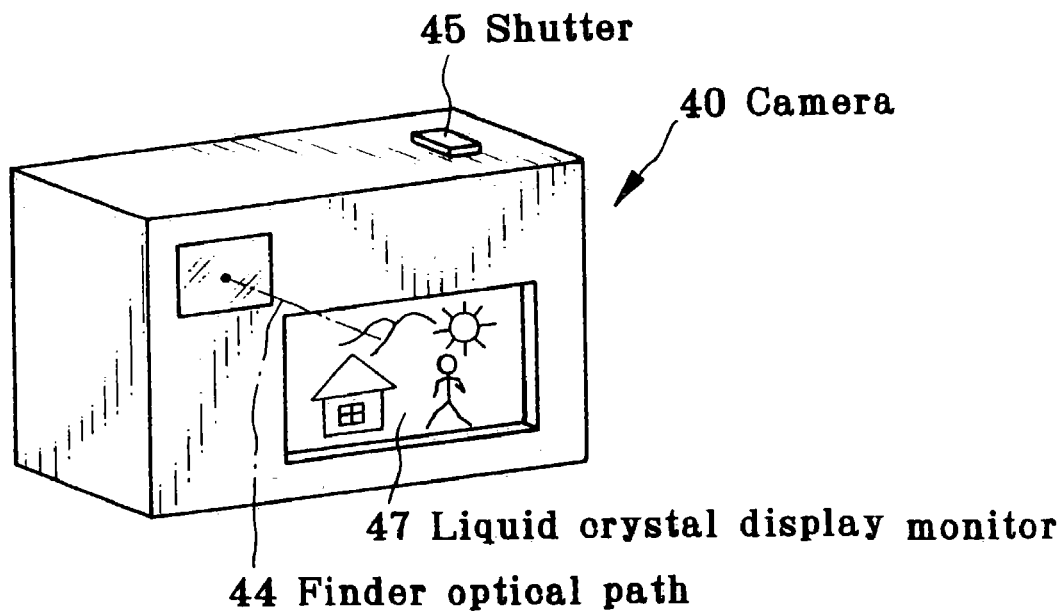
FIG. 39 is a rear perspective view of the digital camera of FIG. 38.
Figure 40:
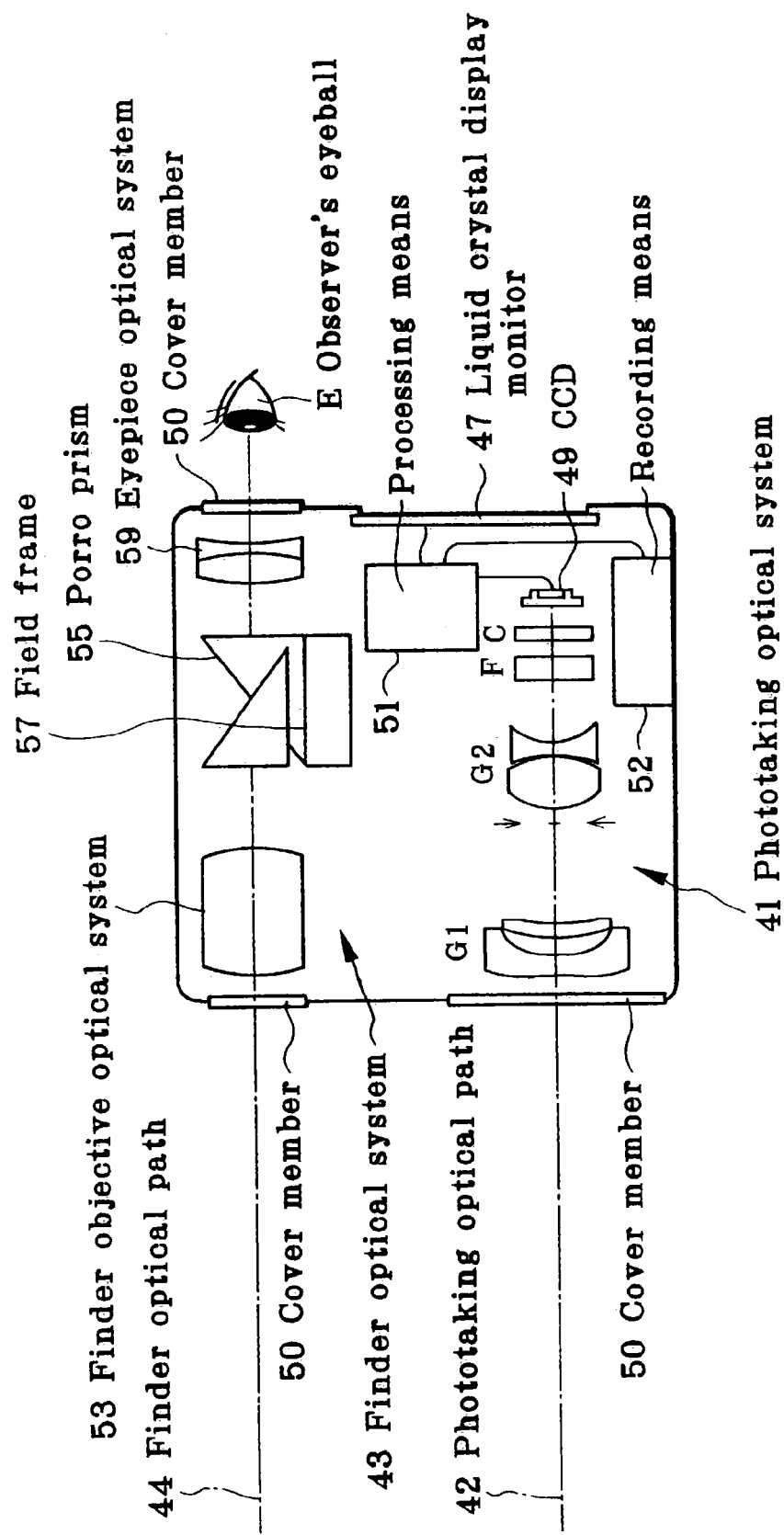
FIG. 40 is a sectional schematic of the digital camera.

FIGS. 38, 39 and 40 are conceptual illustrations of a phototaking optical system 41 for digital cameras, in which the zoom lens of the invention is incorporated. FIG. 38 is a front perspective view of the outside shape of a digital camera 40, and FIG. 39 is a rear perspective view of the same. FIG. 40 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the zoom lens according to Example 1. An object image formed by the phototaking optical system 41 is formed on the image pickup plane of a CCD 49 via an optical low-pass filter F provided with a near-infrared cut coat. An object image received at CCD 49 is shown as an electronic image on the liquid crystal monitor 47 via processing means 51, which monitor is mounted on the back of the camera. This processing means 51 is connected with recording means 52 in which the photo-taken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and cost reductions, because the phototaking optical system 41 is constructed of a zoom lens having a high zoom ratio at the wide-angle end with satisfactory aberrations and a back focus large enough to receive a filter, etc. therein.

In the embodiment of FIG. 40, plane-parallel plates are used as the cover members 50; however, it is acceptable to use powered lenses.

Figure 41:
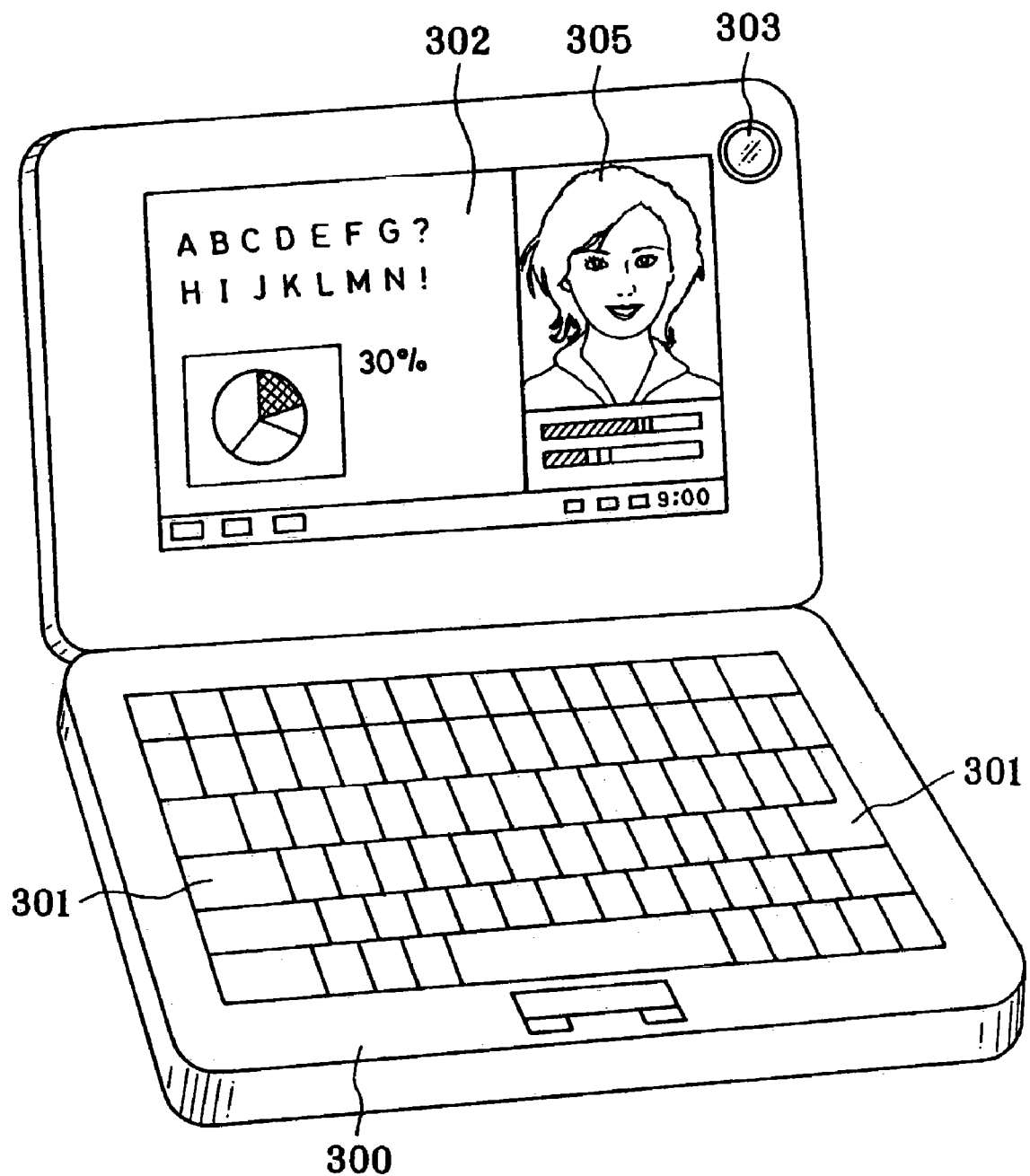
FIG. 41 is a front perspective view of a personal computer in use, in which the zoom lens of the invention is incorporated as an objective optical system.
Figure 42:
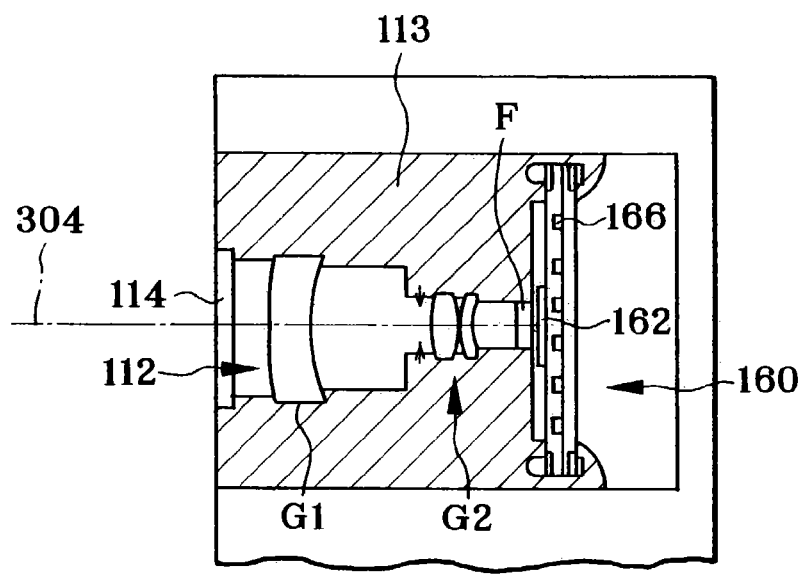
FIG. 42 is a sectional view of a phototaking optical system in the personal computer.
Figure 43:
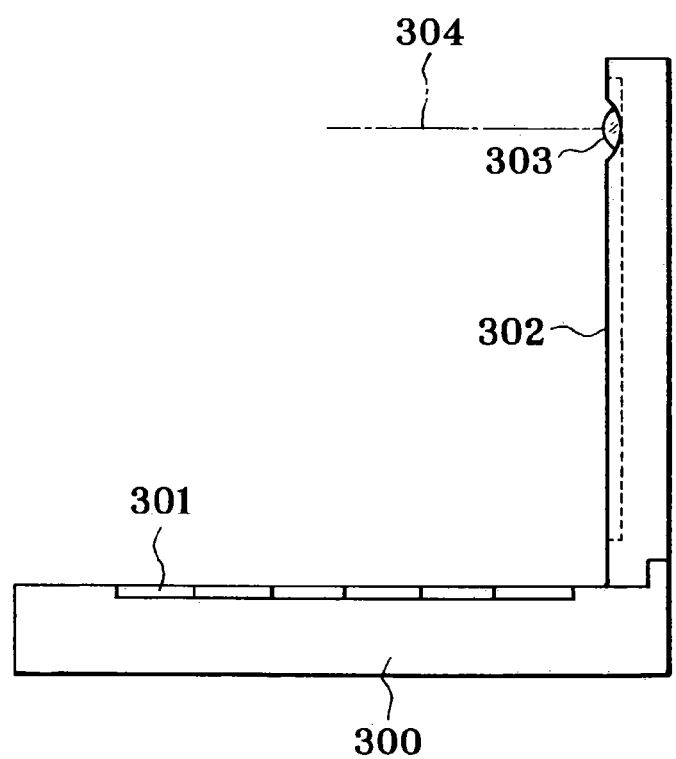
FIG. 43 is a side view of the state of FIG. 41.

FIGS. 41, 42 and 43 are illustrative of a personal computer that is one example of the information processor in which the zoom lens of the invention is built as an objective optical system. FIG. 41 is a front perspective view of a personal computer 300 that is in an uncovered state, FIG. 42 is a sectional view of a phototaking optical system 303 in the personal computer 300, and FIG. 43 is a side view of the state of FIG. 41. As shown in FIGS. 41, 42 and 43, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the right upper portion of the monitor 302, it may be located somewhere around the monitor 302 or keyboard 301.

This phototaking optical system 303 comprises, on a phototaking optical path 304, an objective lens 112 comprising the zoom lens of the invention (roughly shown) and an image pickup device chip 162 for receiving an image. These are built in the personal computer 300.

Here an optical low-pass filter F is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112. It is here noted that driving mechanisms for the zoom lens, etc. contained in the lens barrel 113 are not shown.

An object image received at the image pickup device chip 162 is entered via a terminal 166 in the processing means of the personal computer 300, and shown as an electronic image on the monitor 302. As an example, an image 305 taken of the operator is shown in FIG. 41. This image 305 may be shown on a personal computer on the other end via suitable processing means and the Internet or telephone line.

Figure 44A:
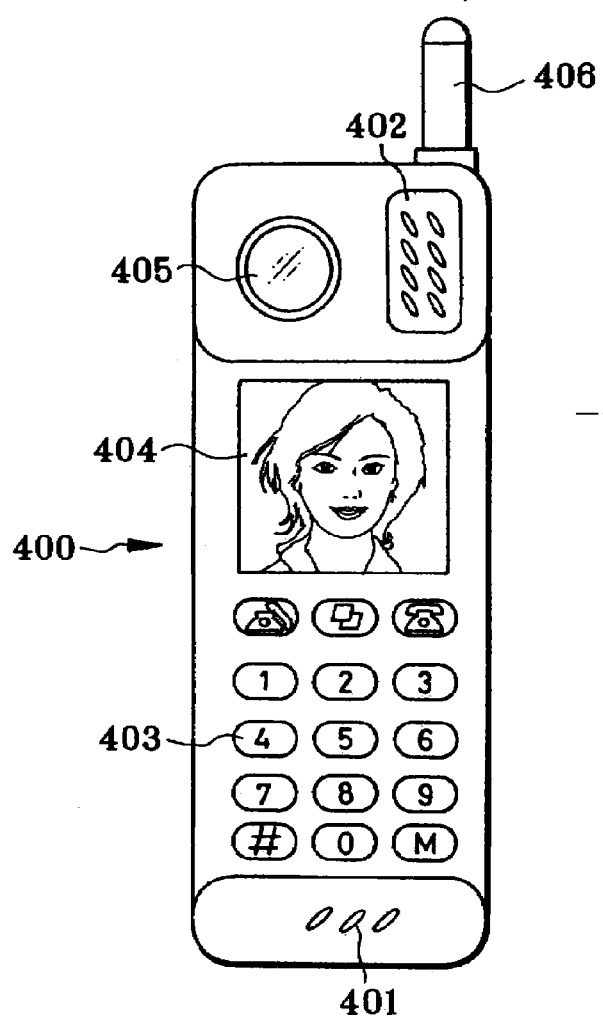
FIGS. 44(a) and 44(b) are a front and a side view of a cellular phone incorporating the zoom lens of the invention as an objective optical system.
Figure 44B:
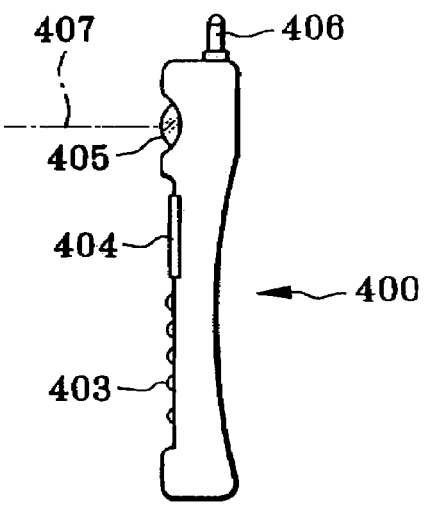
Figure 44C:
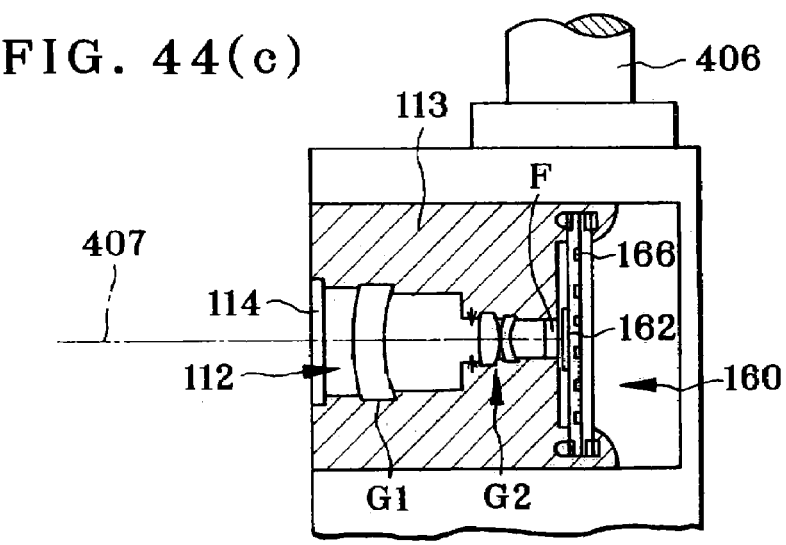
FIG. 44(c) is a sectional view of a phototaking optical system for the same.

FIGS. 44(a), 44(b) and 44(c) are illustrative of a telephone set that is one example of the information processor in which the zoom lens of the invention is built in the form of a phototaking optical system, especially a convenient-to-carry cellular phone. FIG. 44 (a) and FIG. 44(b) are a front and a side view of a cellular phone 400, respectively, and FIG. 44(c) is a sectional view of a phototaking optical system 405. As shown in FIGS. 44(a), 44(b) and 44(c), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a phototaking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises, on a phototaking optical path 407, an objective lens 112 comprising the zoom lens of the invention (roughly shown) and an image pickup device chip 162 for receiving an object image. These are built in the cellular phone 400.

Here an optical low-pass filter F is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112. It is here noted that driving mechanisms for the zoom lens, etc. contained in the lens barrel 113 are not shown.

An object image received at the image pickup device chip 162 is entered via a terminal 166 in processing means (not shown), so that the object image can be displayed as an electronic image on the monitor 404 and/or a monitor at the other end. The processing means also include a signal processing function for converting information about the object image received at the image pickup device chip 162 into transmittable signals, thereby sending the image to the person at the other end.

It is here understood that each of the embodiments mentioned above could be modified in various fashions without any departure from the scope of what is claimed.

As can be seen from the foregoing, the present invention can provide a digital camera or other imaging system in which, while high image quality is maintained with the influence of diffraction minimized, the quantity of light is controlled by the filter or shutter, and which enables the length of the zoom lens to be cut down.

We claim:

1. An imaging system comprising:
a zoom lens comprising a plurality of lens groups wherein a spacing between individual lens groups is varied to vary a focal length and an aperture stop located in an optical path for limiting at least an axial light beam diameter, and an electronic image pickup device located on an image side of the zoom lens, wherein:
the aperture stop has a fixed shape, and a filter for performing light quantity control by varying transmittance is located on an optical axis of a space located at a position different from that of a space in which the aperture stop is located,
the zoom lens comprises at least a first lens group having negative refracting power and a second lens group having positive refracting power, located just after the first lens group,
a spacing between the first lens group having negative refracting power and the second lens group having positive refracting power becomes narrower at a telephoto end than at a wide-angle end of the zoom lens,
the aperture stop is located between a surface in the first lens group having negative refracting power, said surface being located nearest to an image side of the zoom lens, and an image side-surface in the second lens group having positive refracting power,
the light quantity control filter is located on an image plane side with respect to the aperture stop,
when the focal length is varied, the aperture stop is moved with the second lens group, and
when $1.5 \times 10^3 \times a/1$ mm $< F$ where F is a full-aperture F-number at a telephoto end and a is a minimum pixel pitch in mm of the electronic image pickup device, a length of the aperture stop in a vertical or horizontal direction of an image pickup plane is longer than the length of the aperture stop in a diagonal direction of the image pickup plane, or when $1.5 \times 10^3 a/1$ mm $> F$, the length of the aperture stop in the vertical or horizontal direction of the image pickup plane is shorter than the length of the aperture stop in a diagonal direction of the image pickup plane.

2. The imaging system according to claim 1, wherein the light quantity control filter comprises at least one transmitting surface wherein a transmittance of a central portion thereof is higher than that of a marginal portion thereof.

3. The imaging system according to claim 1, wherein the light quantity control filter is tiltable with respect to an optical axis.

4. The imaging system according to claim 1, wherein the aperture stop is located between lens groups between which there is an air spacing variable upon zooming or focusing, and the light quantity control filter is located at a position different from the air spacing.

5. The imaging system according to claim 1, wherein that the aperture stop is positioned such that a perpendicular going from the aperture stop down to the optical axis intersects the optical axis within a lens medium in the lens groups.

6. The imaging system according to claim 5, wherein the aperture stop is located in contact with any lens surface in the lens group.

7. The imaging system according to claim 1, wherein the aperture stop is formed of an aperture plate having an aperture on an optical axis side.

8. The imaging system according to claim 1, wherein the first lens group having negative refracting power is located nearest to the object side of the zoom lens.

9. The imaging system according to claim 1, wherein the zoom lens comprises, in order from an object side thereof, the first lens group having negative refracting power and the second lens group having positive refracting power, and lens groups movable for zooming are defined by only two lens groups, i.e., the first lens group having negative refracting power.

10. The imaging system according to claim 1, wherein the plurality of lens groups consist of, in order from the object side thereof, only two lens groups, i.e., the first lens group having negative refracting power and the second lens group having positive refracting power.

11. The imaging system according to claim 1, wherein the aperture stop is located in an air space just before the second lens group having positive refracting power.

12. The imaging system according to claim 1, wherein the light quantity control filter is located in an air space just after the second lens group having positive refracting power.

13. The imaging system according to claim 1, wherein the aperture stop is located in a variable space, both lens surfaces just before and just after the aperture stop are concave on image sides thereof, and the aperture stop has a funnel-form outside shape concave toward the image side off and off an optical axis.

14. The imaging system according to claim 1, wherein the light quantity control filter can be inserted in or de-inserted from an optical path.

15. The imaging system according to claim 14, wherein, upon retracting from an optical axis, the light quantity control filter fluctuates in such a direction that a filter surfaces comes close to the optical axis.

16. An imaging system comprising:
a zoom lens comprising a plurality of lens groups wherein a spacing between individual lens groups is varied to vary a focal length and an aperture stop located in an optical path for limiting at least an axial light beam diameter, and an electronic image pickup device located on an image side of the zoom lens, wherein:
the aperture stop has a fixed shape, and a filter for performing light quantity control by varying transmittance is located on an optical axis of a space located at a position different from that of a space in which the aperture stop is located,
the zoom lens comprises at least a first lens group having negative refracting power and a second lens group having positive refracting power, located just after the first lens group,
a spacing between the first lens group having negative refracting power and the second lens group having positive refracting power becomes narrower at a telephoto end than at a wide-angle end of the zoom lens,
the aperture stop is located between a surface in the first lens group having negative refracting power, said surface being located nearest to an image side of the zoom lens, and an image side-surface in the second lens group having positive refracting power,
the light quantity control filter is located on an image plane side with respect to the aperture stop,
when the focal length is varied, the aperture stop is moved with the second lens group, and
the imaging system constantly satisfies condition (1):

$$0.01 < \alpha/\beta < 1.3 \quad (1)$$

where $\alpha$ is an axial distance from the aperture stop to an entrance surface of the light quantity control filter located on an image side with respect thereto, and $\beta$ is an axial distance from the entrance surface of the light quantity control filter to an image pickup plane of the electronic image pickup device.

17. An imaging system comprising:
a zoom lens comprising a plurality of lens groups wherein a spacing between individual lens groups is varied to vary a focal length and an aperture stop located in an optical path for limiting at least an axial light beam diameter, and an electronic image pickup device located on an image side of the zoom lens, wherein:
the aperture stop has a fixed shape, and a filter for performing light quantity control by varying transmittance is located on an optical axis of a space located at a position different from that of a space in which the aperture stop is located,
the zoom lens comprises at least a first lens group having negative refracting power and a second lens group having positive refracting power, located just after the first lens group,
a spacing between the first lens group having negative refracting power and the second lens group having positive refracting power becomes narrower at a telephoto end than at a wide-angle end of the zoom lens,
the aperture stop is located between a surface in the first lens group having negative refracting power, said surface being located nearest to an image side of the zoom lens, and an image side-surface in the second lens group having positive refracting power,
the light quantity control filter is located on an image plane side with respect to the aperture stop,
when the focal length is varied, the aperture stop is moved with the second lens group, and
the imaging system satisfies condition (2):

$$0.5 < \phi\beta/\phi\alpha < 1.5 \quad (2)$$

where $\phi\alpha$ is a maximum diameter of an aperture in the aperture stop and $\phi\beta$ is a maximum effective diameter (diagonal length) of the light quantity control filter.

18. An imaging system comprising:
a zoom lens comprising a plurality of lens groups wherein a spacing between individual lens groups is varied to vary a focal length and an aperture stop located in an optical path for limiting at least an axial light beam diameter, and an electronic image pickup device located on an image side of the zoom lens, wherein:
the aperture stop has a fixed shape, and a shutter is located on an optical axis of a space located at a position different from that of a space in which the aperture stop is located,
the zoom lens comprises at least a first lens group having negative refracting power and a second lens group having positive refracting power, located just after the first lens group,
a spacing between the first lens group having negative refracting power and the second lens group having positive refracting power becomes narrower at a telephoto end than at a wide-angle end of the zoom lens,
the aperture stop is located between a surface in the first lens group having negative refracting power, said surface being located nearest to an image side of the zoom lens, and an image side-surface in the second lens group having positive refracting power,
the shutter is located on the image plane side with respect to the aperture stop,
when the focal length is varied, the aperture stop is moved with the second lens group, and
the imaging system constantly satisfies condition (3):

$$0.01 < \alpha'/\beta' < 1.3 \quad (3)$$

where $\alpha'$ is an axial distance from the aperture stop to the shutter located on an image side with respect thereto, and $\beta'$ is an axial distance from the shutter to the image pickup plane of the electronic image pickup device.

19. The imaging system according to claim 18, wherein the aperture stop is located between lens groups between which there is an air space variable upon zooming or focusing, and the shutter is located at a position different from the air space.

20. The imaging system according to claim 18, wherein the aperture stop is positioned such that a perpendicular going from the aperture stop down to the optical axis intersects the optical axis within a lens medium in the lens groups.

21. The imaging system according to claim 20, wherein the aperture stop is located in contact with any one of lens surfaces in the lens groups.

22. The imaging system according to claim 18, wherein the aperture stop is formed of an aperture plate having an aperture on an optical axis side.

23. The imaging system according to claim 18, wherein the first lens group having negative refracting power is located nearest to the object side of the zoom lens.

24. The imaging system according to claim 18, wherein the zoom lens comprises, in order from an object side thereof, the first lens group having negative refracting power and the second lens group having positive refracting power, wherein lens groups movable for zooming are defined by only two lens groups, i.e., the first lens group having negative refracting power and the second lens group having positive refracting power.

25. The imaging system according to claim 18, wherein the plurality of lens groups consists of, in order from its object side, only two lens groups, i.e., the first lens group having negative refracting power and the second lens group having positive refracting power.

26. The imaging system according to claim 18, wherein the aperture stop is located in an air space just before the lens group having positive refracting power.

27. The imaging system according to claim 18, wherein the shutter is located in an air space just after the second lens group having positive refracting power.

28. The imaging system according to claim 18, wherein the aperture stop is located in a variable space, both lens surfaces just before and just after the aperture stop are concave on image sides thereof, and the aperture stop has a funnel-form outside shape concave toward the image side.

29. An imaging system comprising:
a zoom lens comprising a plurality of lens groups wherein a spacing between individual lens groups is varied to vary a focal length and an aperture stop located in an optical path for limiting at least an axial light beam diameter, and an electronic image pickup device located on an image side of the zoom lens, wherein:
the aperture stop has a fixed shape, and a shutter is located on an optical axis of a space located at a position different from that of a space in which the aperture stop is located,
the zoom lens comprises at least a first lens group having negative refracting power and a second lens group having positive refracting power, located just after the first lens group,
a spacing between the first lens group having negative refracting power and the second lens group having positive refracting power becomes narrower at a telephoto end than at a wide-angle end of the zoom lens,
the aperture stop is located between a surface in the first lens group having negative refracting power, said surface being located nearest to an image side of the zoom lens, and an image side-surface in the second lens group having positive refracting power,
the shutter is located on the image plane side with respect to the aperture stop,
when the focal length is varied, the aperture stop is moved with the second lens group, and
the imaging system satisfies condition (4):

$$0.5 < \phi\beta'/\phi\alpha' < 1.5 \qquad (4)$$

where $\phi\alpha'$ is a maximum diameter of the aperture in the aperture stop and $\phi\beta'$ is a maximum effective diameter (diagonal length) of the shutter.

* * * * *

UNITED STATES PATENT AND TRADEMARK OFFICE
CERTIFICATE OF CORRECTION

PATENT NO. : 7,414,665 B2  Page 1 of 1
APPLICATION NO. : 10/619078
DATED : August 19, 2008
INVENTOR(S) : Masahito Wantabe et al.

It is certified that error appears in the above-identified patent and that said Letters Patent is hereby corrected as shown below:

Column 36, line 28, change "in a diagonal direction" to --in the diagonal direction--; and Column 37, line 19, change "a filter surfaces" to --a filter surface--.

Signed and Sealed this

Thirtieth Day of June, 2009

JOHN DOLL
*Acting Director of the United States Patent and Trademark Office*